United States Patent [19]

Favor et al.

[11] Patent Number: 5,745,724
[45] Date of Patent: Apr. 28, 1998

[54] SCAN CHAIN FOR RAPIDLY IDENTIFYING FIRST OR SECOND OBJECTS OF SELECTED TYPES IN A SEQUENTIAL LIST

[75] Inventors: John G. Favor, San Jose; Amos Ben-Meir, Cupertino; Jeffrey E. Trull, San Jose, all of Calif.

[73] Assignee: Advanced Micro Devices, Inc., Sunnyvale, Calif.

[21] Appl. No.: 592,722

[22] Filed: Jan. 26, 1996

[51] Int. Cl.$^6$ ...................................................... G06F 9/30
[52] U.S. Cl. ........................... 395/389; 395/800; 395/393
[58] Field of Search ...................................... 395/800, 389, 395/386, 387, 393, 392, 394

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 395/402 |
| 4,807,115 | 2/1989 | Torng | 395/391 |
| 4,858,105 | 8/1989 | Kuriyama et al. | 395/582 |
| 5,345,587 | 9/1994 | Fehskens et al. | 395/672 |
| 5,430,851 | 7/1995 | Hirata et al. | 395/388 |
| 5,442,757 | 8/1995 | McFarland et al. | 395/394 |
| 5,487,156 | 1/1996 | Popescu et al. | 395/393 |
| 5,506,963 | 4/1996 | Ducateau et al. | 395/200.03 |
| 5,511,175 | 4/1996 | Favor et al. | 395/392 |
| 5,553,256 | 9/1996 | Fetterman et al. | 395/375 |

*Primary Examiner*—William M. Treat
*Assistant Examiner*—Zarni Maung
*Attorney, Agent, or Firm*—Skjerven, Morrill, MacPherson, Franklin & Friel; David T. Millers

[57] ABSTRACT

A circuit includes a sequential entries for storing objects of different types and a scan chain which can identify an object of a first type which follows after an object of a second type. The first and second types can be identical so that the scan chain identifies the second object of a particular type in the sequence. The scan chain includes single-entry "generate", "propagate", "kill", and "only" terms which control a scan bit. Conceptually, if the "only" term is not asserted, an entry of the second type generates the scan bit and asserts the "only" term. After the "only" term is asserted, further generation of the scan bit is inhibited. Each entry either propagates the scan bit to the next entry or if the entry is of the first type, kills the scan bit and identifies itself as the selected entry. Look-ahead logic determines group terms from single-entry terms to indicate whether a scan bit would be generated, propagated, or killed by a group of entries. Accordingly, the scan bit is not required to propagate through every entry, and scans can be performed quickly.

19 Claims, 16 Drawing Sheets

RegOp

| 37 36 35 | 30 29 | 26 25 24 | 22 21 | 17 16 | 12 11 10 9 | 8 7 | 0 |
|---|---|---|---|---|---|---|---|
| 0 0 Type | Ext | R1 DSz | Dest | Src1 | — SS | I | Imm8/Src2 |

LdStOp

| 37 36 35 | 32 31 30 29 | 26 25 24 23 22 21 | 17 16 15 | 12 11 | 4 3 | 0 |
|---|---|---|---|---|---|---|
| 0 1 Type | ISF Seq | ASz DSz Data | LD Base | Disp8 | I | Index |

LIMMOp

| 37 36 35 | 21 20 | 17 16 | 0 |
|---|---|---|---|
| 1 1 | ImmHi | Dest | ImmLo |

SpecOp

| 37 35 34 | 31 30 | 26 | 23 22 21 | 17 16 | 0 |
|---|---|---|---|---|---|
| 1 0 1 Type | CC | — | DSz | Dest | Imm17 |

FpOp

| 37 35 34 | 30 29 28 27 26 25 | 20 | 17 | 15 12 | 3 | 0 |
|---|---|---|---|---|---|---|
| 1 0 0 Type | DSz SPM SS | — | Dest | — Src1 | — | Src2 |

FIG. 3

SCAN CHAIN FOR RAPIDLY IDENTIFYING FIRST OR SECOND OBJECTS OF SELECTED TYPES IN A SEQUENTIAL LIST

CROSS REFERENCE TO RELATED APPLICATIONS

This application is related to and incorporates by reference, in their entirety:

U.S. Pat. No. 08/590,383, entitled "Unified Multifunction Operation Scheduler for Out-of-Order Execution in a Superscalar Processor";

U.S. Pat. No. 08/592,150, entitled "Self-Modifying Code Handling System";

U.S. Pat. No. 08/592,209, entitled "Out-of-Order Load/Store Execution Control";

U.S. Pat. No. 08/592,210, entitled "Two-Way Encoding Branching Method and System";

U.S. Pat. No. 08/592,208, entitled "Instruction Vectoring and Decode";

U.S. Pat. No. 08/592,151, entitled "RISC 86 Instruction Set";

U.S. Pat. No. 08/592,149, entitled "Software Implementation of SMM";

U.S. Pat. No. 08/592,829, entitled "Method for Simulating Cache Operation";

U.S. Pat. No. 08/592,828, entitled "Method for Analyzing the Performance of a Microprocessor";

U.S. Pat. No. 08/592,041, entitled "Design for a Simulation Module Using an Object-Oriented Programming Language";

U.S. Pat. No. 08/590,568, entitled "Out-of-Order Processing with Operation Bumping to Reduce Pipeline Delay";

U.S. Pat. No. 08/593,765, entitled "Instruction Buffer Organization Method and System"; and U.S. Pat. No. 08/592,207, entitled "Instruction Predecode and Multiple Instruction Decode".

BACKGROUND OF THE INVENTION

1. Field of the Invention

This invention relates to circuits and methods for quickly identifying an object in a sequential list, and particularly relates to circuits and methods for selecting operations for use by execution units in a superscalar processor.

2. Description of Related Art

A typical computer program is a list of instructions which when compiled or assembled generates a sequence of machine instructions or operations which a processor executes. The operations have a program order defined by the logic of the computer program and are generally intended for sequential execution in the program order. Scalar processors execute the operations in the program order which limits a scalar processor to completing one operation before completing the next operation. To improve processor performance, superscalar processors have been developed which contain a variety of execution units which are capable of operating in parallel so that operations can be executed and completed in parallel or out of the program order. Superscalar processors can complete more than one operation at a time and therefore can be computationally faster than scalar processors operating at the same clock speed.

A scheduler in a superscalar processor may schedule execution of operations so that operations are executed out of the normal program order. Difficulties in out-of-order execution arise because one operation may depend on another in that the logic of a computer program requires that the first operation in the program be executed before the second operation. Whether an operation should be executed at all often depends on the result of a branch operation. If an operation that follows a conditional branch operation is executed before the branch, the execution must be speculative because the branch may skip over the instruction. Additionally, many computers require that a system's state be known just before or after an operation generates an error, interrupt, or trap; but when operations are executed out of order, an operation which follows an error in a program may have been executed before the error occurred. Thus, the processor must be able to undo operations which should not have been executed and must be able to construct the system's state following an error.

Two somewhat conflicting goals of superscalar architecture are quick scheduling so that a processor can operate at a high clock rate and efficient scheduling to maximize parallel execution of operation which are actually required for completion of the program. Schedulers which accomplish these goals are desired.

SUMMARY OF THE INVENTION

In accordance with the invention, an out-of-order execution engine includes a set of execution units capable of operating in parallel and a scheduler which dispatches or issues operations to the execution units. The scheduler contains entries associated with operations to be executed. Each entry includes storage for information required for execution of an associated operation and logic for directing the information to the correct execution unit when required.

The entries in the scheduler are not specialized according to instruction type, and the execution units do not have specialized queues which can be blocked if an execution unit is stalled. The scheduler includes a scan chains which select operations for issue to the execution units that executes the operations. Each execution unit has a class of operations which it can execute, but in some embodiments of the invention, the classes of operations executed by two of the execution units overlap or are be identical. In such embodiments, the scan chains must insure that the same operation is not issued to two execution units. One way to insure that two different operations are issued to two execution units which have overlapping classes of executable operation is to require that the operation issued to one execution unit follow (in program order) the operation issued to the other execution unit.

A scan chain in accordance with the invention can identify an operation of a second class which follows after an object of a first class. For faster operation, the scan chain operates independently and in parallel with other scan chains, even though results from two of the scan chains may be logically dependent. The scan chain generates single-entry "generate", "propagate" or "kill", and "only" terms which control a scan bit. Conceptually, if the "only" term is not asserted, an entry associated with an operation of the first class generates the scan bit and asserts the "only" term. The scan bit propagates to following entries in the scheduler. After the "only" term is asserted, further generation of the scan bit is inhibited. Each entry either propagates the scan bit to the next entry or if the entry is associated with an operation of the second class, kills the scan bit and identifies itself as the selected entry. Propagation can be performed with look-ahead logic that determines group terms from single-entry terms to indicate whether a scan bit would be generated, propagated, or killed by a group of entries. Accordingly, scans can be performed quickly because propagation is effectively conducted in parallel.

Operations are dispatched first according to type and availability of the required execution unit and second according to the sequential program order. Operand availability is not checked during issue selection. However, operations which would block an execution pipeline can be bumped from early stages of the pipeline so that instructions of the same type can be executed out of the program order.

After an abortable operation is issued and executed, the results of the operation is kept in the associated entry and/or in a store queue. The scheduler keeps a result until an operation commit unit coupled to the scheduler determines that no fault or mispredicted branch precedes the associated operation. If the operation commit unit determines that the results of the oldest executed operations are required for execution of a program, the results are made permanent by writing to a register file, a status register, or memory, and the operation is retired and removed from the scheduler. If the operation commit unit determines that a result is not required for execution of the program, the operation is retired without making permanent changes.

In one embodiment of the invention, the scheduler includes rows of entries associated with pending operations. Each entry corresponds to a single operation, and each row of entries corresponds to multiple operations, for example four operations. The scheduler in some ways operates as a shift register where information associated with a new group of operations is loaded into a top row of the scheduler and shifts down as a group toward the bottom row of the scheduler as older operations are retired. Tags indicating the age of an operation are not required because position of an operation in the scheduler indicates its age.

Most operations are immediately eligible for execution when loaded into the top row of the scheduler but may be issued to execution units from any point in the scheduler. A state field in an entry for an operation indicates whether the operation has been issued, is in an execution stage of a pipeline, or has been complete. The state of the operation is independent of operations position in the scheduler, but the longer an operation is in the scheduler, the greater the chance that the operation will be issued and completed. A row of operations are retired simultaneously so that multiple operations can be completed each clock cycle.

Some operations such as evaluations of conditional branches and register operations which depend on status flags are executed when the operations reach a particular row of the scheduler where older operations are likely complete. Accordingly, operations which depend on status flags are handled when older operations are likely completed modification of the status flag values. This minimizes pipeline hold ups caused by waits for valid status flag values.

The scheduler is tightly coupled to the execution units and the operation commit unit and maintains information concerning operations during the entire lengths of multiple execution pipelines. The scheduler issues operations, provides the operation information to the execution units at times required, and holds the results from complete operations for forwarding as required for executing other operations before the results have been committed. Accordingly, the scheduler provides a single unified structure which schedules execution of operations, provides operand values required during execution, and acts as a reorder buffer.

BRIEF DESCRIPTION OF THE DRAWINGS

FIG. 3 illustrates an example format for RISC instructions executed by an out-of-order engine in accordance with an embodiment of the invention.

Use of the same reference symbols in different figures indicates similar or identical items.

DETAILED DESCRIPTION OF THE PREFERRED EMBODIMENTS

Figure 1:
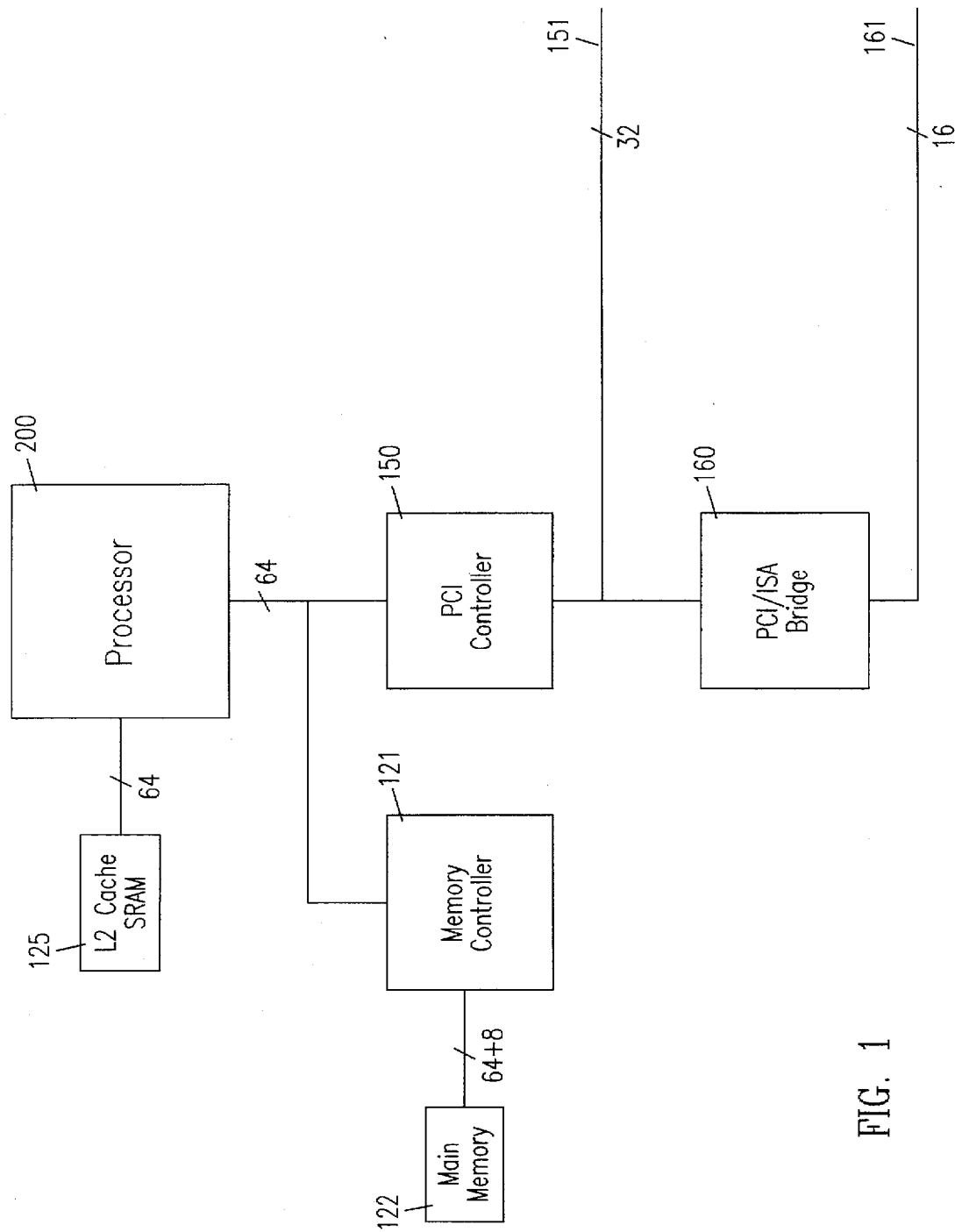
FIG. 1 shows a block diagram of a computer system including a processor in accordance with an embodiment of the invention.

The invention described in connection with the following outline:

I. Overview
II. Scheduler
  A. Scheduler Loading
    1. Static Entry Fields
    2. Dynamic Entry Fields
    3. Op Quad Fields
  B. Load/Shift Control
III. Operation Execution
  A. Issue Stage
    1. Issue Selection Phase
      a. Issue Selection Scan Chains
      b. Issue Selection Scan Chains for RUY
    2. Operand Information Broadcast Phase
  B. Operand Forward Stage
    1. Operand Selection Phase
    2. Operand Transfer Phase
    3. Displacement Forwarding
    4. Immediate Value Forwarding
  C. Data Operand Fetching
  D. Register Operation Bumping
  E. Load/Store Ordering
  F. Abort Handling
IV. Global Control Logic
  A. Scheduler Information Used by External Logic
  B. Global Control Functions
V. Status Flags
  A. Status Flag Fetch
  B. Status Flag Forwarding to cc-Dep RegOps
  C. Branch Prediction Resolution
VI. Synchronization of Non-Abortable Operations
VII. Self-Modifying Code Handling VIII. Operation Commit Unit
  A. Commitment
    1. Register Commitment
    2. Status Flag Commitment
    3. Memory Write Commitment
  B. Op Quad Retirement
  C. Fault Handling
    1. Load Operation Fault Handling
    2. FAULT and LDDHA/LDAHA Op Handling
    3. Target Limit Violation Handling
    4. Mispredicted Branch Handling
  D. Abort Cycle Generation
IX. Processing Systems
X. Conclusion
Appendix A: RISC86™ Syntax
Appendix B: Pseudo-RTL Descriptions
I. Overview A processor in accordance with an embodiment of the invention may be applied to a variety of application including a personal computer. FIG. 1 shows block diagram of a computer motherboard 100 containing a processor 200 in accordance with an embodiment of the invention. Processor 200 is a monolithic integrated circuit capable of executing a complex instruction set and may be manufactured using conventional integrated circuit processes, such as a 5 metal layer CMOS process having 0.35 µm design rules. A chipset connected to processor 120 includes an external level-2 cache 125, a memory controller 121 which provides an interface to a main memory 122, and bus controllers 150 and 160 which provide interfaces to local buses such as a PCI bus 155 and an ISA bus 165.

Figure 2:
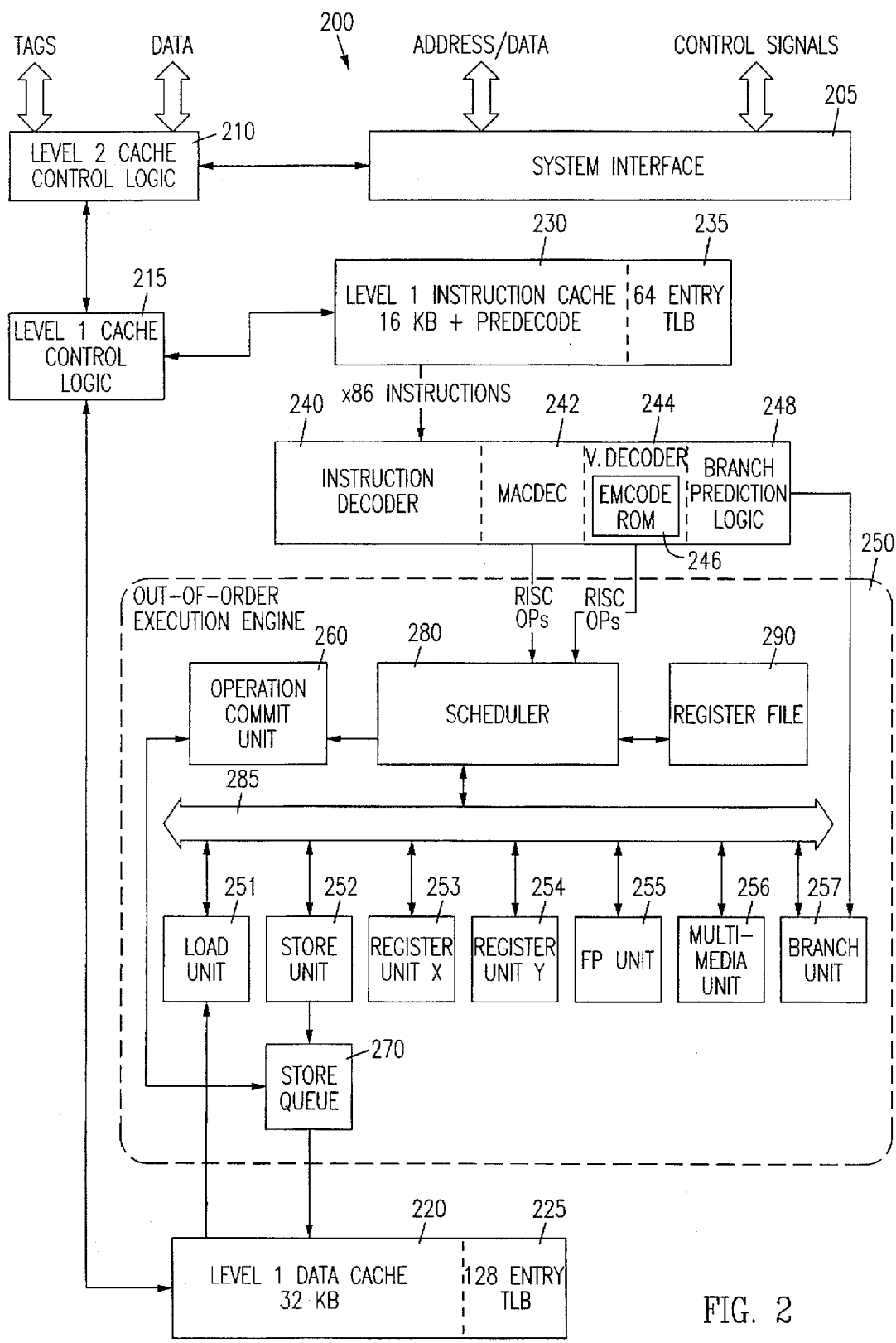
FIG. 2 shows a processor in accordance with an embodiment of the invention.

FIG. 2 shows a block diagram of an embodiment of processor 200. Processor 200 has a system interface 205 which provides access to the address space of a computer system including main memory 122 and devices on local busses 151 and 161. In an exemplary embodiment, system interface 205 has a 64-bit system bus with multiprocessor cache coherency support for modified, exclusive, shared, and invalid (MESI) states and configurable bus scaling. This architecture is supported by NxPCI™ chipsets available from NexGen, Inc.

An integrated level-2 cache control 210 provides an interface with a private bus to an external SRAM which forms level 2 cache 125. Providing level-2 cache interface separate from system interface 210 uncouples the speed of the level-2 cache from the system bus/chipset, allowing for a faster cache, and decreases utilization of the system bus and cache bus, allowing greater bandwidth on each bus. Level-2 cache control 210 further provides for multiple clock scaling and configurable cache sizes for up to 2 MB of data and tag storage on off-the-shelf burst pipelined synchronous SRAMs. The level-2 cache uses a writeback policy and a 32 byte line size.

A level-1 instruction cache 230 and a level-1 data cache 220 are internal to processor 200 and are connected through level-1 cache control logic 215 to the level 2 cache and to the system bus. In the exemplary embodiment, instruction cache 230 is a two-way set-associative cache containing storage for 16 KB of instructions and additional predecode information. Above incorporated U.S. patent application Ser. Nos. UNKNOWN14 and UNKNOWN15 describe suitable instruction caches and predecode systems. Data cache 220 is a two-way set-associative cache containing storage for 32 KB of data. To provide faster operation and avoid access conflicts, data cache 27 is implemented using pipelined banks of dual-ported memory which allows one read and one write per cycle.

Instructions from main memory 122 are loaded into instruction cache 230. In accordance which the exemplary embodiment, the instructions in main memory 122 are CISC instructions from a complex instruction set such as the PC industry standard x86 instruction set. The CISC instructions are sometimes referred to herein as macroinstructions. Up to 16 bytes of CISC instructions are fetched per cycle. While loading instruction cache 230, instruction bytes are predecoded for rapid identification of the boundaries of each macroinstructions. Predecoding appends code bits to each byte to indicate an offset from the byte to the start of a following instruction assuming that the instruction byte is the first byte in an instruction. Above incorporated U.S. Pat. No. UNKNOWN15, describes a system and method for predecoding and organizing instructions which may be used for instruction cache 230 to increase the speed of instruction decoding.

An instruction decoder 240 executes unconditional branch instructions, performs branch prediction for conditional branch instructions, and converts the CISC instructions fetched from instruction cache 230 into operations for an execution engine 250. Execution engine 250 implements a superscalar, out-of-order, reduced instruction set computing (RISC) architecture. A single CISC instruction from instruction cache 230 decodes into zero (for unconditional branch instructions), one, or several operations for execution engine 250. Multiple CISC instructions can be decoded each cycle to create a set of RISC instructions which are loaded into execution engine 250. Instruction decoder 240 provides hardware decoding unit (MacDec) 242 for the most common CISC instructions and a vector decoding unit 244 for vector decoding of the most complex CISC instructions. Vector decoding unit 244 contains a ROM sometimes referred to herein as emcode ROM which contains operation sequence, sometimes referred to herein as emcode, which corresponds to instruction which are vector decoded. Above incorporated U.S. Pat. Nos. UNKNOWN5 and UNKNOWN6, respectively describe decoding which may be implemented in instruction decoder 240.

FIG. 3 and Appendix A illustrate an example format of RISC instructions for execution engine 250. An instruction set following this format is optimized for execution of x86 CISC instructions and is sometimes referred to the RISC86® instruction set. Above incorporated U.S. Pat. No. UNKNOWN7 describes the RISC86® instruction set. RISC86® instructions are of five types. Each instruction is either a register operation (RegOp), a load-store operation (LdStOp), a load immediate value operation (LIMMOp), a special operation (SpecOp), or a floating point operation (FpOp). A LdStOp can be further classified as either a load operation (LdOp) or a store operation (StOp). A branch operation (BrOp) is a type of SpecOp, and a conditional branch operation (BRCOND) is a type of BrOp which depends on a condition code.

In the exemplary embodiment of the invention, instruction decoder 240 converts x86 macroinstructions into RISC86® instruction (or operations). Hardware decoding unit 242 converts common macroinstructions into short sequences of RISC86® operations. For example, x86 macroinstructions INC reg, PUSH reg, and Jcc tgt_addr are decoded into a RegOp, a StOp, and a BRCOND respectively; an ADD reg,mem macroinstructions is decoded as a LdOp and a RegOp in sequence; an ADD mem,reg macroinstructions is decoded as a LdOp, a RegOp, and a StOp in sequence; and a LEAVE macroinstruction is decode as a RegOp, a LdOp, and a RegOp in sequence. In one embodiment, instruction decoder 240 decodes up to two x86 macroinstructions per cycle to create a set of four RISC86® operations which can be loaded into execution engine 250 in one cycle. No-op operations are used if necessary complete a set of four operations. Two operations are decoded during a cycle if the two consecutive instructions can be identified as being instructions which each decode to two or fewer operations. In an alternative embodiment, up to three (or more) macroinstructions can be decoded each cycle to form a set of four (or more) operations.

Vector decode unit 244 is used to decode uncommon macroinstructions and macroinstructions which decode to long sequence RISC86® operations. Unconditional branch instructions indicate a program counter for the next macroinstruction to decode and are used to determine the next macroinstruction fetched for decoding. Decoder 240 generates no operations for unconditional branch instructions. Branch prediction logic 248 predicts the program counter following a conditional branch instruction and generates a BRCOND is later evaluated to determine whether the prediction was correct.

Execution engine 250 contains seven execution units 251 to 257 which are generally capable of operating in parallel, a scheduler 280 which issues operation for execution, and an operation commit unit (OCU) 260 coupled to the scheduler for committing the results. Each execution unit has corresponding operations which it can execute. A load unit 251 and a store unit 252 execute LdOps and StOps respectively. A store queue 270 temporarily stores data from speculative execution of StOps by store unit 252. Data from store queue 270 is written to data cache 220 when the results of a StOp are committed as described below. Register units 253 and 254, also referred to herein as RUX and RUY, execute register operations (RegOps) which nominally access a register file 290. A floating point unit 255 and a multimedia unit 256 are optional units which respectively execute floating point operations (FpOps) and operations for multimedia applications. In the exemplary embodiment, floating point unit 255 and multimedia unit 256 are omitted.

Scheduler 280 issues operations to execution units 251 to 257, dispatches information required by the various execution units during execution, and deletes operation information as operations are retired. Scheduler 280 is partitioned in to entries where each entry contains storage and logic. Information in the storage of an entry describes an operation which is to be executed, is being executed, or has been executed. In the exemplary embodiment, each entry corresponds to a RISC86® operation, and a group of four entries, referred to herein as a row even though the entries may not be physically positioned as a row. The information associated with four operations in a row is referred to herein as an Op quad. Rows contain storage fields and logic associated with an Op quad as a group in addition to the information an logic associated with individual operations.

Scheduler 280 operates in many ways like a shift register. In an exemplary embodiment, scheduler 280 is six rows deep. Decoder 240 can load a new op quad into the into the top row of scheduler 280 each clock cycle. The Op quad shifts down from the top row towards a bottom row from which the Op quad is retired. The position of an Op quad in scheduler 280 indicates the age or place in the program order for the Op quad; but for most operations, the position in scheduler 280 is independent of stage of execution.

FIGS. 4A to 4D show multi-stage pipelines associated with RegOps, LdOps, StOps, and BrOps. Each stage in the pipelines nominally requires one processor clock cycle unless an operation is held up in one of the stages thereby preventing operations at earlier stages from advancing.

During a first stage 410 for each pipeline, up to 16 bytes of CISC instructions are fetched into instruction cache 230 and predecoded to identify instruction boundaries and reduce subsequent decode time. During a second stage 420, instruction decoder 240 decodes up to three CISC instructions from instruction cache 230 and forms an op quad which is loaded an op quad into scheduler 280.

Scheduler 280 controls an issue stage 430 and an operand forward stage 440 associated with RISC operations other than BrOps. During an issue stage 430, scheduler 280 scans its entries and issues up to six operations to corresponding execution units 251 to 256. Scheduler 280 may select newer operations for issue before an older operation so that execution is out-of-order and speculative. Operand dependencies are not consider during issue selection. Scheduler 280 transmits operands to execution units 251 to 256 during operand forwarding stage 440 for the operations previously issued during issue selection stage 430. During stage 440, some operations issued to a register unit 253 or 254 may be bumped out of a pipeline to avoid long blockage of the pipeline if needed operands will not be available for several clock cycles.

Figure 4A:
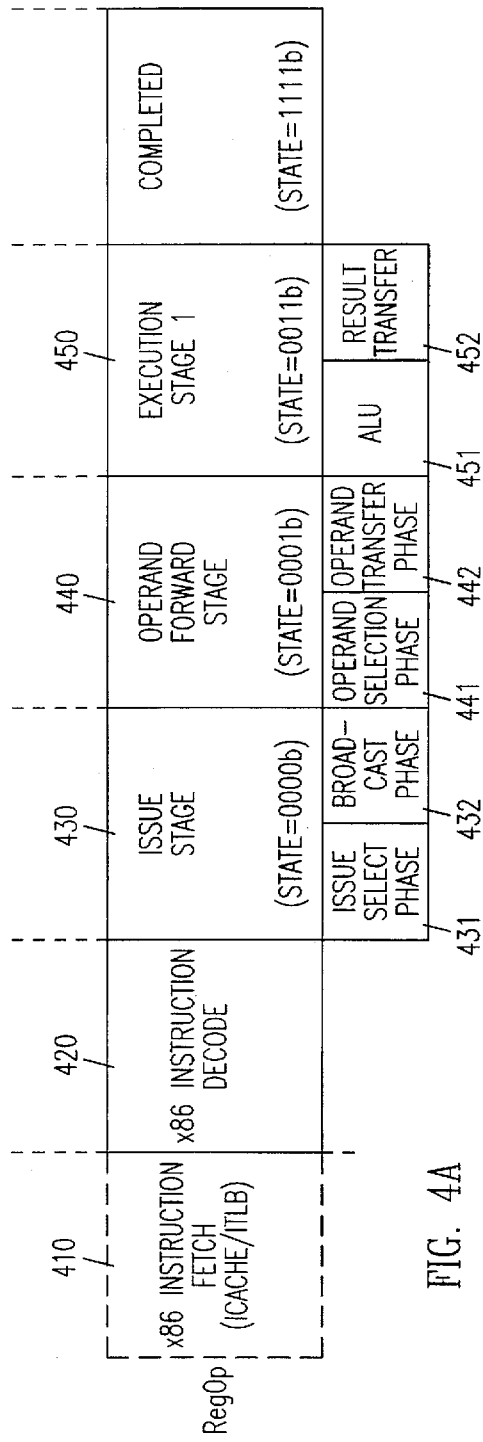
FIGS. 4A, 4B, 4C, and 4D show pipelines for four types of RISC operations in an embodiment of the invention.
Figure 4B:
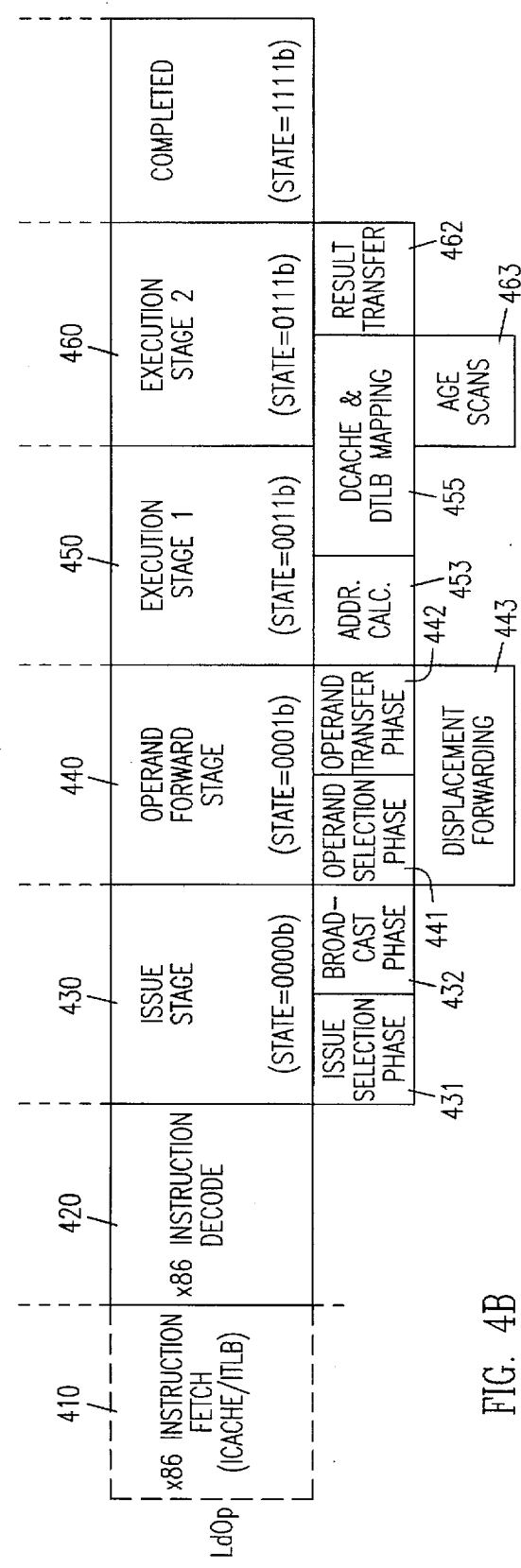
Figures 4C, 4D:
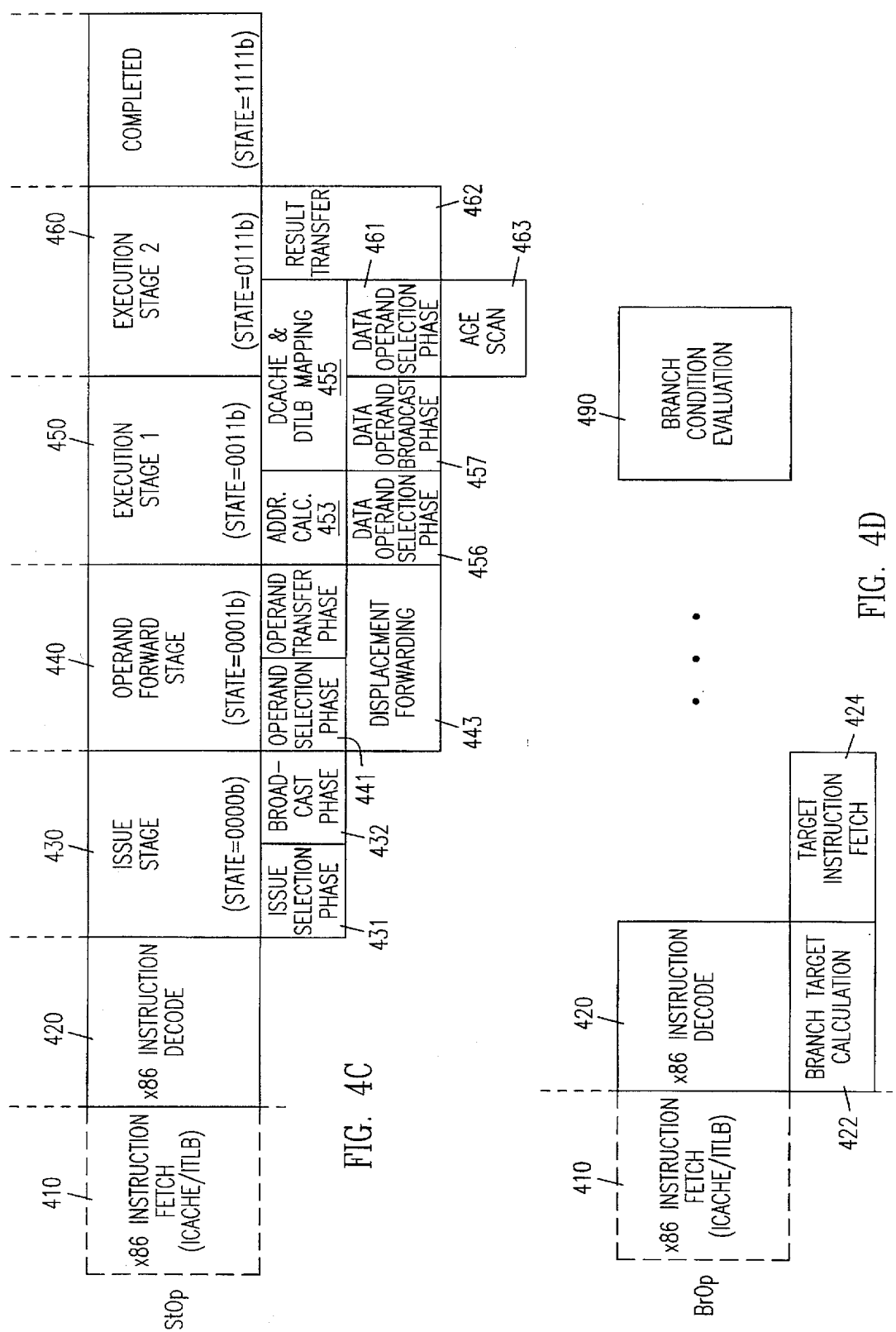

As shown in FIG. 4A, execution of RegOps can be completed in the next clock cycle which is execution stage 450. FIGS. 4B and 4C show that LdOps and StOps require more time for two execution stages 450 and 460. Upon completion of an operation, scheduler 280 receives results which are speculative and are only committed when it is safe to do so. Following or just as an operation completes, the operations results can be committed and the operation can be retired by shifting the op quad containing the operation out of scheduler 280.

FIG. 4D illustrate handling of BrOps. When instruction decoder 240 decodes a CISC instruction that generates a BrOp, decoder 240 determines a new program counter for the next CISC instruction to be decoded. For unconditional branches, there is no uncertainty in the new program counter, and decoder 240 completes the unconditional branch by changing the program counter. Parallel adders are provided in instruction decoder 240 for fast addition of an offset and the old program counter value to calculate the new program counter value. Instruction decoder 240 also includes a 16-entry return address stack for prediction of instruction addresses after return instructions.

For conditional branches, decoder 240 predicts the program counter value following a conditional branch, and inserts a BRCOND in an op quad loaded into scheduler 280. In the exemplary embodiment, the branch prediction is a branch correlation process which sometimes referred to in the art as two-level branch prediction. U.S. Pat. No. 5,454,117, entitled "Configurable Branch Prediction for a Processor Performing Speculative Execution," describes an example branch correlation process which may be used. The branch correlation predicts the address of the instruction executed after a branch instruction.

Branch prediction logic 248 in instruction decoder 240 uses a 8,192-entry branch history table (BHT) where each BHT entry contains the standard two history bits indicating tendency for the branch to be taken or not taken. The entries are indexed using a combination of four bits from the program counter (PC) and nine bits of global branch history so that whether a branch is taken or not is predicted not only from the address of the branch but also from the path which program execution took in reaching the branch. This provides a better branch prediction which reduces the chance of having to flush scheduler 280 as described below.

If the predicted or changed program counter hits in a 16-entry branch target cache of decoder 240, the next CISC instruction is ready for decoding by the end of x86 instruction decode stage 420. Otherwise, a clock cycle 424 is required to fetch the next CISC instruction for decoding.

Like all other operations, conditional branch operations (BRCONDs) loaded into scheduler 280 shift toward the bottom of scheduler 280 as older operation are retired, but no issue selection scan is used for BRCONDs. A BRCOND enters branch condition evaluation stage 464 when the BRCOND reaches row 4 of scheduler 280. Branch evaluation unit 257 can evaluate one BRCOND per cycle provided that the condition codes (cc) required for each BRCOND are valid. Branch evaluation unit 257 determines the correct program counter following the BRCOND and whether the BRCOND in was correctly predicted. The required condition codes are likely to be valid because older operations (those in rows 4 and 5) are likely to have been completed. If the required condition codes are not yet valid, the BRCOND is held up by preventing the Op quad from shifting out of row 4. When a BRCOND is held up, Op quads above row 4 are prevented from shifting unless one or more of rows 0 to 3 is an empty (i.e. invalid) Op quad. If each rows 0 to 3 contains an Op quads, instruction decoder 240 cannot load new Op quads into scheduler 280 while the BRCOND is held up.

If a branch was correctly predicted, fetching, decoding, and executing operations continue without interruption. If the branch was incorrectly predicted, the correct instruction address following the BRCOND is transmitted to decoder 240, scheduler 280 is flushed when the mispredicted BRCOND is retired. Flushed by setting fields in entries to values which prevent issue of operations or commitment of the results of speculatively executed operations but allow the operations to be retired from scheduler 280 upon reaching Op quad 5. Execution and commitment of operations older than the mispredicted BRCOND continues. The new op quads from the correct address following the BRCOND are loaded into the top of scheduler 280 as Op quads are retired from the bottom of scheduler 280.

Execution engine 250 executes abortable and non-abortable operations. Non-abortable operations cannot be speculatively executed and are only executed when the results can be safely committed. Abortable operations are speculatively executed. After an abortable operation reaches the final stage of its pipeline and is completed, any result from the execution is stored in scheduler 280 until operation commit unit 260 determines that committing the results is safe. Each cycle one Op quad (up to four operations) can be committed and retired from scheduler 280.

II. Scheduler

Figure 5:
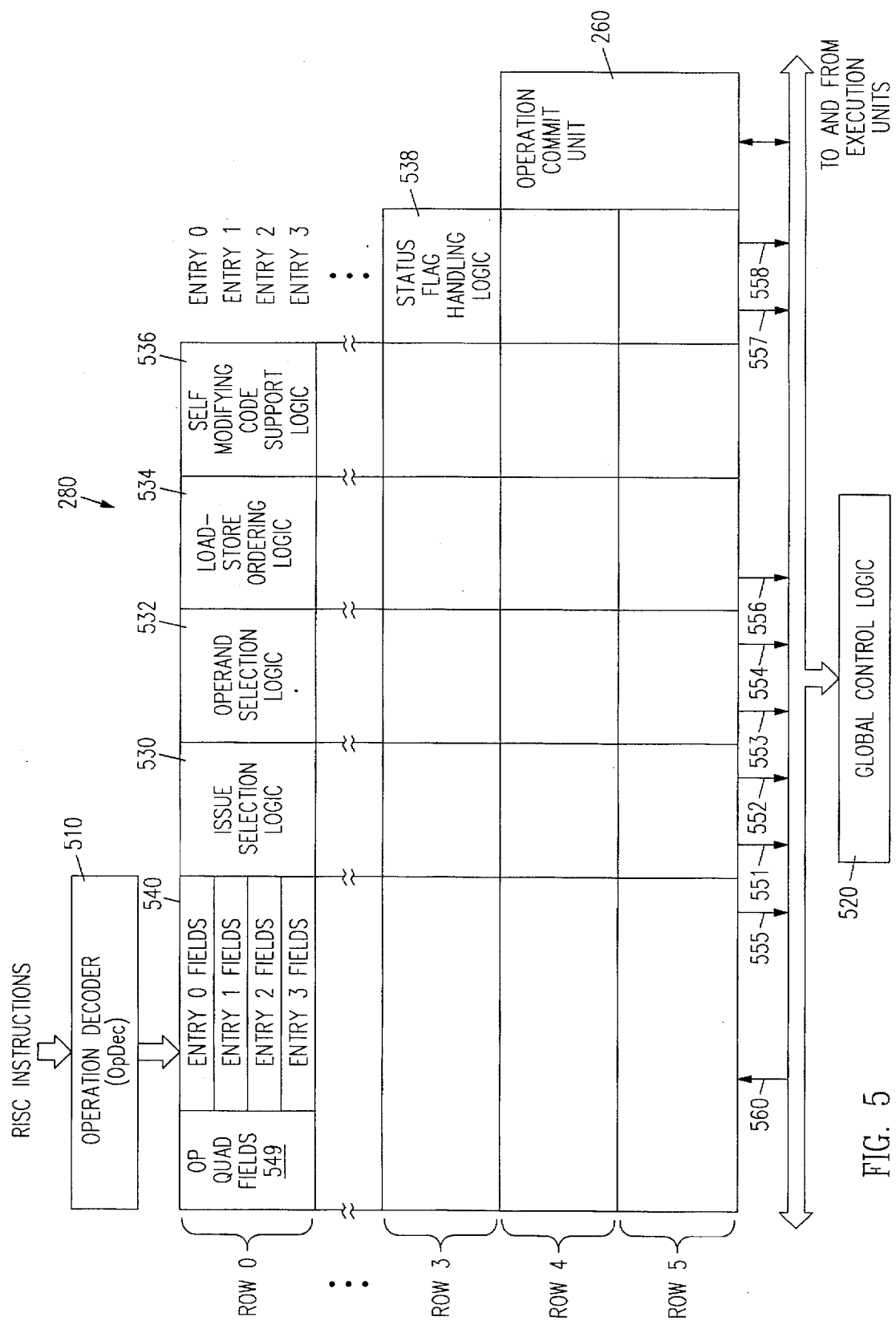
FIG. 5 shows a scheduler in accordance with an embodiment of the invention.
Figure 7:
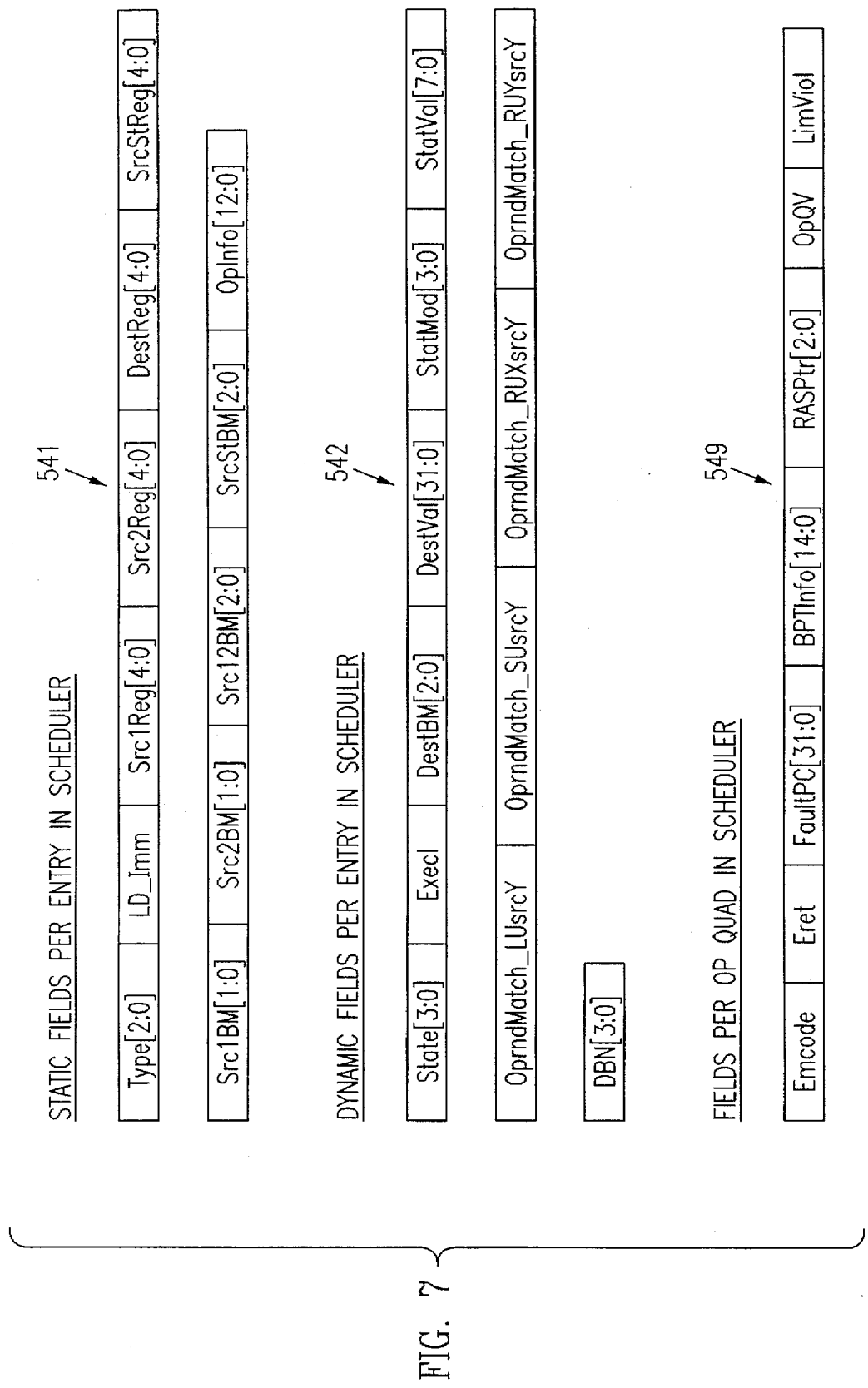
FIG. 7 illustrates an example format for fields for operations and Op Quads stored in a scheduler in accordance with FIG. 5.

FIG. 5 shows the exemplary embodiment where scheduler 280 contains 24 entries and may be associated with up to 24 operations. Each entry includes a set of storage elements (nominally flip-flops) in a scheduling reservoir 540 and portions of logic 530, 532, 534, 536, and 538 associated with the entry. The storage elements store information regarding an operation (Op) which is awaiting execution, being executed, or completed. An operation decoder 510 receives four RISC86® operations from instruction decoder 240 and loads or initializes a new Op quad in the top row of scheduler reservoir 540. The fields in reservoir 540 are shown in FIG. 7 and are related to but not identical to the fields of the associated RISC86® instructions shown in FIG. 3. Some fields retain the same value through out execution of the associated operation and are referred to herein as "static fields." Other fields are loaded or changed later such as when the operation completes execution and are referred to as "dynamic fields."

The storage elements in scheduling reservoir 540 can be loosely viewed as forming a shift register that is six rows deep. Each row contains four entries, each associated with a RISC86® instruction. Each clock cycle, an Op quad that is not held up in a row shifts down to the next row if the next row is empty or contains an Op quad that is also shifting downward.

The Op quad in the bottom row (row 5) shifts out of scheduler 280 if all operations associated with the bottom row have been committed.

Figure 6:
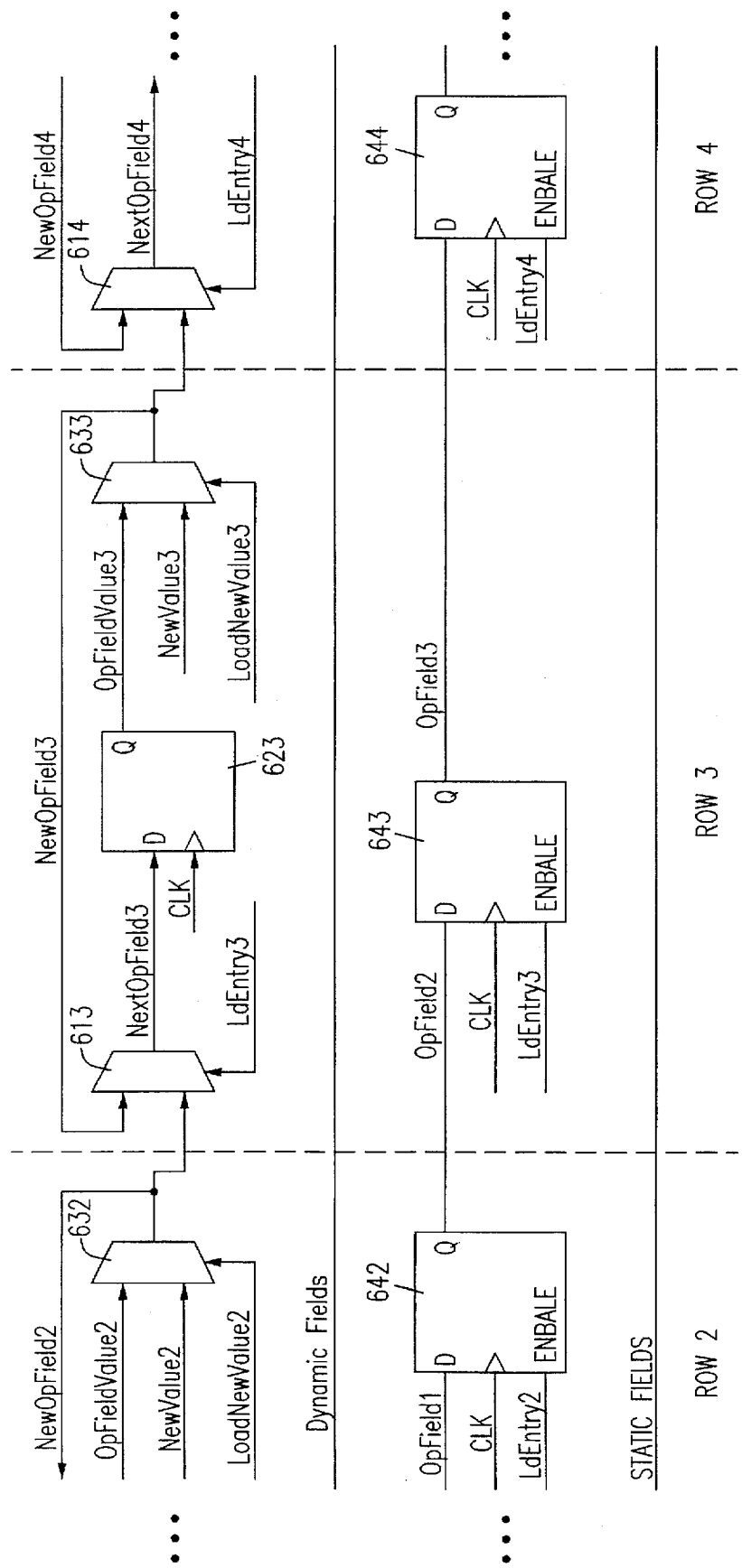
FIG. 6 shows a circuit diagram of a portion of a scheduler reservoir in accordance with an embodiment of the invention.

FIG. 6 shows an embodiment of a portion of scheduling reservoir 540. The portion of scheduling reservoir 540 shown in FIG. 6 includes a storage element (edge triggered flip-flop 623) for a dynamic field in row 3 and a storage element (edge triggered flip-flop 643) for a static field in row 3. Additional storage elements for each bit in the dynamic and static fields of row 3 as shown in FIG. 6 and described below. The other rows in scheduling reservoir 540 are similar or identical to row 3 and are connected in series with row 3 to form scheduling reservoir 540.

In FIG. 6, flip-flops 642, 643, and 644 store a bit of the same static field in respective rows 2, 3, and 4; and a bit value associated with an Op quad shift from flip-flop 642 to flip-flop 644 as the Op quad shifts from row 2 to row 4. Global control logic 520 generates signals LdEntry[i], one for each row, which control whether shifts to the corresponding rows occur and the rows are overwritten at the rising edge of clock signal CLK. For example, a signal LdEntry3 either enables or disables flip-flop 643, and a signal LdEntry4 either enables or disables flip-flop 644. Accordingly, when an Op quad is held up in row 4, signal LdEntry4 is deasserted so that flip-flop 644 retains a value. The independence of signals LdEntry[i] allows filling of empty Op quads entries which may be above a held up Op quad. For example, if an Op quad is held up in row 4, signal LdEntry3 can be assert so that a value OpField2 from row 2 shifts into row 3 at the rising edge of clock signal CLK. (Empty rows may result if, for example, instruction decoder 240 is unable to provide an Op quad every cycle because of a branch target cache miss.) Table B.1 in Appendix B describes operation of circuitry implementing static fields.

Dynamic fields are more complicated than static fields because new data from outside scheduling reservoir 540 may be inserted into a dynamic field while shifting old data, and the new data must stay with the correct Op quad which may or may not shift to the next row. Signals OpFieldValue2 and OpFieldValue3 represent information associated with respective first and second Op quads in rows 2 and 3. Circuitry outside scheduler reservoir 540 generates signals NewValue2 and NewValue3 to change the information associated with the first and second Op quads respectively. Multiplexer 632 selects whether a new information signal NewOpField2 for the first Op quad changes to new value NewValue2 or stays equal to old value OpFieldValue2. Multiplexer 633 selects whether a new information signal NewOpField3 for the second Op quad changes to new value NewValue3 or stays equal to old value OpFieldValue3.

Whether information associate with the first Op quad changes or not, value NewOpField2 can be written into row 2 or written into row 3 at the rising edge of clock signal CLK. For the first Op quad to shift into row 3, signal LdEntry3 causes a multiplexer 613 to select signal NewOpValue2 as signal NextOpField3 which is written to flip-flop 623 at a rising edge of signal CLK. To prevent the first Op quad from shifting into row 3, signal LdEntry3 causes multiplexer 613 to select signal NewOpField3 which is written in flip-flop 23. Signal LdEntry4 and multiplexer 614 similarly select whether the second op quad is allowed to shift from row 3 into row 4 or new information NewOpField4 is written back into row 4. Table B.2 in Appendix B describes operation of circuitry implementing dynamic fields.

II. A Scheduler Loading

Instruction decoder 240 decodes macroinstructions and forms sets of four RISC86 instruction which are transmitted to scheduler 280 whenever row 0 (the top) of scheduler 280 is empty contains an Op quad that is shifting to row 1. Instruction decoding includes environment variable substitution for fields of emcode operations requiring such and the nulling of operations within emcode op quads which were jumped into the middle of. In scheduler 280, operation decoder 510 receives an Op quad from instruction decoder 240 and fills storage fields in the top row of scheduling reservoir 540. FIG. 7 illustrates an example of static entry fields 541, dynamic entry fields 542, and Op quad fields 549 in scheduler reservoir 540. The initial values of entry fields 541 and 542 depend on a corresponding RISC86 instruction. Operation decoder 510 modifies some fields from the RISC86 instructions based on other fields, derives new fields from existing ones, replaces some fields with physically different fields, and passes a few fields through unchanged. FIG. 3 and Appendix A indicate the RISC86 instruction format. Op quad fields are generated from information corresponding to the Op quad as a whole.

II. A.1 Static Entry Fields

In the exemplary embodiment, each entry contains static fields 541 which are defined as follows, where all signal are active high.

Field Type[2:0] specifies the type of operation associated with the entry. Possible types include: SpecOp; LdOp; StOp; StOp which references memory or generates a faultable address; RegOp executable only by register unit 253; and RegOp executable by either register unit 253 or 254. Multimedia unit 256 executes of selected types of RegOp which are related to multimedia applications. Floating point operations (FpOps) are a type of SpecOp executed by floating point unit 255. Table B.3 in Appendix B describes circuitry in operation decoder 510 which generates a value for field Type.

Field LD_Imm indicates whether the operation requires an immediate value from a preceding LIMMOp. The immediate value is a large displacement if the operation is a LdStOp that uses a large displacement (versus a small (8-bit) displacement held within field DestVal of the entry). For a RegOp, the immediate value is the second operand Src2. Table B.4 in Appendix B describes circuitry in operation decoder 510 which generates a value for field Ld_Imm.

Fields Src1Reg[4:0], Src2Reg[4:0], and SrcStReg[4:0] hold register numbers identifying registers which respectively hold the first source operand Src1, the second source operand Src2, and the store data operand of the operation. Tables B.5, B.6, and B.7 in Appendix B describe circuitry in operation decoder 510 which generates values for fields Src1Reg, Src2Reg, and SrcStReg.

Field DestReg[4:0] holds a register number identifying the destination register of the operation. Table B.8 in Appendix B describes circuitry in operation decoder 510 which generates a value for field DestReg.

Fields Src1BM[1:0], Src2BM[1:0], and Src12BM[2] indicate which bytes of operands Src1 and Src2 must to be valid for execution of the operation. By definition, Src1BM[2] and Src2BM[2] are equal to Src12BM[2]. Bits 2, 1, and 0 of Src1BM[1:0] and Src2BM[1:0], indicate bits [31:16], [15:8], and [7:0], respectively. Src12BM[2] provides bit 2 for both operands Src1 and Src2. Table B.9 in Appendix B describes circuitry in operation decoder 510 which generates values for fields Src1BM[1:0], Src2BM[1:0], and Src12BM[2].

Field SrcStBM[2:0] indicates which bytes of the store data operand are required for completion of a StOp. The bit correspondence is the same as for Src12BM. Table B.10 in Appendix B describes circuitry in operation decoder 510 which generates a value for field SrcStBM.

Field OpInfo[12:0] holds additional information which is needed only by the execution units or the operation commit unit (OCU) depending on whether the operation is executable. Field OpInfo has three possible field definitions, depending on whether the operation is a RegOp, a LdStOp, or a SpecOp. For a RegOp, field OpInfo contains a union of: 6 bits from the RISC86 Type field; 4 bits from the RISC86 Ext field; the RISC86 R1 field; and 2 bits indicating an effective data size DataSz for the operation. For a LdStOp, field OpInfo contains a union of: 4 bits from the RISC86 Type field; 2 bits from RISC86 ISF field; 4 bits from Op Seg field; 2 bits indicating the effective data size DataSz for the operation; and a bit AddrSz indicating the effective address size for the address calculation (32/16 bits). For a SpecOp, field OpInfo contains a union of: 4 bit forms the RISC86 Type field; and five bits from the RISC86 cc field. Table B.11 in Appendix B describes circuitry in operation decoder 510 which generates a value for field OpInfo.

II. A.2 Dynamic Entry Fields

Dynamic entry fields 542 are initialized by operation decoder 510 but can change during execution of operations. Typically, each entry contains logic for changing dynamic fields as required. The dynamic fields 542 for an entry in the exemplary embodiment are defined as follows.

Field State[3:0] indicates an operation's execution state with respect to the pipelines of FIGS. 4A to 4D. (S3,S2,S1, S0 are alternate signal names for State[3:0].) Field State encodes five possible states by shifting a field of ones across four bits. Value b0000 indicates an "Unissued" state; b0001, b0011, and b0111 indicate an operation at operand forward stage, execution stage 1, and execution stage 2; and b1111 indicates an operation is "Completed". Most operations enter scheduler 280 with field State set to b0000, "unissued", and field State changes after the operation issues to a pipeline. Field State is updated (effectively shifted) when the operation issues or advances out a pipeline stage. Upon completion of the pipeline, field State is set to b1111 while the operation awaits being committed and retired. Field State of every entry is set to b1111 during abort cycles. Some operations (e.g. LDK) have an initial state field value of 1111 and thus are already "completed" when loaded into scheduler 280. Table B.12 in Appendix B describes circuitry in operation decoder 510 which initializes field State and circuitry in the entries of scheduler 280 which modifies field State during execution of the associated operation.

Field Exec1 indicates RUX (not RUY) is executing the operation and is set when the operation has successfully been issued execution unit 253. Table B.13 shows the logic which sets and changes field Exec1.

Field DestBM[2:0] holds byte marks indicating which bytes of in the register indicated by field DestReg the operation modifies. Bits [2,1,0] correspond to DestReg [31:16], DestReg[15:8], and DestReg[7:0] respectively. Field DestBM is initialized by operation decoder 510 and may be cleared during an abort cycle. Logic associated with field DestBM is described in Table B.14 of Appendix B.

Field DestVal[31:0] holds results from execution of the operation, to be committed to DestReg. DestBM indicates which bytes are valid after operation execution. Field DestVal is loaded when the operation completes execution stage 1 or 2 (depending on the type of operation); for non-executed Ops (e.g. LDK), DestVal is initialized with the appropriate result value. Field DestVal can be used for temporary storage before results are stored when an operation is completed. In the exemplary embodiment, field DestVal initially holds immediate and displacement values for RegOps and LdStOps respectively, and the alternate (sequential or target) branch program counter value for a BRCOND. Logic associated with field DestVal is described in Table B.15 of Appendix B.

Field StatMod[3:0] holds status group marks indicating which groups of status flags an operation modifies. Bits 3, 2, 1, 0 respectively correspond to flag bit groups {EZF,ECF}, OF, {SF,ZF,AF,PF}, and CF where flags bits EZF, ECF, OF, SF, AF, PF, and CF may be modified by RegOps. Field StatMod is all zeroes for non-RegOps and is cleared during abort cycles. Logic associated with field DestVal is described in Table B.16 of Appendix B.

Field StatVal[7:0] holds the operation's status result value which is to be committed to EFlags. StatMod indicates which flag groups are affected after execution. StatVal is significant only for RegOps; this is reflected by StatMod. StatVal is loaded when the RegOp completes execution stage 1. Logic associated with field StatVal is described in Table B.17 in Appendix B.

Fields OprndMatch_XXsrcY where "XX" is LU, SU, RUX, or RUY and "Y" is 1 or 2 are additional storage elements for transient information that is passed between two pipeline stages in contrast to information of more global significance. Table B.18 in Appendix B describes logic which controls fields OprndMatch_XXsrcY.

Field DBN[3:0] holds four Bn (n=0–3) data breakpoint status bits for a LdStOp. This field is initially all zeroes, then, when the associated LdStOp executes, breakpoint bits from the appropriate unit are recorded for later trapping. Table B.19 in Appendix B describes logic associated with field DBN[3:0].

II.A.3 Op Quad Fields

Each row in scheduler 280 contains four entries plus Op quad fields 549 associated with the Op quad as a whole. The following enumerates the additional Op quad fields 549 shown in FIG. 7. Operation decoder 510 initializes Op quad fields. Most of the Op quad fields are static. Some Op quad fields are dynamic, and logic in each row of scheduler 280 changes the dynamic Op quad field as required.

Field Emcode indicates whether the Op quad is from emcode from vector decoder 244. Table B.20 describes setting of field Emcode.

Field Eret indicates whether this is an emcode Op quad and that is marked as the last Op quad in a series of Op quads representing a complex macroinstruction. Table B.21 describes logic which sets field Eret.

Field FaultPC[31:0] holds the logical macroinstruction fault program counter value associated with the first operations in the row. Operation commit unit (OCU) 260 uses field FaultPC when handling fault exceptions. Table B.22 describes logic which sets field FaultPC.

Field BPTInfo[14:0] holds branch prediction table-related information from when the Op quad was generated. Field BPTInfo is defined only for MacDec-generated Op quads which contain a BRCOND. Table B.23 describes logic which sets field BPTInfo.

Field RASPtr[2:0] holds a pointer to the top of the return address stack as of when the Op quad was generated. Field RASPtr is defined only for MacDec-generated Op quads which contain a BRCOND. Table B.24 describes logic which sets field RASPtr.

Field LimViol indicates that the Op quad is the decode of a transfer control instruction for which a code segment limit violation was detected on the target address. For most rows, field LimViol is static. For the first row, this field is loaded as summarized in Table B.25 in Appendix B.

Field OpQV indicates whether the row contains a valid Op quad and global logic 520 use field OpQV when controlling the shifting of Op quads. Invalid Op quads may be overwritten if an Op quad lower in scheduler 280 is held up. Fields in a row containing an "invalid" Op quad have the same values as an aborted Op quad, and an Op quad can become invalid as a result of an abort. Table B.26 of Appendix B describes logic controlling field OpQV.

Fields Op1I, Op2I, and Op3I hold a count (1, 2, or 3) of the number of macroinstructions represented by an Op Quad and are used to count retired instructions.

Fields Ilen0 and Ilen1 hold lengths in bytes of the first and (if present) second macroinstructions represented by the Op Quad are used to determine the instruction address at which a fault occurred.

Fields Smc1stAddr, Smc1stPg, Smc2ndAddr, and Smc2ndPg hold the first and (if instructions from more than one page are in the Op quad) second addresses covered by operations in the op quad and are used to detect self-modifying code.

II.B Load/Shift Control

As described earlier, scheduler 280 manages 24 entries as a shift register (or FIFO buffer) containing six rows. Scheduler 280 is not as rigid as a shift register in that each row has an independent shift control (actually a load control signal LdEntry[i]). An Op quad can shift down to the next row (and the preceding Op quad can shift down into this row from above) as long as the next row is empty or being emptied. Op quads always shift down into higher numbered rows when space is available. Ideally each Op quad shifts down one row each clock cycle, at a clock cycle boundary.

For most operations, position in scheduler 280 is independent of pipeline stage for the operation. Accordingly, most operation can shift down in scheduler 280 even if held up in an execution pipeline. Two exceptions are operations that depend on status flags and any operation in the bottom row of scheduler 280. An operation which depends on status flags have a stage which must be executed when the operation is in particular rows of scheduler 280 and thus inhibit shifting of row 3 or 4 until the stage is completed. Operation in row 5 inhibit shifting of (or retirement of an Op quad from) row 5 until all operations in row 5 are completed and committed.

Table B.27 in Appendix B describes circuitry in global control logic 520 which generates signals LdEntry0 to LdEntry5 which controls shifting in scheduler 280 and signals SchedFull and SchedEmpty which indicate whether scheduler 280 can accept a new Op quad at the end of the current cycle.

III. Operation Execution

Physically, scheduling reservoir 540 is a storage structure which holds a state values for operations. In addition to reservoir 540 is logic which operates on the state values during operation execution. From a control perspective, scheduler 280 is a pipelined data path which generates control information for execution of operations through the processing pipelines and handles results from the execution. Scheduler storage and state changes are synchronous with the system clock, i.e. all state changes in scheduler 280 are on the rising edge of the system clock so that all storage elements in scheduler 280 (at least logically) are edge-triggered flip-flops such as described in regard to FIG. 6. From a logical perspective, all state sequencing within scheduler 280 is single cycle in nature. State transition decisions are made each cycle based on the machine state during the cycle.

The structure of scheduler 280 reflects the pipelined nature of operations execution. Logic in scheduler 280 (and correspondingly each entry) can be divided into many distinct, largely independent chunks of logic, each of which is directly associated with a specific processing stage of a given type of operation or execution pipeline. From the perspective of a particular processing pipeline, a chunk of scheduler logic associated with each stage provides key control information for the processing done in that stage and/or for determining when that stage can successfully complete. From the perspective of a given stage as viewed across all processing pipelines (at least for the first couple of stages), very similar chunks of logic perform the same function for each pipeline or for each operation source operand of each pipeline.

FIGS. 4A to 4D show pipeline timing for four types of operation. For these types, an operation is loaded into scheduler 280 after instruction decode stage 420. A BrOp is completed in branch evaluation stage 490 which occurs when the BrOp reaches row 4 of scheduler 280. RegOps, StOps, and LdOps go through a three or four stage pipeline, and correspondingly transitions between four or five states. Field State[3:0] within an scheduler entry tracks or represents the stage of the operation associated with the entry.

Op issue stage 430 and operand forward stage 440 of FIGS. 4A and 4C are common to all For RegOps, LdOps, and StOps and are described below.

Following operand forward stage 430 are the execution stages. RegOps have just one execution stage 450 because all RegOps execute in a single cycle. Further, once a RegOp enters execution stage 450, it always successfully completes and exits stage 450 at the end of that clock cycle. LdOps and StOps have two execution stages 450 and 460, during which address calculation 453, segment and page translation (and protection checking) and data cache mapping 455, and results transfer 462 take place. Unlike RegOps, LdOps and StOps can be held for arbitrary periods in either stage 450 or 460. Most hold ups of LdOps (most notably data cache and data translation lookaside buffer (DTLB) misses and faults) apply to the last stage 460. Hold ups in stage 450 stem from misaligned memory references and from stage 460 being occupied and blocked by an operation not advancing to completion.

Scheduler 280 controls pipelines created by the execution engines such as load unit 251, store unit 252, register units 253 and 254, floating point unit 255, and multimedia unit 256. The exemplary embodiment of the invention includes register units 253 and 254, load unit 251, and store unit 252. Application of aspects of the invention to processors having more or fewer execution units will be apparent in view of this disclosure. For example, in an embodiment containing multimedia unit 256, multimedia unit 256 can be logically considered as part of the first register unit 253 so that operations for multimedia unit 256 are issued, operands are forwarded, and results are transferred using circuitry used for register unit 253. Floating point unit (FPU) 255 can be implemented with its own independent register file and commit units; and after scheduler 280 issues an FpOp and forwards operands to FPU 255, FPU 255 returns a signal which indicates that the operation is complete. OCU 260 committing the FpOp from scheduler 280 does not change anything so that FPU 255 can assert the complete signal long before the FpOp is actually committed or completed.

Each of register units 253 and 254 provides a pipeline referred to as an RU pipeline or as RUX or RUY pipeline to distinguish register unit 253 from register unit 254. Each RU pipeline has three stages referred to as issue stage 430, operand forward stage 440, and execution stage 450. Load unit 251 and store unit 252 respectively provide LU and SU pipelines which have four stages issue stage 430, operand forward stage 440, and execution stages 450 and 460. As described above, the State field represents five states of an operation using "shifting/increasing field of ones" encoding to indicate the current pipeline stage of the associated operation or indicate that the operation has completed its pipeline.

Scheduler 280 has primary control of issue stages 430 and operand forward stages 440. Processing within issue and operand forward stages 430 and 440 is broken down into two phases per stage, the phases nominally occurring during the first and second halves of the system clock cycle. Issue stage 430 includes an issue selection phase 431 and a broadcast phase 432. Operand forward stage 440 includes an operand selection phase 441 and an operand transfer phase 442.

During issue selection phase 431, scheduler 280 selects the next operations to enter each of the pipelines. In the exemplary embodiment, for example, four operation selections occur at once for the LU, SU, RUX, and RUY pipelines. During broadcast phase 432, information about the operands of each selected operation is broadcast to all scheduler entries and to external logic.

During operand selection phase 441, scheduler 280 uses the information from broadcast phase 432 to locate operands (up to 2*"the number of execution units" operands), the sources of which may be register file 290, scheduling reservoir 540, or an execution unit 251, 252, 253, or 254. Scheduling reservoir 540 contains fields for immediate values, results which have not been committed, and information for operations preceding in program order but not completed. An execution unit is the source of an operand if the execution is completing and operation which affects the required operand. Scheduler 280 also determines the status of each operand value, i.e. whether a valid value is in fact available from the designated source. Based on this information, scheduler 280 determines in operand forward stage 440 which of the operations advance into execution stage 450. Advancement is independent for each pipeline. Only explicit operand dependencies constrain the order with which operations are actually executed. Except for such dependencies, different types of operations are processed through their respective pipelines in arbitrary order with respect to other types of operations.

During operand transfer phase 442, scheduler 280 transfers operand values from the designated sources over operand busses 554 to execution units 251 to 254. As shown in FIG. 5, the exemplary embodiment has nine operand busses 554, eight of which provide operand values for operations in operand forward stage. Embodiments having more execution units, such as embodiments having a floating point unit 255, may have more operand busses. Operand transfer occurs regardless of whether operand values are valid. If an operand value is invalid, the associated operation does not advance to execution stage 450 so that the execution unit doesn't use the invalid operand.

Also during operand transfer phase 442 of LdOps and StOps, displacement forwarding 443 transfers displacement operand via displacement busses 555, to load unit 251 and store unit 252 (one to each unit). The displacement operands are 32-bit values from scheduler entries. Selection of source entries for displacements occurs during operand selection phase 441.

When a LdOp or a StOp enters execution stage 450, load and store units 251 and 252 latch associated displacement and operand values and holds them as long as operation remains in stage 450. Scheduler 280 has limited control of the pipeline execution stages 450 and 460. In stages 450 and 460, scheduler 280 keeps track of operations' states and captures resultant register and status values.

In addition to the four phase process for obtaining the source operands for operations starting execution, scheduler 280 performs a similar four phase process for obtaining the data operand for a StOp; but the data operand is obtained for the StOp in SU stage 460. The process for providing the store data is synchronized with stages 450 and 460 of the StOp and includes a selection phase 451 identifying the StOp in execution stage 450, a broadcast phase 452 transmitting information describing the source of a data operand, a data operand selection phase 461, and data operand transfer phase 462. In essence, store data operand is fetched in parallel with StOp execution; and the actual data value is obtained and transferred to store queue 270 upon completion of the StOp. This corresponds to the creation of a store queue entry for the StOp, based on the just produced data and physical address, as an operation exits stage 460. If a valid data operand is not available, the StOp is held up in stage 460.

Besides the chunks of scheduler logic 530 and 532 associated with operation issue and operand forwarding, entries include chunks of logic associated with ordering load and store operations. Just as some execution ordering must be maintained between operations due to register dependencies, a limited execution ordering is also maintained between LdOps and StOps due to memory dependencies (e.g. LdOps cannot freely execute ahead of older StOps). Above incorporated U.S. Pat. No. UNKNOWN5, describes a suitable system for ordering load and store operations. Load-store ordering applies to StOps which access memory and to StOps such as CIA (check instruction address) and CDA (check data address) operations which reference memory and/or generate faultable addresses but not to LEA (load effective address) operations. No LdOps are excluded since all LdOps reference memory.

The load-store ordering is enforced at stage 460 of the two execution pipelines where a LdOp or a StOp in stage 460 is held until completing the operation is safe. Up until stage 460, no ordering is maintained between the LU and SU pipelines. Further, LdStOps can generally complete out-of-order when memory independence is "proved" by partial address comparisons with older LdStOps. Store queue 270 performs address comparisons associated with dependency checking but requires scheduler support in determining the relative age of LdOps and StOps in the LU and SU execution pipes. This is necessary so that only the appropriate address comparisons are considered in determining whether a given LdOp or StOp is allowed to complete.

Load-store ordering logic 534 includes logic associated with the LU pipeline and logic associated with the SU pipeline. The logic associated with the LU pipeline determines the age of any LdOp in LU stage 460 relative to any StOps in SU stages 450 or 460, and any other StOps. Logic 534 generates three signals SC_SU2OLDER, SC_SU1OLDER, and SC_SU0OLDER on a bus 556 to indicate whether a StOP in SU stage 460, stage 450, or elsewhere is older than the LdOp in LU stage 460. The logic associated with SU pipeline determines the age of any StOp in SU stage 460 relative to any LdOps in LU stage 460 and any other LdOps and generates two signals SC_LU2OLDER and SC_LU1OLDER to indicate where LdOp in LU stage 460 and 450 are older than the StOp in stage 460. Further description of load/store ordering logic 534 is provided below and in above-incorporated U.S. Pat. No. UNKNOWN5.

In addition to logic associated with operation issue 530, register operand fetch 532, and LdOp-StOp ordering 534, scheduler 280 also includes status flag handling logic 538 associated with acquiring and using of status flag or condition code (cc) values. Three relatively independent areas of functionality are involved: fetching status flag values for status-dependent RegOps executed by register unit 253, fetching status flag values for and the resolution of BRCONDs by branch evaluation unit 257, and synchronizing non-abortable RegOps with preceding BRCONDs.

The RUX execution unit executes status-dependent ("cc-dep") RegOps and requires their status operand value at the same time as the register operand values, i.e. by the end of operand forward stage 440. CC-dep RegOps are not allowed to advance until reach row 3 and receiving valid condition codes. Unlike the fetching of register values, the status fetch process is not pipelined and occurs in one cycle, i.e. entirely during RUX operand forward stage. Further, some of the logic fetches up-to-date status flag values for both cc-dep RegOps and BRCONDs. For cc-dep RegOps, condition codes are passed to execution unit 253 while validity of the status values needed by the RegOp is checked. If valid values for all required status flags are not yet available, the RegOp is held up in operand forward stage (the same as for register operand values not yet available).

BRCONDs do not require any actual execution processing. Instead, while a BRCOND is outstanding (and before it reaches the bottom of scheduler 280), the BRCOND is resolved as correctly predicted or not. BRCONDs are resolved in order, at a rate of up to one BRCOND per cycle. When a BRCOND reaches row 4, status flag handling logic 538 checks to determine whether all older operations which could change the status flag values relevant to the BRCOND have been executed. If values for the required status flags are not yet available, resolution of the BRCOND is held up by inhibiting shifting of the Op quad containing the BRCOND. When the status flag values required for the next unresolved BRCOND are available, status flag handling logic 538 passes the status flag values to branch evaluation unit 257 which determines whether the condition code specified within the BRCOND was correctly predicted. If the BRCOND was incorrectly predicted, restart signals are asserted to start the instruction fetch and decode portions of instruction decoder 240 (FIG. 2) at the correct branch address. If the operation was correctly predicted, nothing happens other than BRCOND resolution advancing to the next BRCOND.

The resolution of BRCONDs is also significant to the execution of non-abortable RegOps. Execution of non-abortable RegOp results in changes that cannot be aborted or undone. Accordingly, non-abortable RegOps must be prevented from entering stage 450 until execution of the RegOp is safe. This synchronization requirement includes the need to wait until all preceding BRCONDs have been resolved and determined to have been correctly predicted. Consequently, while any preceding BRCOND remains unresolved or has been found to have been mispredicted, the non-abortable RegOp is held up in operand forward stage 440. If preceding BRCONDs were correctly predicted, the delay is temporary while if a preceding BRCOND was incorrectly predicted, the RegOp is held up until an eventual abort cycle flushes scheduler 280.

III.A Issue Stage

Scheduler 280 performs issue selection and broadcast phases 431 and 432 in parallel for each execution pipeline requiring an issue scan and operands. In the exemplary embodiment, issue stage operations are performed in parallel for load unit 251, store unit 252, register unit 253, and register unit 254.

III.A.1 Issue Selection Phase

Each cycle, scheduler 280 attempts to select an operation for issue to each unit capable of parallel execution. In the exemplary embodiment, scheduler 280 selects a LdOp, a StOp, and two RegOps to be issued to LU, SU, RUX, and RUY pipelines. For issue selection 431, scheduler 280 scans all entries in scheduling reservoir 540 "in order" from oldest to newest operations and selects operations for issue based on fields State and Type of the entries. Issue selection 431 does not consider register status or memory dependencies that operations may have on each other. This simplifies the issue selection process and allows issue selection phase 431 to be quickly completed for a relatively large reservoir 540.

Issue selection is simultaneous and independent for each of the four processing pipelines. For each pipeline LU, SU, and RUX, the next unissued operation (as indicated by its State field) which the pipeline can execute (as indicated by field Type) is selected. In other words, the next unissued LdOp is selected for load unit 251, the next unissued StOp is selected for store unit 252, and the next unissued RegOp is selected for register unit 253. For register unit 254, a RegOp following the RegOp selected for pipeline RUX is selected. Conceptually, the issue selection for pipeline RUY depends on issue selection for RUX; but physically, issue selection for RUY is performed in parallel with issue selection for RUX.

Each scheduler entry generates four bits (i.e. one bit for each pipeline) IssuableToxx which indicate whether the associated operation is currently eligible for issue selection to pipeline xx where xx is LU, SU, RUX, or RUY. The issue selection process for pipeline xx scans from the oldest scheduler entry to the newest scheduler entry searching for entries with bit IssuableToxx set. For pipelines LU, SU, and RUX, the first operation found with the desired bit LU, SU, or RU set is the one selected for issue to pipeline LU, SU, or RUX. Issue selection for pipeline RUY selects the first operation with RUY set, after the operation selected for pipeline RUX.

Operations are eligible for issue selection immediately upon being loaded into scheduler 280, i.e. an operation can be issued during its first cycle in scheduler 280. In such cases, only the Type bits and bit S0 need to be valid at the beginning of the cycle. All other fields in an entry can be generated as late as the end of issue selection phase 431 (i.e. up to one half cycle later) and only need to be valid within a scheduler entry for broadcast phase 432.

If an operation selected for issue does not advance into operand forward stage 440, the operation was not successfully issued. During the next clock cycle, that operation's State field indicates the operation is unissued, and the operation competes for issue and will probably be selected again.

III.A.1.a Issue Selection Scan Chains

In one embodiment of the invention, scheduler 280 scans the operations using scan chains formed from logic blocks associated with the entries. Each scan chain is similar to a carry chain such as used in some adders. In an issue selection scan chain for the load unit, the store unit, or register unit X, a "scan" bit Cin input to the oldest entry logically propagates through the scan chain until a logic block in one of the entries kills the scan bit. An entry kills the scan bit if the entry is associated with an operation of the desired type (i.e. IssuableToxx is asserted). To scan for an operation to be issued to register unit Y, a scan bit is logically generated by an entry associated with the operation to be issued to register unit X, and that scan bit propagates until killed by an entry associated with an operation issuable to register unit Y. The entry which kills the scan bit asserts a signal IssueOpToxx to identify itself as the entry associated with the operation to be issued to execution unit xx. The selected entry can thus take appropriate action as required for broadcast phase 431. If the scan bit Cxx propagates through all of the entries without being killed, no entry is associated with an operation that is issuable to unit xx, and no operation is selected for issue.

While a scan chain which requires a scan bit signal to propagate serially through every single entry in scheduler 280 is relatively simple, a faster implementation may be necessary. Look-ahead techniques analogous to those used in traditional Generate-Propagate-Kill carry chains can be applied.

One look-ahead technique combines entries into groups, and each group generates, propagates, or kills a scan bit. Look ahead is faster because group generate, propagate, and kill terms are determined in parallel from single-entry terms and whether a scan passes through a group can be determined without a signal propagating through every entry in the group. By successive combination of group terms, no scan bit signal propagation actually occurs because the entire scheduler reservoir forms a single group.

For the LU, SU, and RUX scan chains, the single-entry kill terms K are signals IssuableToXX. The generate terms G are all zero, and the propagate terms P are the complement of the associated K terms. Table B.28 indicates the single-entry terms for LU, SU, and RUX scan chains.

The RUY scan chain is more complex and uses four terms G, P, K, and O. The terms G, P, and K are analogous to the conventional generate, propagate, and kill terms. The O term is a signal that ensures that only one operation is selected. Single-entry generate term G for entry i is signal IssuableToRUX[i], and the term O is equal to the term G. Single-entry K term for entry i is signal IssuableToRUY, and the P terms are again the complement of the associated K terms.

Look-ahead techniques combine single-entry terms into group-level terms. The group level terms are generated and combined in parallel to determine which group kills the scan bit. Once the group containing the selected operation that kills the scan bit is identified, the particular entry within the group is identified. Table B.29 in Appendix B describes group terms Pgrp and Kgrp used in issue selection scan chains for pipelines LU, SU, and RUX.

Figure 8A:
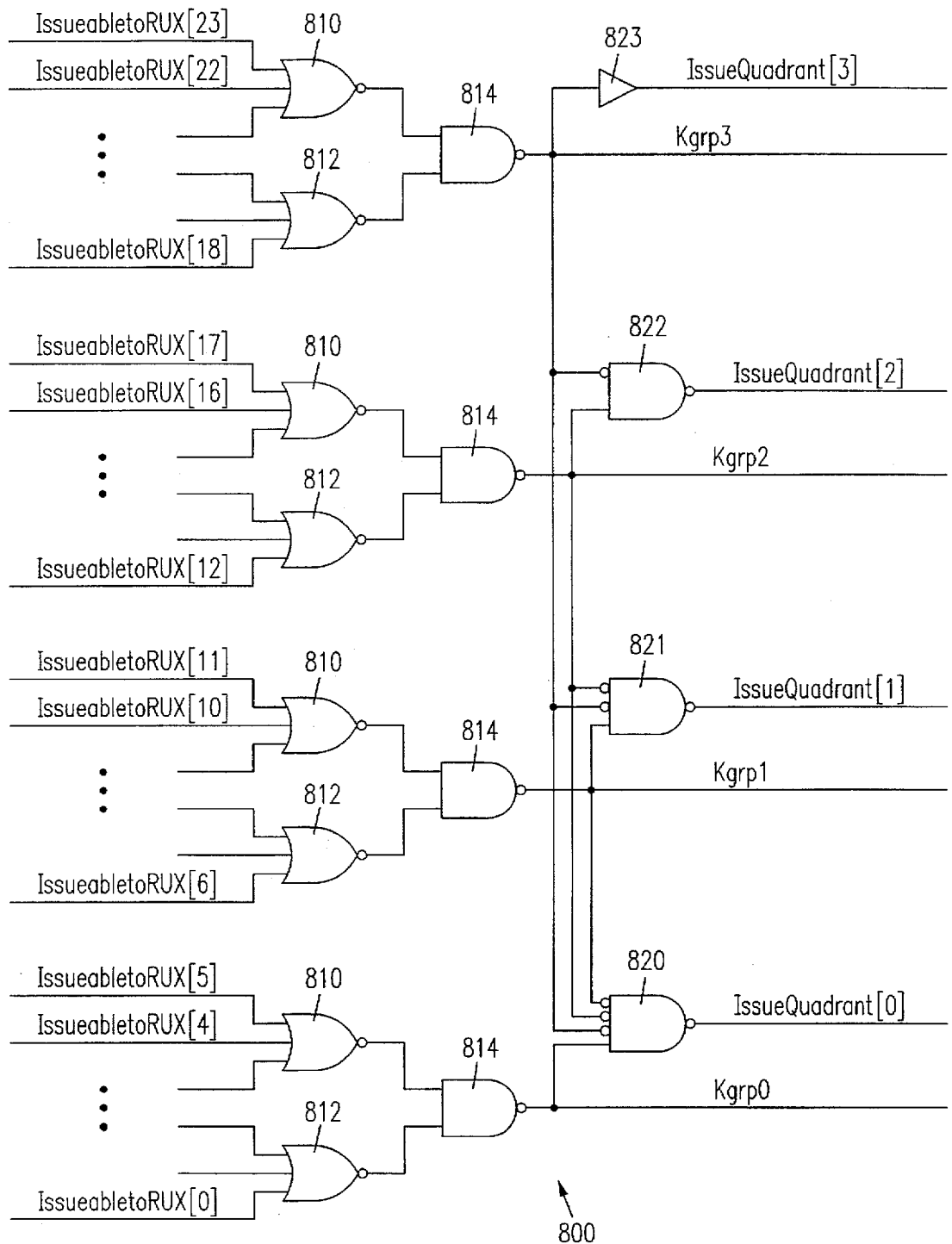
FIGS. 8A and 8B illustrate a scan chain using look-ahead for rapid selection.
Figure 8B:
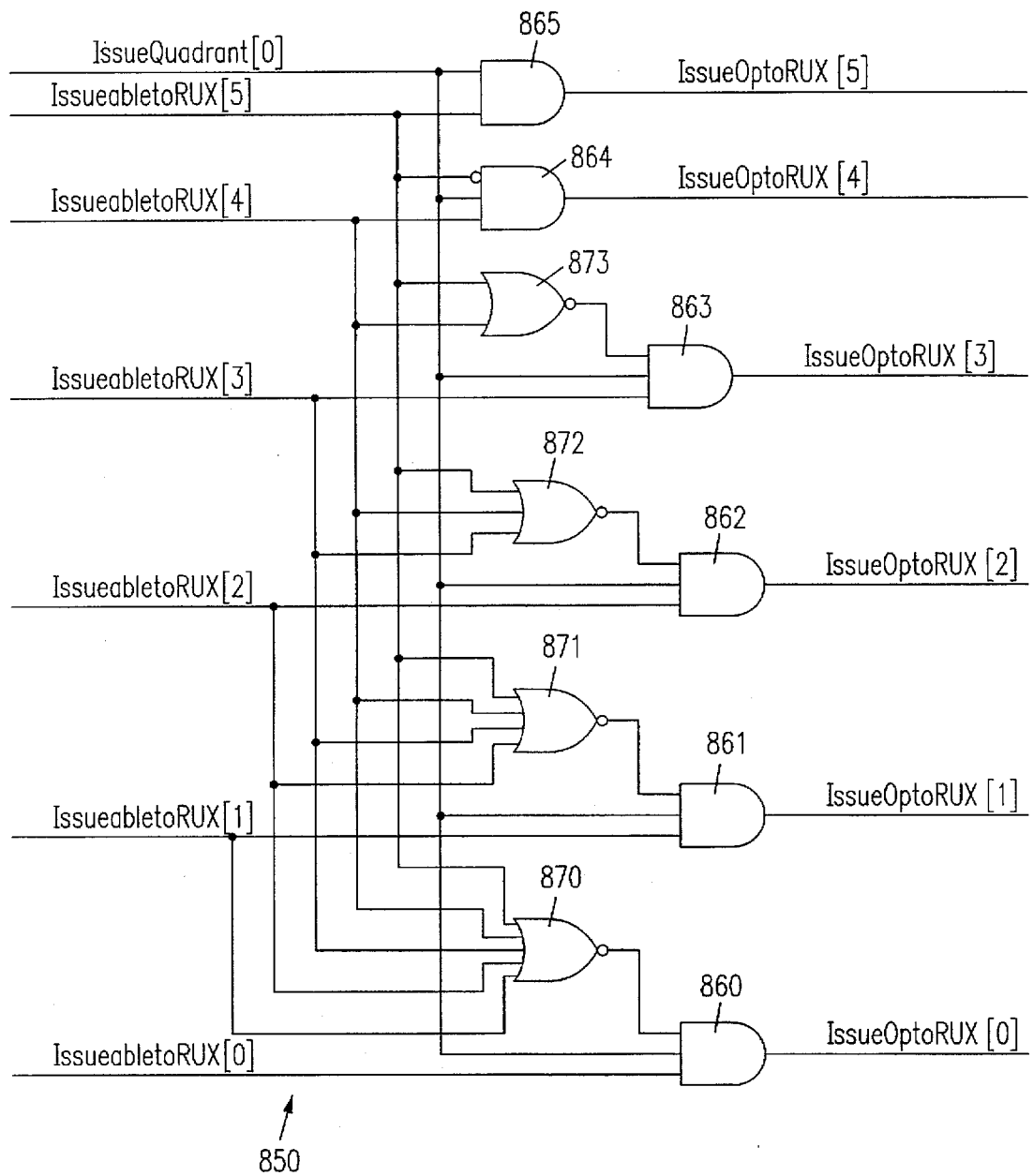

FIGS. 8A and 8B show logic 800 which implements a portion of a scan chain using look-ahead groups of six entries. Groups of more or fewer entries can be used, but six entries per group partitions 24 entries into four quadrants and reduces the number of wires used in processing the group terms. As shown FIG. 8A, each quadrant has associated NOR gates 810 and 812 and a NAND gate 814 which together act as a six-input OR gate and generate an inverted group kill signal Kgrp3, Kgrp2, Kgrp1, or Kgrp0 for quadrant 3, 2, 1, or 0. The inputs for NOR gates 810 and 812 are signals IssueableToRUX which are the single-entry kill terms for pipeline RUX. Scan chains for the pipelines LU and SU are identical, except that respective signals IssueableToLU and IssueableToSU are input in place of IssueableToRUX.

Issue selection scans are from the oldest to newest entries. Quadrant 3 contains the oldest entries. If signal Kgrp3 is assert, one of the operations in quadrant 3 would kill a scan bit and an operation from quadrant 3 should be issued. A buffer 823 asserts a delayed signal IssueQuadrant[3] to select quadrant 3. If signal Kgrp3 is not asserted, a scan bit can propagate through group 3, but an operation in quadrant 2, 1, or 0 may be selected. NAND gate 822 asserts signal IssueQuadrant[2] if signal Kgrp2 is asserted and signal Kgrp3 is not. Similarly, NAND gates 821 and 820 assert signals IssueQuadrant[1] and IssueQuadrant[0] respectively if the scan bit could propagate to quadrant 1 or 0 and the group kill signal Kgrp1 or Kgrp0 is asserted (i.e. the group would kill the scan bit). If none of the group kill signals Kgrp[3:0] are asserted, no operation is selected for issue.

FIG. 8B shows logic 850 which selects an operation from quadrant 0 if signal IssueQuadrant[0] is asserted. Each quadrant has a circuits similar to logic 850 which operate in parallel. Since entry 5 is the oldest entry in quadrant 0, entry 5 is selected if it issuable to pipeline RUX and quadrant 0 is selected for issue. AND gate 865 asserts signal IssueOpToRUX[5] to indicate entry 5 contains the selected operation, if IssueQuadrant[0] is asserted and IssuableToRUX[5] is asserted. AND gates 860 to 864 correspond to entries 0 to 4 and assert a respective bit in signal IssueOpToRUX[0:4] to identify the selected operation when that operation is issuable to RUX and no older operation in quadrant 0 is issuable to RUX. NOR gates 870 to 873 assert signals to respective NAND gates 860 to 863 to indicate none of the older entries are issuable to RUX.

As an alternative to circuits 800 and 850, any logic which implements the equations of Table B.29 in Appendix B can be employed.

Logic 800 of FIG. 8A generates signal IssueQuadrant[3:0] after three gate delays from input of signal IssueableToRUX[23:0] even if the selected entry is in quadrant 0, the last quadrant searched. Logic 850 of FIG. 8B generates signal IssueOpToRUX after about two more gate delays. Without using look-ahead techniques, a scan bit must propagate through the entire scheduler when no operation is selected. This is at about 24 or more gates delays for the exemplary embodiment. Accordingly, look-ahead scan chains are typically much faster than serial scan chains where a scan bit propagates through every entry.

III.A.1.b Issue Selection Scan Chain for RUY

Look-ahead techniques can also be employed in issue selection for pipeline RUY. Conceptually, for the RUY scan chain, a scan bit is generated by the entry containing an operation selected for issue to RUX and is killed by the next newer operation that is issuable to pipeline RUY. A group generates an output scan bit if an entry in the group generates the scan bit and no following entry in the group kills the scan. A group propagates a scan bit if each entry in the group propagates the scan bit. An O term once generated prevents newer entries from generating a new scan bit, and a group O term is generated if any entry in the group generates a single-entry O term. Equations in Table B.30 of Appendix B summarize the logic which generates group terms from single-entry terms in an RUY scan chain.

Figure 9A:
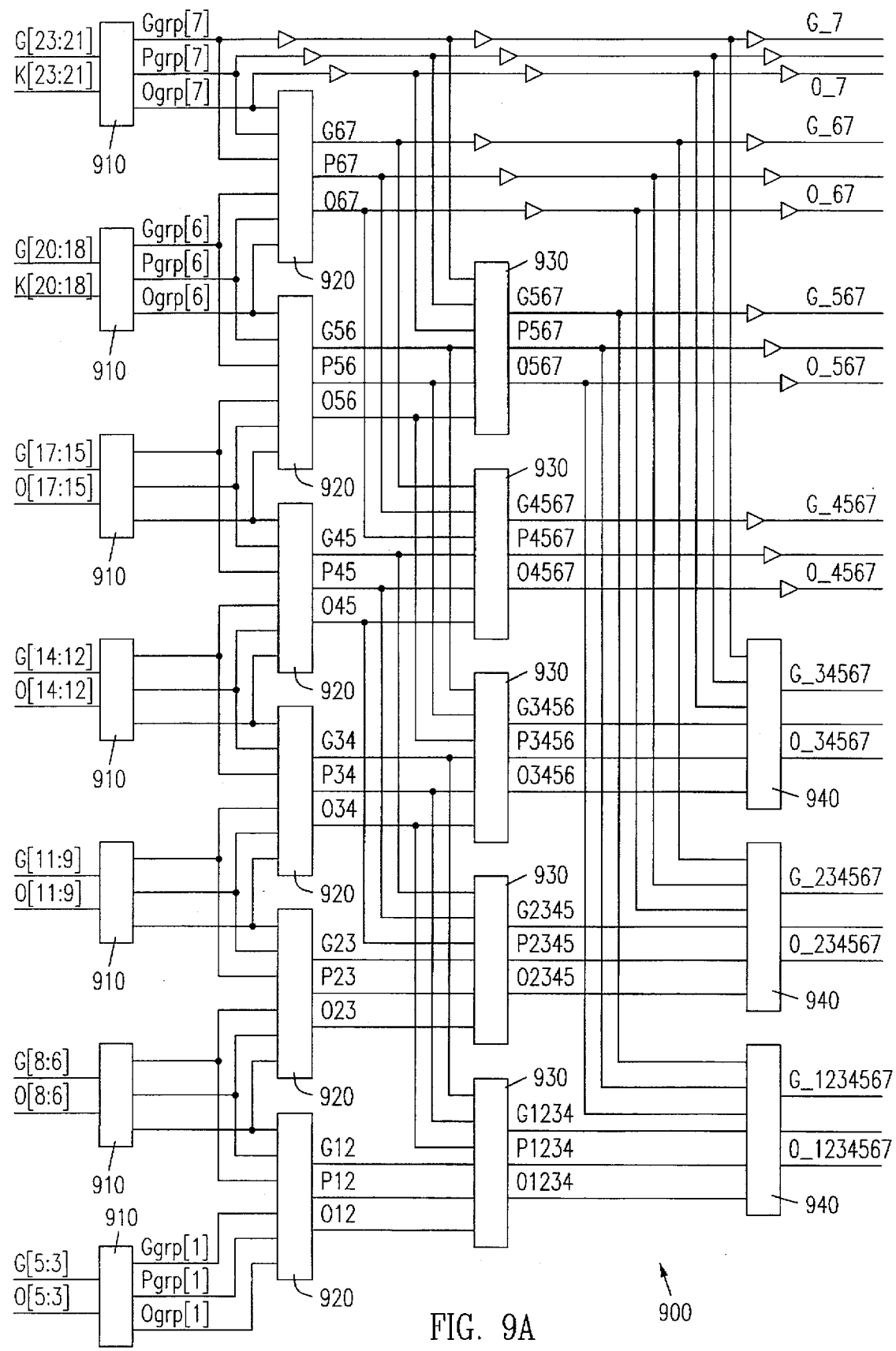
FIGS. 9A, 9B, and 9C illustrate a scan chain using look-ahead for rapid selection of an operation for a second execution unit.
Figure 9B:
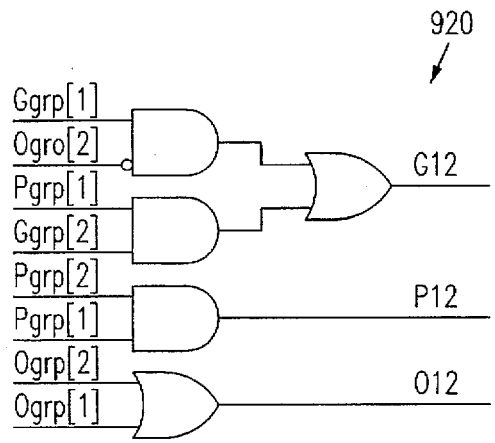
Figure 9C:
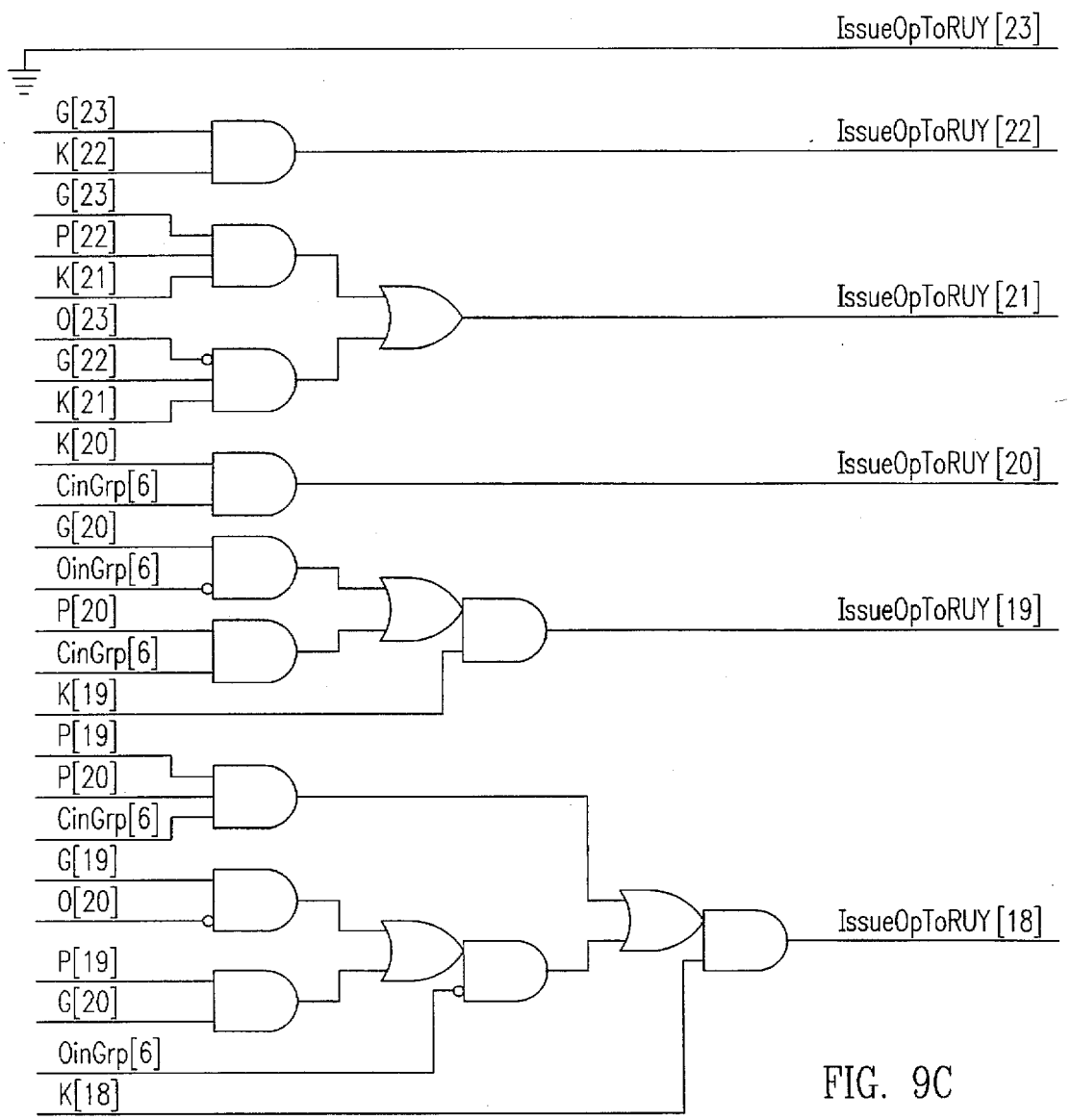

FIGS. 9A, 9B, and 9C illustrate an issue selection scan chain for pipeline RUY which partitions scheduler 280 into eight 3-bit groups. In FIG. 9A, logic blocks 910 generate group terms Ggrp[7:1], Pgrp[7:1], and Ogrp[7:1] from single-entry signals G[23:3] and O[23:3] by implementing the logic shown Table B.30. Group terms for the newest group, entries 0 to 2, is not required for reasons described below. The group terms are combined in three stages to form terms for larger groups. Circuitry 900 generates group terms such as generate terms G_7, G_67, G_567, G_4567, G_34567, G_234567, and G_1234567 for groups including groups which contain the oldest three, six, nine, twelve, fifteen, eighteen, and twenty one entries.

The first stage of circuitry 900, containing logic blocks 920, combines group terms from adjacent groups of three entries to generate group terms for groups of six entries. The second stage, containing logic blocks 930, combines group terms from adjacent groups of either six or three entries to generate group terms for a group of nine or twelve entries. The third stage, containing logic blocks 940, combines group terms from adjacent groups of twelve, six, or three entries to generate group terms for groups of twenty one, eighteen, and fifteen entries.

Logic blocks 920, 930, and 940 combine group terms GX, PX, and OX for a group X with group terms GY, PY, and OY for the next newer group Y to generate terms GXY, PXY, and OXY for a group XY that is the concatenation of groups X and Y. In one embodiment of the invention, each of blocks 920, 930, and 940 implements following equations.

$$GXY = GX \cdot PY + OX \cdot GY$$

$$PXY = PX \cdot PY$$

$$OXY = OX + OY$$

The circuit shown in FIG. 9B shows an exemplary implement blocks 920, 930, and 940. In FIG. 9B, input signals are for groups 1 and 2 and output signals are for the union of group 1 and 2 but any desired groups can replace groups 1 and 2. Alternatively, other equivalent logic may be employed or alternate stages, blocks 920 and 930 or blocks 930 and 940, can be implemented with inverting logic. Additionally, as described below, propagate terms from the last stage, blocks 940, are not required, and block 940 can be simplified by not implementing the propagate equations.

The desired output signals from circuit 900 are G terms and O terms. Output signals G_7, G_67, G_567, G_4567, G_34567, G_234567, and G_1234567 indicate whether a prior generated scan bit reaches group 6, 5, 4, 3, 2, 1, and 0 respectively and are also referred to herein as signals CinGrp[6:0]. Signals O_7, O_67, O_567, O_4567, O_34567, O_234567, and O_1234567 indicate whether a scan bit was generated prior to group 6, 5, 4, 3, 2, 1, and 0, respectively, regardless of whether the scan bit is killed before reaching the respective group. Signals O_7, O_67, O_567, O_4567, O_34567, O_234567, and O_1234567 are also referred to herein as signals OinGrp[6:0].

A multi-bit signal IssueOpToRUY[23:0] can be generated from group signals CinGrp[6:0] and OinGrp[6:0] and single-entry signals P, K, G, and O indicated by the following equations. FIG. 9C shows logic which select entries for issue to the RUY execution unit. Logic which generates signals IssueOpToRUY[23:21] entries 23 to 21, differs from logic for the other groups because there is no group propagation into group 7, the oldest group. Logic shown generating IssueOpToRUY[20:18] for group 6 is repeated for each group 5 to 0. As in Table B.31 of Appendix B, group propagate terms from the final group 0 are not required for selection of an operation for issue.

III.A.2 Operand Information Broadcast Phase

During the broadcast phase of the issue stage of the processing pipelines, information about operands for operations issued to the execution units is broadcast to all scheduler entries and to external logic. This information describes two source operands for each selected operation. The entry for the selected operations also transmits information about the selected operations to external logic and the associated execution unit.

Operand information busses 552 (FIG. 5) run through scheduler 280. The number of operand information busses 552 matches the maximum number of operands which may be required by the execution units. An entry associated with a selected operation drives two operand information busses 552 which are associated with the execution unit to which the associated will issue. Each operand information bus 552 is eight bits wide and carries a five bit register number Src1Reg[4:0] or Src2Reg[4:0] and a three byte marks Src1BM[2:0] or Src2BM[2:0] for a source operand. Table B.31 describes the entry logic drives operand information busses 552.

Comparison logic within each entry compares broadcast operand information to similar information concerning a destination register for the operation in the entry making the comparison. The comparison logic checks for matching register numbers and for overlapping byte marks (i.e. some or all of the bytes required for an operand are or will be modified by the operation). The results of multiple ("# of operand information busses" * "# of entries") comparisons are signals that control actions occurring during the next processing phase, operand selection phase 441. Table B.32 describes logic which performs the comparisons. The following equation summarizes a generic comparison:

OprndMatch_XXsrcY=(busReg[4:0]==DestReg[4:0]) && (busBM [1] DestBM[1]+busBM[0] DestBM[1])

where "XXsrcY" is one of LUsrc1, LUsrc2, SUsrc1, SUsrc2, RUXsrc1, RUXsrc2, RUYsrc1, and RUYsrc2 and "bus" refers to signal OprndInfo_XXsrcY which is on one of the operand information busses 552.

"Match" signals OprndMatch_XXsrcY that result from the comparisons are the product of the broadcast phase and are used in the operand selection. This is done concurrently within each and every entry, i.e. within each entry, eight match signals are piped to the entry's operand selection logic 532. All the match signals remain local to each entry and are latched into registers for use in the following pipeline stage. In essence, within each entry, eight operand information bus comparators feed eight "control" signals to eight chunks of operand selection logic 532. The match signals within each entry within the bottom row are gated or masked by additional signals associated with the committing of these operations' register results to the architectural register file 290. See the description of operation commit unit 260 below.

Each entry does not actually control loading of match bits into operand match registers within the entry. Global logic 520 generates signal LUAdv0, SUAdv0, RUXAdv0, and RUYAdv0 which indicate whether an issued operation will advance into operand forward stage 440, and match signals are only latched and used if an operation will actually advance into operand forward stage 440.

Four operation information busses 551 corresponding to load unit 251, store unit 252, register unit 253, and register unit 254 provide additional information describing an operation issued. The additional information, namely the OpInfo field, is read out of scheduler 280 during the broadcast phase and latched into external pipeline registers if the operation will actually advance to operand forward stage. Table B.33 describes logic which generates the operation information signals.

The Src1/2Reg and Src1/2BM fields provided during broadcast phase are used for a number of purposes during the next two phases (i.e. during operand forward stage). The OpInfo fields are simply passed "down the pipe" to the corresponding execution units (via a second set of pipeline registers controlled by corresponding signal XXAdv1). For RUX and RUY operations, the associated Src1/2BM[0] bits are also passed "down the pipe" to the corresponding register unit.

III.B. Operand Forward Stage

The operand forward stage consists of an operand selection phase and an operand transfer phase.

III.B.1 Operand Selection Phase

Each cycle, in the operand forward stage, scheduler 280 uses match bits, which were generated by issue stage logic 530 and stored in operand match registers, to select entries which supply values for operands being "fetched". Scheduler 280 also determines for each operand whether the operand's value comes from a scheduler entry or register file 290. Register file 290 is the default if there was no matching entry. During the operand transfer phase, the selected entries and/or register file 290 drive operand values onto operand buses 554 and thus transfer operand values to the associated execution units.

As with the issue selection process in the issue stages, operand selections are independent and simultaneous. Thus, operand selection logic 532 contains eight scan chains for selecting entries to provide operands. Each entry has an operand match register bit for each operand bus and associated scan chain. Each scan chain searches for the newest entry with a match that is older than the entry containing the operation whose operand is being fetched. Logically, the scan starts (a scan bit is generated) from the entry containing the operation whose operand is being fetched and proceeds in the direction of older entries to the first entry with its operand match bit set. If an entry having a set match bit is found, that entry supplies the required operand value by driving of the associated operand bus 554 during the next phase. If no "matching" entry is found, a scan bit out from the scan chain causes the register file to supply the operand value.

If an operation whose operands are being fetched does not advance out of operand forward stage, then the operand selection process is performed again in the next cycle. An operation will not advance if, for example, an entry with match bit set does not modify (and therefore cannot supply) all bytes required for the operand. Since field State and the physical location of operations within scheduling reservoir 540 can change each cycle, the outcome of the new selection may be different from the current cycle's outcome. In essence, during each cycle, the selection process determines what needs to be done to forward appropriate operand values during that cycle.

The scan to find the appropriate source for an operand value can be performed in the same manner as the issue selection scans described above. However, the scan is in the direction of older operations which is opposite from the direction of the issue selection scans. Further, for operand selection, the scan chains are not "propagate-kill" chains. Operand selection scan chain are analogous to a traditional carry or "generate-propagate-kill" chain. The initial scan bit Cin into the scan chain is zero, and the entry corresponding to the operation whose operand is being fetched generates the scan bit. Scan kills occur at all entries with operand match bits set, and scan propagates occur at all other entries.

The entry with both a match bit set and an input scan bit Cin set is the selected entry. Global control logic 520 uses the final output scan bit Cout from the last/oldest entry to determine whether any entry was selected and thus whether register file 290 should instead be selected to provide the operand. If Cout is asserted, global control logic 520 selects register file 290. The selected source drives the corresponding operand bus during operand transfer phase which is the latter part of the operand forward stage. During the operand selection phase, the source register in register file 290 which nominally holds the desired operand value is read in case register file 290 is selected to drive the operand bus.

As with the issue selection scan chains, a look-ahead implementation improves speed. Table B.34 of Appendix B provides an example of an operand selection scan chain in terms of look-ahead equations similar to the traditional Generate-Propagate-Kill equations.

III.B.2 Operand Transfer phase

During operand transfer phase 442 of operand forward stage 440, values for each of the eight source operands are fetched and transmitted over operand buses 554 to input registers of the associated execution units. Operand values are 32-bit quantities, but some bytes may be undefined. During correct operation, an execution unit does not use undefined operand bytes. Any entry or register file 290 can drive each operand bus 554, and each entry of scheduling reservoir 540 can drive any and/or all of the buses.

In the exemplary embodiment, 192 operand selection signals and 8 scan chain signals Cout are generated during the operand selection phase. Based on these signals, logic in each selected entry enables the appropriate bus drivers in the entry. If for any operand none of the entries is selected, register file 290 enables drivers for that operand. Table B.35 in Appendix B describes logic for enabling driver for operand busses 554.

Operand registers in execution units 251 to 254 capture the operand values from operand buses 554 for use in subsequent pipeline stages. Global control logic 520 generates control signals, one per processing pipeline, to control the loading of the operand registers. New operand values are loaded into an execution unit if an operation in operand forward stage can advance into execution stage 450. Global signal LUAdv1 controls the LU stage 1 source operand registers. Similarly, signals SUAdv1, RUXAdv1, and RUYAdv1 respectively control the SU, RUX, and RUY loading of the operand registers.

During operand transfer phase 442 of operand forward stage 440 of the four processing pipelines, information about each of the operations selected to provide an operand value is also read out of scheduler 280. Each operand bus 554 has an associated operand status bus 553 that carries an operand status signal OprndStat describing the "origin" of the operand being fetched. The operand status signal form an entry is a concatenation of fields State, DestBM, Type, and Exec1 of the entry providing the operand value. External logic uses this information during the operand transfer phase to determine the source and availability of a valid operand value.

Register file 290 also has a set of drivers for operand status busses 553 to ensure that operand status busses 553 carry defined values and that the values result in appropriate behavior by logic using the information. Table B.36 of Appendix B describes the operand status signal and its generation.

Each source operand delivered to an execution unit comes from one of three possible sources: a scheduler entry, register file 290, or a result bus of this or another execution unit. Operand transfer phase 442 covers delivery from an entry. Register file 290 is accessed during the Operand Selection phase in parallel with scheduler activity. In particular, the register number for the desired operand is broadcast from the operations entry during the broadcast phase and passed to the appropriate read port of register file 290. For each operand to be provided, scheduler 280 determines whether a scheduler entry or register file 290 drives the operand bus 554 which corresponds to the operand; and the resultant operand is transferred to the execution unit, during the operand transfer phase, via the operand bus 554.

Figure 10:
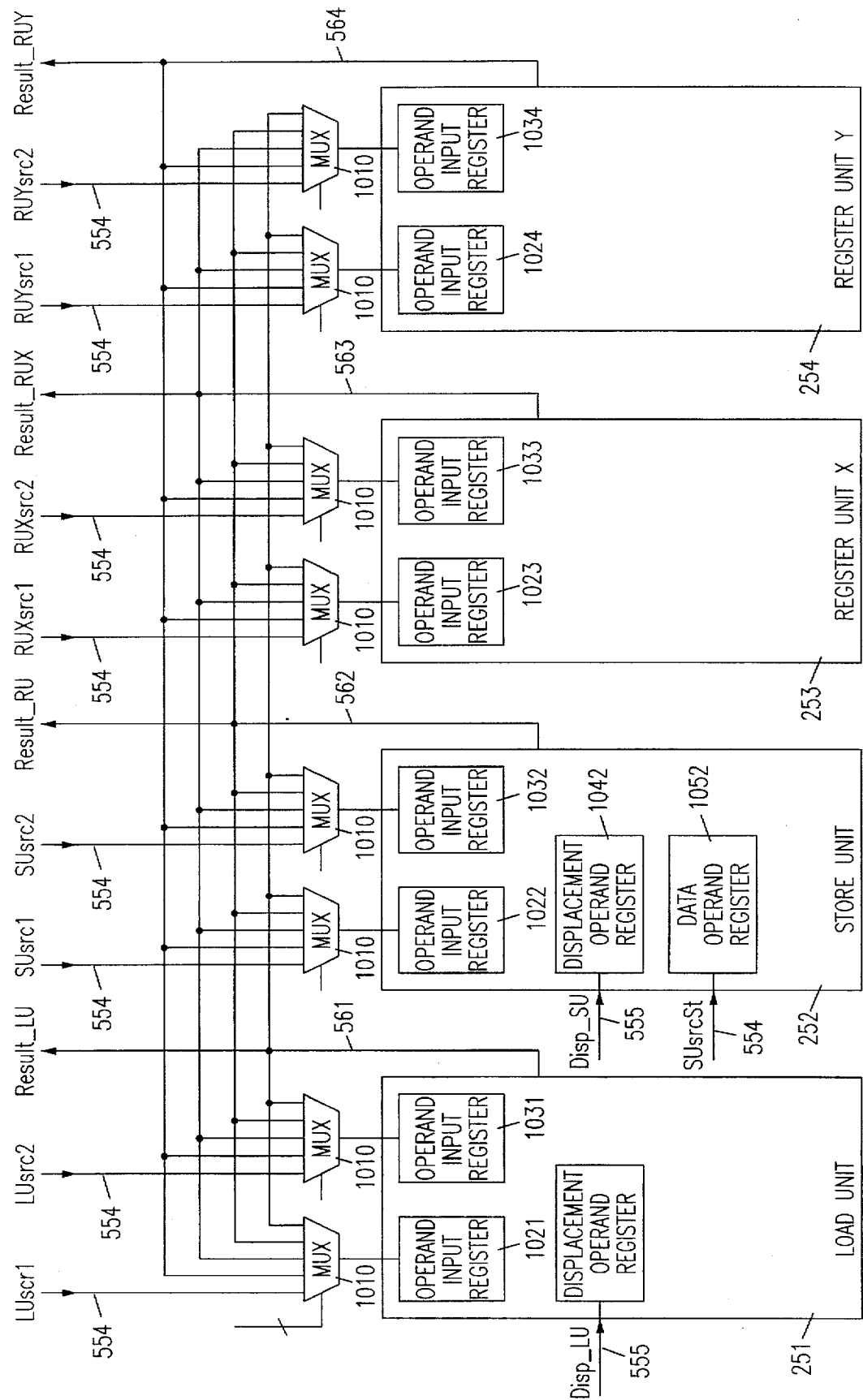
FIG. 10 is a block diagram of the interface between execution units and the scheduler of FIG. 5.

As shown in FIG. 10, operand busses 554 couple to operand input registers 1021 to 1024 and 1031 to 1034 in execution units 251 to 254 through multiplexers 1010. Result busses 560 from execution units 251 to 254 are also connected to multiplexers 1010. Thus, five "operand" busses run to each operand input of each execution unit, namely one of operand bus 554 dedicated to input that operand from scheduler 280 or register file 290 plus four result busses from execution units 251 to 254. During the operand transfer phase, scheduler 280 generates select signals for 5:1 multiplexers 1010 at each operand input register. The operand status signal can be used to determine whether the desired operand value is or may be just becoming available from an execution unit; and if so, the appropriate result bus and value Result_XX from an execution unit 251 to 254 is selected. Otherwise, operand bus 554 is selected. The validity of the operand is an independent issue that only affects whether the associated operation in operand forward stage 440 advances into execution stage 450 and thus actually enters an execution unit.

III.B.3 Displacement Forwarding

In addition to register operands, scheduler 280 fetches and forwards displacement operands to the LU and SU processing pipelines during operand transfer phase 442. Load unit 251 and store unit 252 each have three input operand buses (two register operand busses 554 and one displacement bus 555). Displacement operands are 32-bit quantities, but some bytes in a displacement operand may be undefined and therefore not used during correct operation of execution units 251 and 252.

Scheduler 280 handles displacements in a manner similar to operation register result values. Displacements are initially stored within the 32-bit DestVal fields of entries until used and are driven onto displacement busses 555 as required during the operand transfer phase 442. Displacements are always immediate values for RISC86 operations, so that forwarding displacement values from register file 290 does not occur. Field DestVal is also used for result values from LdOps and some StOps of LdStOp's, but the two uses field DestVal do not conflict since a result value is not loaded into a scheduler entry until after the displacement is forwarded out to the entry, i.e. not until after operand forward stage 440.

Small (8-bit) displacements, which are specified within operations, are handled differently from large (16/32-bit) displacements. Operation decoder 510 sign extends a small displacement before loading the small displacements into the DestVal field of the entry holding the associated LdStOp. Large displacements are presumed to be stored in the DestVal field of the entry for a LIMMOp immediately preceding the LdStOp using the displacement. Generally, the preceding entry holds a "LIMM t0,[disp]" operation.

The selection of DestVal values to drive onto displacement busses 555 during each cycle does not require scanning of scheduler entries. Instead, each entry determines from its State and Type fields whether to enable its drivers or drivers in a preceding entry to assert a DestVal field value onto the appropriate displacement bus 555. Table B.37 in Appendix B summarizes logic for enabling the displacement bus drivers within each entry.

III.B.4 Immediate Value Forwarding

In the exemplary format of RISC86 operations, immediate values are operands src2 of RegOps. Scheduler 280 handles immediate values and displacements similarly. The RISC86 instruction set uses only small (8-bit) immediate values in RegOps, and operation decoder 510 stores the immediate values in field DestVal of the entry holding the RegOp. Thus, immediate values are like displacements in that they are stored in the DestVal fields of entries, but are like register operands, in that they are forwarded over register operand buses 554 (specifically the RUXsrc2 and RUYsrc2 operand buses). Immediate values for Src2 operands are forwarded to respective register execution units during operand transfer phase 442 of operand forward stage 440 in place of a register value. The selection of a register value source (i.e. a scheduler entry or register file 290) is inhibited, and the entry in question directly drives its DestVal field onto the appropriate operand bus 554.

The inhibition of RUX/RUY src2 operand selection is performed during operand selection phase 441 by masking the single-entry generate term that an entry holding the RegOp would normally assert to in operand scan chain. This is done separately and independently for RUXsrc2 and RUYsrc2 and prevents selection of any entry by the RUX/Ysrc2 scan chain. Entries containing immediate values also inhibit selection of register file 290 as the default operand source. The single entry terms for RUX and RUY operand selection scan chains described in Table B. exhibit the inhibition.

The selection of "immediate" DestVal values to drive onto the RUXsrc2 and RUYsrc2 operand buses during each cycle does not require scanning of scheduler entries. Instead, each entry enables the drivers of its DestVal field onto the appropriate operand bus 554 simply based on the entry's State field and related bits. The same drivers can be used for register operand value forwarding and immediate value operant forwarding. Table B.38 in Appendix B describes circuitry for driving immediate values on operand busses 554.

When an entry drives an immediate value onto an operand bus 554, the entry also drives the associated operand status bus 553. The same bus drivers and driver input values as for register operands are used for immediate values but with an additional term as shown in Table B.38.

III.C Data Operand Fetching

StOps have three register source operands and no register destination, in contrast other operations have to up to two source operands and one destination. The third source operand for a StOp provides the data to be stored and is sometimes referred to herein as a data operand. The data operand is not needed to start execution of a StOp but is needed for completion of the StOp. Fetching of data operands is performed in a manner similar to fetching of other source operands, but where the "normal" operand fetch process occurs during issue stage 430 and operand forward stage 440, the data operand fetch process occurs during SU execution stages 450 and 460. Scheduler 280 checks data operand availability during SU execution stage 460 and holds the associated StOp in stage 460 if the data operand is not available.

The data operand fetch process is largely the same as issue and operand forward stages described above with two principal differences. First, a data operand selection phase 451 does not require a scan across scheduler entries to choose between multiple candidates such as occurs the issue selection phase. Instead, the entry associated with the StOp at SU stage 450 identifies itself from the State and Type fields and provides the data operand. The second difference is that the OpInfo field of the StOp does not need to be read out (again) to store unit 252 during a broadcast phase 452 for the data operand. Instead, store unit 252 retains and uses the OpInfo value from when the StOp was issued. The OpInfo value read out during the SU issue stage 430 is passed down through operand forward stage and the first and second execution stages of the SU pipeline.

Table B.39 in Appendix B describe signals generated for data operand selection and forwarding.

III.D Register Operation Bumping

Scheduler 280 generally manages the processing pipelines based on in-order issue selection and processing for each type of operation. "Normally", operations issued to a processing execution unit progress down the pipeline in the order in which the operations were issued to the pipeline. When an operation is held up in operand forward stage of the SU or LU pipeline, for example, the operation currently being selected for issue to that pipe is also held up because operations do not pass by each other within a processing pipeline.

However, when a RegOp is held up in operand forward stage of either register unit 253 or 254 due to one or more unavailable operand values, the RegOp may be bumped out of the processing pipe and back to the unissued state. This sets the RegOp's State field back to b0000. When a RegOp is bumped out of operand forward stage 440, another RegOp selected for issue to that register unit advances to operand forward stage 440, immediately taking the place of the bumped RegOp. Simultaneously, the bumped RegOp is immediately eligible for reissue to a register unit, not necessarily the same register unit.

Bumping is applicable to all RegOps and is subject to the following constraints. First, an RUX-only RegOp (in RUX operand forward stage) is not bumped if an RUX-only RegOp is currently being selected for issue to RUX because bumping would violate a guaranteed that RUX-only RegOps are executed in order with respect to each other. Secondly, a RegOp should only be bumped if the RegOp will be stalled for more than one cycle, otherwise leaving the RegOp in operand forward stage 440 more efficiently utilizes execution unit resources. Table B.12 describing changes to the State field of entries implements RegOp bumping. Global control logic 520 generates global bump signals BumpRUX and BumpRUY which force assertion of signals RUXAdv0 and RUYAdv0, respectively so that appropriate issued RegOp advance to operand forward stage 440. A description below of global control logic 520 further indicates the conditions under which a RegOp is bumped.

III.E Load/Store Ordering

Scheduler 280 provides support for maintaining a sufficient ordering between LdOps and StOps. In particular, memory dependency handling logic ensures appropriate forwarding of memory data from memory writes to memory reads. As described above, load-store ordering is maintained by holding operations in execution stage 460 of the LU and SU execution pipes if a LdOp or StOp possibly accesses the same address as an older StOp or LdOp which is not yet completed. Load and store units 251 and 252 contain address comparators, and ordering logic 534 in scheduler 280 provides on bus 560 information indicating the relative age of the LdStOps so that only the appropriate address comparisons are considered when determining whether to hold LdOp or StOp in the second execution stage 460.

The relative age determination process is similar to the issue selection/operand information broadcast process. During a first phase 463 of execution stage 460 for LdOp and StOp pipelines, ordering logic 534 performs five "propagate-kill" style scans (two for LdOp to compare to the StOp in SU stage 2, three for StOps to compare to the LdOp in LU stage 2) across all scheduler entries from oldest to newest. During a second phase 464 of stage 2, the entry for the LdOp and/or StOp in execution stage 460 samples the results from the associated two or three scan chains and drives on bus 556 global signals SC_SU2OLDER, SC_SU1OLDER SC_SU0OLDER, SC_LU2OLDER, and SC_LU1OLDER which directly indicate the desired relative age information.

A LdOp in execution stage 460 or in stage 450 and performing the second half of a misaligned load requires three scan chains to determine the LdOp's age relative to three categories of StOps. Each scan chain scans for oldest StOp in a category. One scan chain detects a StOp in stage 460 or in stage 450 and performing the second half of a misaligned store. Another scan chain detects a StOp in stage 450, and a third scan chain detects an oldest StOp not yet in stage 450. The state of the scan bit at any point in the scan chain reflects whether an older StOp of given type has been encountered or found yet. Thus, the entry for a LdOp can determine from the input scan bits the LdOp's age relative to any StOp in a given category. If the input scan bit Cin is 1, the scan signal has not been "killed" yet, and no older StOp of given category exists. LdOp ordering control logic determines which signals, if any, from the address comparators are relevant.

A StOp in stage 460 or in stage 450 and performing the second half of a misaligned store requires two scan chains to determine its age relative to two categories of LdOp. One scan chain detects any LdOp in stage 460 or stage 450 and performing the second half of a misaligned load. The second scan chain detects any LdOps not yet in stage 460. Based on the input scan bits Cin to the entry holding the StOp in question, StOp ordering control logic which signals form the address comparators are relevant.

Each scan chain is a "propagate-kill" chain from oldest scheduler entry to newest. Table B.40 in Appendix B and U.S. patent application Ser. No. UNKNOWN4 describe scan chains for load-store ordering.

III.F Abort Handling

When an abort cycle occurs, scheduler 280 is flushed. All Op quads are invalidated by clearing all Op quad fields OpQV, and fields of the entries are also cleared to innocuous values. Fields in the entries must be cleared because field OpQV only affects the control of Op Quad loading and shifting and other operations within scheduler 280 ignore field OpQV and assume that the entries are valid. A logically invalid operation within scheduler 280 is represented as a valid but innocuous operation. The State field of the operation indicates "Completed," and thus the operation will not be executed. DestBM and StatMod fields indicate that the operation does not modify any register bytes or status flags. In these circumstances, all other fields can have any values without causing any "harm". Such an operation is effectively a No-op operation.

A new Op quad may be loaded into scheduler 280 during the abort cycle. This Op quad is not associated with any of the outstanding Op quads that need to be flushed; instead, it is logically the first new Op quad "after" the abort. This would occur after an aborted or mispredicted BRCOND. The first new Op quad after abort cycles are delayed due to exception conditions.

In effect, the following sequence of events occurs at the end of the abort cycle. Note that the storage elements within scheduler 280 are fully synchronous with the system clock signal and don't change state in response to inputs until the next cycle boundary. First, changes in fields OpQV, State, DestBM, and StatMod occur as described above. Then all, some, or none of the Op quad shift down one position, and a new Op quad is loaded into the top scheduler entry. For exception-related aborts, the new Op quad is also invalidated and whatever shifting that occurs is generally a don't care since all scheduler Op quads are being flushed. For BRCOND-related aborts, the new Op quad is allowed to be valid and reloading of the top row is forced.

For timing purposes, the Abort signal comes in two varieties, "early" and "late". The late variety is the same as the early, but delayed by one cycle with a flip-flop. The late variety is called SC_Abort, and the early version is called SC_EAbort.

IV. Global Control Logic

In addition to logic associated with individual entries, scheduler 280 contains logic which controls scheduler 280 globally.

IV.A Scheduler Information Used by External Logic

External logic such as global control logic 520 and execution units 251 to 254 uses a variety of information provided by scheduler 280 during the broadcast and the operand transfer phases of fetching operand values. For most types of operands, the broadcast and operand transfer phases are during the issue and operand forward stages of the processing pipelines. During the broadcast phase, information about the operation whose operands are being fetched is read out on the appropriate OpInfo bus 551; and the operation's two source register (Src1 and Src2) and byte mark (Src1BM and Src2BM) fields are read out onto the two associated OprndInfo busses 552. For the data operand of StOps, the broadcast phase and operand transfer phase are during SU stages 450 and 460. Information for the data operand for a StOp is driven on an associated OprndInfo bus 552, but there is no associated OpInfo bus for the data operand. Store unit 252 retains operation information from when the StOp was issued. Broadcast operand information is used during the next couple of phases. Operation information is simply passed down the pipeline for the execution units. In the case of register units 253 and 254, the two source byte mark Src1BM and Src2BM bits from the OprndInfo busses 552 are also passed down the pipeline to the execution units. During the operand transfer phase, information about each of the operations that is the source of an operand value is read out onto OprndStat bus 553 associated with each operand bus 554. The information describing the status of the sourcing operation is directly used (and only used) during this phase. Table B.41 summarizes the information read out of scheduler 280 at various times.

IV.B Global Control Functions

The preceding describes the logic, storage elements, and busses comprising the core of scheduler 280. Scheduler 280 also includes global control logic 520 that coordinates shifting in scheduler 280 and "feeding" of operations and operands to execution units 251 to 254. The following describes pieces of global control logic 520 for the four phases of the operand fetch process.

During the issue selection phase, the only external concern is whether an operation was selected for issue to each processing pipeline. For each issue selection that did not find an eligible operation, no scheduler entry will drive the corresponding OpInfo and OprndInfo busses 551 and 552. The values on these busses and the following three phases for this processing pipeline are don't care. The only requirement is that an operation valid bit (OpV) for operand forward stage 440 of an execution pipeline is zero to indicate operand forward stage 440 in this pipeline stage is empty.

Operand forward stage operation valid (OpV) bits indicated whether valid operations are issued to the execution units. The output scan bit Cout of each issue selection scan chain generates an OpV bit for operations in the issue stage. Table B.42 describes the OpV bits. Global signals XXAdv0 control loading of OpV bits into pipeline registers to follow progress of the empty operation. During abort cycles, the pipeline registers are unconditionally cleared.

The broadcast phase requires no significant global control logic other than the pipeline registers which latch information (namely the OprndInfo and OpInfo values) read from scheduler 280 for external use.

During the operand selection phase, two external activities take place. First, the source register numbers (i.e. the SrcYReg fields of the latched OprndInfo values) read during the preceding phase are used to access register file 290. This is done blindly and in parallel with operand selection scans within scheduler 280. Up to nine source operands can be fetched each cycle. Accordingly, register file 290 has nine corresponding read ports, each associated with and one of operand busses 554. The register fields presented to these ports are XXsrcY and SUsrcSt, where XX={LU,SU,RUX,RUY} and Y={1,2}.

A second external activity during the operand selection phase is the determining, for each operand bus 554 and operand information bus 552, whether scheduler 280 or register file 290 will provide value during the next phase. Each scheduler entry directly determines for itself whether it should drive the busses or not, so the only concern for global control logic 520 is whether register file 290 should be enabled. Enabling register file 290 is based on output scan bits Cout which indicate whether any entry was selected during the operand selection phase. If the final scan signal Cout of an operand selection scan chain indicates no entry was selected for the associated operand bus 554, global control logic enables register file 290 to drive the associated operand bus and operand information bus. Equations describing signals on operand busses 554 are in Tables B.35 and B.36 of Appendix B.

During the operand transfer phase, global control logic 520 controls: RegOp "bumping", all execution unit input multiplexers 1010, validity determination for each operand value being fetched, and generation of signals HoldXX0 which factor into the generation of the global pipeline register control signals XXAdv0.

The implementation of RegOp bumping is split between logic within each scheduler entry that changes the State field of the entry, and global control logic 520 which generates global bump signals BumpRUX and BumpRUY and forces assertion of signals RUXAdv1 and RUYAdv1. Generation of the BumpRUX/Y signals is based on the OprndStat values that are read out of scheduler 280, during operand transfer phase, for each of the register unit source operands (i.e. OprndStat_RUXsrcY and OprndStat_RUYsrcY where srcY={src1, src2}). In particular, fields State and Type for each operand source are examined to determine whether the sourcing operation is at least two cycles away from providing a valid operand value. If either sourcing operation is at least two cycles away from providing a valid operand value, the dependent RegOp is bumped out of operand forward stage. A RegOp is at least two cycles from providing an operand if the RegOp has not yet advanced operand forwarding stage. A LdOp is at least two cycles from providing an operand if the LdOp has not yet advanced to the first execution stage.

Table B.43 summarizes generation of the signals BumpRUX/Y and include an additional timeout term to handle what could otherwise be deadlock situations. 3-bit counters associated with RUX and RUY operand forward stage's generate signals RUX/Ytimeout after an operation has been held in operand forward stage for more than a time out period. Taking RUX as example, whenever RUX operand forward stage is loaded (irrespective of whether with a valid or invalid operation), the associated counter is reset to a start value. During all other cycles, the counter is decremented. If the counter reaches 000, then RUXtimeout is asserted to indicate that the operation has been held up too long.

RUX/Ytimeout signals cause setting of corresponding operation valid signals OpV for operand forward stage of register units 253 and 254. For example, signal RUXtimeout immediately forces signal OpV_RUX_0 equal to 0, which then causes assertion of pipeline control signal RUXAdv0 to reload RUX operand forward stage. Signal OpV_RUX_0 ensures that the RUX execution stage 450 does not see the bumped RegOp if signal RUXAdv1 is also asserted.

A second global control function occurring during operand transfer phase 442 is generation of the control signals for each source operand input multiplexer 1010 coupled to execution units 251 to 252. As described above, each 5:1 multiplexer 1010 selects an operand from an associated operand bus 554 or one of result busses 560 to load into an associated one of operand register 1021 to 1024 or 1031 to 1034. During operand transfer phase 442, control logic 520 uses operand status signals OprndStat from busses 553 to generate control signals for each of multiplexers 1010 and select operands OprndStat_SUsrcSt and OprndStat_XXsrcY, where XX={LU,SU,RUX,RUY} and Y={1,2}, to be loaded into the operand registers. In particular, global control logic 520 examines fields State and Type for each operand source to determine whether the sourcing operation has completed execution and, if not, which execution unit is executing the sourcing operation. The operand bus 554 is selected if the sources is register file 290, a completed operation, or an operation providing a src2 immediate value to itself. Otherwise, the result bus 560 from the execution unit corresponding to the type of the sourcing operation is selected. An operand from a result bus will not be valid unless the sourcing operation is completing in that cycle. Table B.44 in Appendix B summarizes generation of select signals for each operand.

A third global control function occurring during the operand transfer phase is determination of the validity of each of the nine operand values being presented to execution unit source operand registers. A signal is generated for each source operand to indicate whether the source operand value is valid. As with the control of the associated execution unit input multiplexers 1010, operand validity determination is based on fields State and Type of the OprndStat values from busses 553. A sourcing operation must either have completed execution or currently be completing execution for an operand to be valid. In addition, the DestBM field of the OprndStat value is compared with field Src1BM or Src2BM of the latched OprndInfo value for the operand being fetched. For the operand to be valid, the sourcing operation's byte marks must be a superset of the required byte marks Src1BM or Src2BM. A src2 immediate value is always valid. A signal OprndInvld_XXsrcY is asserted to indicate operand srcY for execution unit XX is invalid. Table B.45 summarizes logic which generates signals OprndInvld_XXsrcY.

A fourth global control function occurring during the operand transfer phase is generation of pipeline control signals which hold operation up in a pipeline stage when required operands for advancement are not valid. Signals SC_HoldXX0 hold operations in operand forward stage 440 of execution unit XX if source operands are not available. StOps can advance out of operand forward stage 440 even if the data operand is not available, but signal SC_HoldSU holds the StOp in the second execution stage 460 if the data operand is then invalid. cc-dep RegOps are held up in operand forward stage 440 if required condition codes are invalid. Table B.46 summarizes logic which generates signals SC_HoldXX0 and SC_HoldSU2.

V. Status Flags

Status flags, both x86 architectural flags and microarchitectural flags, involve three areas of functionality: fetching status flag operand values for cc-dep RegOps, fetching status flag values for resolution of BRCONDs, and synchronizing non-abortable RegOps with preceding BRCONDs. Unlike operand selection logic 532 and LdOp-StOp ordering logic 534, status flag handling logic 538 is not spread across all scheduler entries. Status flag handling for related operations only occurs while operations that access status flags are within certain rows in scheduler 280. Cc-dep RegOps must be in row 3 during the cycle when status operand fetching occurs (i.e. during RUX operand forward stage). BRCONDs and non-abortable RegOps must be in row 4 during resolution by branch evaluation unit 257 and RUX operand forward stage, respectively. Accordingly, cc-dep and non-abortable RegOps are held up in RUX operand forward stage until they shift down to rows 3 and 4 respectively, and shifting of the Op quads in rows 3 and 4 operations is inhibited until Cc-dep and non-abortable RegOps in those rows can advance into RUX execution stage. BRCOND remain in row 4 until the status flags required for evaluation are valid.

Restricting execution or evaluation of cc-dep RegOps, non-abortable RegOps, and BRCOND to when the operations are in particular rows of scheduler 280 simplify status flag handling logic 538. For example, status flag handling logic 538 is only required in the bottom three scheduler rows and only the bottom two rows are used for determining appropriate status flag values. Additionally, the same status flag values can be shared by both a cc-dep RegOp in row 3 and a BRCOND in row 4. Synchronization between non-abortable RegOps and BRCONDs is simplified because the position of BRCONDs when evaluated is fixed.

A number of restrictions placed on positioning cc-dep RegOps, BRCOND, and non-abortable RegOps relative to each other within Op quads further simplifies logic. The restrictions generally translate into coding rules for emcode, but in some cases also constrain MacDec 242 decoding of multiple macroinstructions in a cycle. The restrictions are:

1) No .cc RegOps after a BRCOND in Op quad.
2) No cc-dep RegOps after a .cc RegOps in an Op quad.
3) No non-abortable RegOps in a quad with a BRCOND.
4) Only one cc-dep RegOp within an Op quad.
5) Only one BRCOND within an Op quad.
6) Only one non-abortable RegOp within an Op quad.

With these restrictions, status flags are which are correct for cc-dep RegOp in row 3 are also correct for a BRCOND in row 4.

V.A Status Flag Fetch

Status flag handling logic 538 fetches four independent groups of status flags corresponding to the four bits of field StatMod. Table B.47 in Appendix B identifies the four flag groups and their correspondence to field StatMod. Whether each group is valid for an operation is independently determined depending on whether older operations which could modify the group has been completed.

Passing status flag values directly from either register unit 253 or 254 to a cc-dep RegOp entering register unit 253 is not supported in the exemplary embodiment. Accordingly, status flags are valid the cycle following completion of a .cc RegOp. This creates a minimum latency of one cycle between a .cc RegOp which modifies a particular group of status flags and a following cc-dep RegOp which uses the group. The statistical performance impact of this latency is minimal because cc-dep RegOps are relatively rare when decoding typical x86 code. Further, any impact of the latency can be eliminated if instruction decoder 240 orders RISC86 operations to avoid a cc-dep RegOps immediately following a .cc RegOp.

During each cycle, the effective set of status flag values at the boundary between scheduler rows 3 and 4 is computed. The computed status flags include the committed status flag and all changes to the status flags caused by operations in rows 4 and 5. As noted above, only RegOps modify the status flags. Since each RegOp can modify only one, two, three, or all four of the groups of status flags, status flag computation is performed independently for each of the four groups. The result of the computation, for each group, is a set of flag values and state information from the newest RegOp with a StatMod bit corresponding to the group set. The State field for the RegOp indicates the whether the RegOp is complete making the flag values valid.

Status flag Logic 538 generates eight status flag bits STATUS and four validity bits STATUSV associated with the four groups of status flags as shown in Table B.47. These 12 bits are passed via bus 557 to branch evaluation unit 257 which evaluates BRCONDs and logic in register unit 253 which handles cc-dep RegOps. Register unit 253 and branch evaluation unit 257 determine from validity bits STATUSV whether the required status flags are valid and if they are valid uses status bits STATUS to execute of the cc-dep RegOp (if any) in row 3 and evaluate the BRCOND (if any) in row 4. Global control logic 520 generates shift control signals based on whether the required status flags are valid.

A process similar to that for fetching register operand values is used for each status flag group to obtain the appropriate flag values for the last operation in row 3 scheduler 280. In the following the notation OpX refers to entry X in scheduler 280 where X=0 and X=23 respectively identify the newest and oldest operations in scheduler 280. Row 4, for example, contains Op16, Op17, Op18, and Op19. For each flag group, a propagate-kill-style scan from Op16 to Op23 locates the first operation with StatMod bit for this flag group set, and that entry's Completed state bit (i.e. S3) and the appropriate set of flag values are read out. The StatusV bit for this group is simply state bit S3 from the entry found. If no such operation is found, the desired flag values are read from the architectural status flags register along and signal STATUSV is set to indicate the group is valid. Table B.48 describes the status flag fetch logic for each flag group.

V.B Status Forwarding to cc-Dep RegOps

During each cycle, global control logic 520 examines the four operations within row 3 to determine whether any of them is a cc-dep RegOp. If one is, then that RegOp is decoded to determine which groups of status flags are needed, and the StatusV bits are checked to determine whether all of those groups are valid. Concurrently, Status [7:0] is blindly passed to the RUX execution unit. If any of the required flag groups are not currently valid, the cc-dep RegOp is held up from advancing into the RUX execution stage and shifting of the Op quad out of rows 3 is inhibited. If all of the required flag groups are currently valid, the cc-dep RegOp is allowed to advance into the RUX execution stage at least insofar as the status operand fetch is concerned. The cc-dep RegOp may still be prevented from advancing because an operand is not available. If the cc-dep RegOp does not advance into execution stage 460, shifting of row 3 is inhibited.

If there is no unexecuted cc-dep RegOp in rows 3 to 5, but there is a cc-dep RegOp in RUX operand forward stage, then the RegOp is unconditionally held up in operand forward stage. If a cc-dep RegOp in row 3 has not yet executed, but there is no cc-dep RegOp in RUX operand forward stage, shifting of rows 3 is inhibited. Table B.49 describes logic which controls shifting and operation advancement.

V. Branch Prediction Resolution

During each cycle, if a BRCOND is found in row 4, the condition code (cc) field of that BRCOND is decoded to determine a predicted condition value. The predicted condition value is compared to a selected one of 32 condition values derived from status flags from status flag handling logic 538 if associated validity bits indicates the selected condition is valid. If the selected condition is not yet valid, shifting of the Op quad in row 4 is inhibited and evaluation of the BRCOND is attempted again in the next clock cycle. If the selected condition is valid, a comparison of the predicted condition and the selected condition indicates whether the prediction was correct.

If a BRCOND is found to be mispredicted (and thus a pipeline restart is required), the restart signal is asserted based on whether the BRCOND is from MacDec 242 or is an emcode operation from internal or external emcode. In addition, an appropriate x86 macroinstruction or emcode vector address and an associated return address stack TOS value are generated and returned to instruction decoder 240 to restart decoding.

For the benefit of the logic handling synchronization between non-abortable RegOps and preceding BRCONDs (described in the next section), a record is maintained of a mispredicted BRCOND while it remains outstanding (i.e. until an abort cycle occurs). Further, an outstanding mispredicted BRCOND holds up loading of "new" Op quads until the abort cycle occurs.

If a BRCOND was correctly predicted, the only action taken is to set the BRCOND's State bit S3 to indicate the BRCOND is completed. Table B.50 describes logic which handles BRCOND evaluation.

VI. Synchronization of Non-Abortable Operations

During each cycle, if a non-abortable RegOp is found in row 4, then scheduler 280 checks for any preceding mispredicted BRCONDs. Due to emcode coding constraints, any preceding BRCONDs must be in a lower row and thus must have all been resolved. Further, any BRCOND currently being resolved (in row 4) is after the non-abortable RegOp and thus is irrelevant.

If there is no mispredicted BRCONDs, the non-abortable RegOp is allowed to advance into RUX execution stage, although the RegOp does not advance if required operands are not yet available. If the RegOp does not immediately advance into RUX execution stage, the RegOp is still allowed to shifted out of row 4.

If rows 4 or 5 contain no unexecuted non-abortable RegOp but there is a non-abortable RegOp in RUX operand forward stage, the non-abortable RegOp is unconditionally held up in operand forward stage until the non-abortable Reg-Op reaches row 4. If a non-abortable RegOp in row 4 has not yet executed, but no non-abortable RegOp is in RUX operand forward stage or an unexecuted non-abortable RegOp is in row 5, shifting of rows 4 and 5 is inhibited. Table B.51 describes logic for handling non-abortable RegOps.

VII. Self-Modifying Code Handling

Store queue 270 provides several bits of the linear and physical addresses for data to be committed. If the store addresses match any instruction address for an Op quad, a write to an instruction may have modified an instruction and an operation now present (decoded) in scheduler 280 may be incorrect. The incorrect operation must be corrected before results from the operation are committed. Above incorporated U.S. Pat. No. UNKNOWN3, describes a system for handling self-modifying code which may be used in scheduler 280.

In the exemplary embodiment of the invention, self-modifying code support logic 536 compares address bits from store queue 270 to the instruction address (or addresses, if the instructions in an Op quad are from different pages) of each Op quad. If a comparison eliminates the possibility of code modification, logic 536 does nothing. If the possibility is not eliminated, logic 536 flushes scheduler 280 and restarts the fetch/decode process from the address of the last committed instruction. Logically, in scheduler 280, detection of self-modifying code is treated as a kind of trap and factors into a signal indicating a "trap pending". Table B.52 describes an example portion of self-modifying code handling logic 536.

VIII. Operation Commit Unit

OCU (Operation Commit Unit) 260 generally operates on the operations within the last or second to last row of scheduler 280. The principal function of OCU 260 is to commit (or make permanent) the results of operations and then retire an Op quad from scheduler 280. OCU 260 also initiates abort cycles for mispredicted BRCONDs.

Many types of results or state changes can stem from the execution of an operation. The principal types of changes are abortable and encompass: register changes; status flag changes; and memory writes. In the RISC86 instruction set, register changes result from all RegOps, LdOps, LIMM Ops, LDKxx operations, and STUPD StOps. Status flag changes result from ".cc" RegOps, and memory writes result from STxx and StOps. Scheduler 280 and store queue 270 support abortable state changes by temporarily storing register and status results in entries of scheduler 280 and memory write data in entries of store queue 270, until the associated operations are committed and retired. Permanent state changes are made during operation commitment. While new state values reside in scheduler 280 and store queue 270, the state values are forwarded to dependent operations as necessary.

All other state changes are non-abortable and are the result of RegOp executions. The non-abortable state changes include changes to standard x86 registers such as segment registers and non-status EFlags bits and changes to micro-architectural registers for execution of RISC operations. Non-abortable state changes can occur immediately during non-abortable RegOp execution, and decoder 240 is responsible for ensuring sufficient synchronization of the non-abortable operations with the surrounding operations.

VIII.A Commitment

During each cycle, OCU 260 examines each of the operations within rows 4 and/or 5 of scheduler 280 and tries to commit the results of as many the operations as possible. The state changes of the four operations may be committed in one cycle or over many cycles. If all the operations of an Op quad in the bottom row have been committed or are being successfully committed, the Op quad is retired from scheduler 280 at the end of the current cycle by allowing an Op quad from row 4 to shift into row 5. Otherwise, as many changes as possible are committed and shifting into row 5 is inhibited. The commitment process is repeated on successive cycles until all operation in row 5 have been committed.

Commitments of register results, status results, and memory writes are performed independently. For operations which have multiple results (e.g. a RegOp with register and status results, or a STUPD operation with a register result and a memory write), the various results are not necessarily committed simultaneously. The commitment of one type of state change can generally be ahead or behind the commitment of another type of state change. The overall commitment of an operation occur when the last result commitment occurs.

An operation's results are not committed until: the operation's execution state indicates the operation is Completed; the status of any preceding faultable operations, namely any preceding LdStOps, is Completed, which implies that the operations are fault-free; and the status of any preceding BRCOND is Completed, which implies that the BRCOND was correctly predicted. FAULT operations are not a concern since FAULT operations are required to be the first "valid" operation in an Op quad so that no operation in the same row as a FAULT operation need to be completed. For StOps which generated a memory write, an additional constraint is that only one write can be committed per cycle from store queue 270 into data cache 220.

OCU 260 can commit up to four register and four status results and one memory write per cycle and typically commits and retires an Op quad from scheduler 280 every cycle. An Op quad can remain unretired at the bottom of scheduler 280 for more than one cycle only if the Op quad contains multiple memory write StOps or if some of the operations in the Op quad have not yet Completed.

If an operation in the bottom Op quad needs to be faulted, for example, if the operation is a FAULT operation or a fault occurred during execution of the operation, the following operations are inhibited from being committed. Once all older operations within the Op quad being faulted have been committed or are being successfully committed, OCU 260 retires the Op quad and initiates an abort cycle. The abort cycle flushes scheduler 280 and all the execution units of all outstanding operations.

Concurrent with the abort cycle, OCU 260 also vectors instruction decoder 240 to one of two possible emcode "entry point" addresses, either the "default" fault handler address (as initialized by reset emcode), or an "alternate" handler address (as specified by a macroinstruction or exception processing emcode). The setting of these addresses is supported by the LDDHA/LDAHA operations which are loaded into scheduler 280 in a Completed state and are recognized and "executed" by OCU 260 when they reach the bottom of scheduler 280.

Only certain types of operations can be faulted, namely LdOps, StOps (except for LEA operations), and FAULT operations. For a LdOp or StOp, faults are identified by the second execution stage of the LU or SU execution pipeline; and if a fault is detected, the LdStOp is held up in the second execution stage until the associated or an unrelated abort cycle flushes the LdStOp from scheduler 280 and execution unit 251 or 252. This results in Completed LdStOps being guaranteed fault-free. OCU 260 can differentiate between a faulting LdStOp and a LdStOp that has not yet Completed, by signals from execution units 251 and 252 indicating a faulting operation is stuck in their respective second execution stage. When OCU 260 tries to commit the next uncompleted LdStOp and the associated execution unit 251 or 252 signals a fault for an operation held in the second execution stage, the operation that OCU 260 is trying to commit must be the operation that has encountered a fault. If the associated execution unit 251 or 252 does not assert a fault signal, then nothing definite can be determined about an uncompleted LdStOp; and OCU 260 waits for the LdStOp to complete.

FAULT operations are loaded into scheduler 280 in a Completed state and always fault. OCU 260 handles commitment of FAULT operations and the resulting abortion of surrounding operations in the same manner as LdStOps which fault.

In addition to faults on specific operations, OCU 260 also recognizes various debug trap exceptions which are accumulated and remembered up until the end of an emcode sequence as indicated by an ERET. If an "ERET" Op quad is retired and trap exceptions are pending, OCU 260 initiates a fault-style abort cycle as if a fault was recognized on a fifth and last operation within the Op quad.

OCU 260 recognizes a "branch target limit violation" condition which, while associated with just certain operations within an Op quad, is tagged with the Op quad as a whole. This unconditionally causes an abort cycle to be initiated as if a fault was recognized on the first operation within the Op quad.

While OCU 260 is primarily concerned with operations that generate abortable state changes, OCU 260 also handles BRCONDs. BRCONDs are resolved when in row 4. If a misprediction is detected, logic for fetching macroinstructions and instruction decoder 240 are immediately reset and restarted from the proper macroinstruction address. When the mispredicted BRCOND reaches row 5, commitment of operations newer than the mispredicted BRCOND is inhibited, and an abort cycle which is initiated after all operations preceding the mispredicted BRCOND have been committed or are being successfully committed. The abort cycle flushes scheduler 280 and all the execution units of all operations. The abort cycle also allows instruction decoder 240 to start loading "new" operations into scheduler 280 for immediate issue to execution units 251 to 256. Mispredicted BRCONDs and operation fault aborts differ in that no vectoring to emcode is initiated for mispredicted BRCONDs. No action is necessary to "commit" a correctly predicted BRCOND that reaches the bottom of scheduler 280.

OCU 260 either commits or aborts each BRCOND. OCU 260 chooses the action based on the BRCOND's scheduler entry State field. When a BRCOND is resolved, its scheduler entry State field is either changed to "Completed" if correctly predicted, or is left "Unissued" if mispredicted. Thus, whether a BRCOND is Completed in row 4 directly implies the prediction status of a BRCOND.

The actual timing of operation result commitments is relatively simple and can be viewed as happening during the latter part of the commit cycle. Typically, an Op quad is committed during the same cycle that it falls into the bottom of scheduler 280, and is retired from scheduler 280 at the end of the cycle. During this cycle, while results are being written to register file 290, operand values continue to be forwarded to all dependent operations from scheduler 280, not from register file 290.

Committing memory writes is a two stage process implemented in the form of a two stage write commit pipeline. The first stage of this pipeline corresponds to OCU 260's commit cycle for a StOp and, as far as OCU 260 is concerned, the StOp has been committed when it enters the second stage of this pipeline. Timing-wise the StOp must enter the second write commit stage before or concurrent with retirement of the associated Op quad from scheduler

280. If a StOp cannot enter this second stage, the StOp is viewed as not yet being committable and retirement of the Op quad is held up.

When OCU 260 initiates an abort cycle due to an operation fault, an abort signal and an associated emcode vector address are asserted during the commit/retire cycle of the Op quad containing the faulting operation. During the next cycle, scheduler 280 will have been flushed, and the target emcode Op quad is being fetched. For internal emcode, scheduler 280 will be empty for exactly this one cycle.

The Abort signal for a mispredicted BRCOND is also asserted during the commit/retire cycle of the associated Op quad. Since instruction fetch and decode was restarted earlier, scheduler 280 can be reloaded with a new Op quad as early as the very next cycle, i.e. scheduler 280 does not sit empty for even one cycle.

When OCU 260 recognizes multiple operations within an Op quad as requiring an abort cycle, it chooses the first such operation and initiates appropriate abort actions with respect to that operation at the appropriate time for that operation.

VIII.A.1 Register Commitment

OCU 260 manages and controls the commitment of register result values to register file 290. During any given cycle, the register result of each and every operation within either one of the bottom two rows of scheduler 280 can be written into the register file (all during the latter part of the cycle, via four independent write ports). Each of the writes is performed based on byte marks, field DestBM[2.0], from the associated scheduler entry. This process applies equally to the x86 architectural registers and to the temporary/micro-architectural registers.

If an operation is not yet Completed and committable, the associated register file write is inhibited for this cycle. If an operation is of a type which conceptually does not generate a register result, then the byte marks are all clear and the register number is possibly undefined; this results in no bytes being modified during the register file write. Similarly, if register t0 (an always zero register) is specified as the destination for an operation, the byte marks are again all cleared. In both of these cases the byte marks were forced to b000 when the operation was loaded into scheduler 280.

In general, the possibility of contention exists, i.e. of multiple simultaneous writes to the same register, when there are multiple enabled file writes. The desired result is that the last or newest write succeeds and the other, older, writes are inhibited and effectively ignored. This function is handled within register file 290, separate from OCU 260's control of the register commitment process based simply on the presented register numbers and associated write enables.

Further, if the contending writes are such that the older writes modify register bytes which are not modified by the newest write, then the effective register file write must be of the appropriate combination of bytes from each of the contending operations. For example, if the first operation modifies bytes {3,2,1,0}, the second operation modifies bytes {1,0}, and the third operation modifies byte {1}, then the actual register file write takes bytes {3,2} from the first operation, byte {0} from the second operation, and byte {1} from the third operation. In other cases, some of the register file bytes are not modified at all. This further functionality is also handled locally by control logic in register file 290. In essence, the contention resolution logic inside register file 290 operates on the basis of individual bytes instead of 32-bit words.

The write enables for all four operations are generated in parallel. For each operation, if it is Completed and all preceding/older LdStOps within the Op quad are Completed and there is not a preceding/older mispredicted BRCOND, the associated write enable is asserted. Further, the associated DestBM bits are cleared to indicate that the scheduler entry no longer needs to provide a register value to dependent operations. Clearing of the DestBM field is also done for partial register writes. If a dependent operation cannot obtain all its required bytes from one operation, the dependent operation will be held up in an operand forward stage until it can obtain all the bytes from register file 290.

In addition, nine signals OprndMatch_XXsrcY associated with a scheduler entry (see description above) are masked (i.e. forced to indicate no match) at the same time that the DestBM bits within that entry are about to be cleared. This is due to the pipelined nature of the register operand fetch process within scheduler 280. Specifically, the DestBM bits of an entry are used in both stages of this process and must be consistent across both cycles.

To increase register commitment throughput, operation register writes may take place from row 4 when all the operations in row 5 have completed. This is accomplished by generalizing the RegOp write enable logic to consider either the four operations in row 5 or those in row 4. The operations of the selected row are renamed "OpA" through "OpD" in place of Op23 through Op20 or Op19 through Op16. Table B.53 describes logic which selects results for commitment to register file 290.

VIII.A.2 Status Flag Commitment

OCU 260 also manages and controls the commitment of status flag result values, as generated by ".cc" RegOps, to the architectural EFlags register. Unlike the commitment of register results, none of the (up to four) status results of operations from row 5 are written into EFlags until the Op quad in row 5 is about to be either retired or aborted. In the normal case, when all the operations within the Op quad have been fully committed or are being successfully committed, the cumulative or overall result of all four status results is written into EFlags at the end of the cycle when the Op quad is retired from scheduler 280. For an Op quad containing a faulting operation or a mispredicted BRCOND, only the status results from the operations before the faulting instruction or BRCOND are committed and the cumulative result is written during or at the end of the abort cycle.

This process applies to the micro-architectural status flags (EZF and ECF) as well as to the x86 architectural status flags. In essence, the architectural EFlags register is extended to 34 bits to make room for the extra two status flags. The RDFLG and WRFLG RegOps only reference the standard 32-bit portion of this extended EFlags register.

The generation of the cumulative status result is based on the status bit marks (StatMod[3:0]) from each of the four entries within the bottom row. The eight status flags are divided into four groups for modification marking purposes instead of having eight individual bit marks. As with updates to a general register within the register file, the possibility of contention exists, i.e. of multiple modifications to the same group of status flags. The desired result is the newest modification values for each group of status flags.

The generation of the cumulative status result is also based on the Completed status (State[3]) of each of the four operations. For an Op quad being aborted, field State identifies which status results should be committed and which should not be committed. All preceding operations to a given status result must be Completed and thus free of fault and misprediction. Table B.54 summarizes logic which accumulates the status flag changes.

No explicit control or constraint on operation commitment and retirement is required insofar as status flag results are concerned. Since status flag state changes only result from RegOps and since all RegOps generate register state changes (even if just to t0), an Op quad cannot be retired until all RegOps within it are Completed and thus have valid status result values.

There is also no need, given how status flag values are forwarded (to BRCONDs and "cc-dependent" RegOps), for any clearing of StatMod fields for the operations of the bottom row.

VIII.A.3 Memory Write Commitment

A third function of OCU 260 is controlling the commitment of memory write data values to "memory" (the data cache and/or to main memory). This differs from the commitment of register and status results in a number of ways: memory write commitment also involves an associated store queue entry (in most cases); at most one memory write can be committed per cycle; the commitment process is a two step process implemented in the form of a two stage commit pipeline; OCU 260 scans the bottom two rows to find StOps with memory writes to commit. The possibility of faults on the associated StOps exists.

Memory writes are all associated with StOps (except for LEA, CIA, and CDA operations, which don't actually reference memory). When a StOp completes execution, the associated memory address and store data is entered into store queue 270. Later, when the memory write of a StOp is committed, this entry is read and retired from store queue 270. Since StOps are executed in order and committed in order, store queue 270 is managed as a simple FIFO and the matching of store queue entries with associated scheduler StOps is trivial.

The actual commitment process, though, is more complicated and described below. Generally, a two step process is required in which the last/oldest store queue entry is first read and the address looked up in data cache 220; then, based on the status of the lookup, the store data is written into data cache 220 and/or out to memory. In the latter case, the data and address is typically simply loaded into the Write Buffer and, later, written out to memory.

This commitment process is implemented as a two stage write commit pipeline in which the first stage (i.e. the data cache tag lookup) corresponds to the commit cycle of register and status results, i.e. the containing Op quad could be retired at the end of this stage's cycle. From OCU 260's perspective, the commit process is largely viewed as a single cycle/single stage action that either succeeds or is delayed. The commitment of a memory write can be held up for similar reasons as for a register state change, and also held up if the write commit is not able to enter stage 2 of the commit pipe. When a write does enter commit stage 2, the associated StOp can be retired from scheduler 280, and the remainder of the commit process is completely asynchronous to OCU 260 and scheduler 280.

During the first commit stage, no control decisions are made. The data cache tag lookup is performed, and the accessed tag data is simply latched for examination during the second commit stage.

The write commit pipeline is only a single pipeline and thus only supports the commitment of one memory write per cycle. For Op quads containing at most one memory-writing StOp, this allows the possible commitment and retirement of an Op quad each cycle (subject to the same sort of caveats as stem from the commitment of register state changes). For Op quads containing two, three, or four such StOps, a corresponding minimum number of cycles is required to commit the Op quad which causes the Op quad to remain at the bottom of scheduler 280 for at least that many cycles.

This is partially mitigated by support for committing memory writes associated with StOps in row 4 as well as row 5. Given that memory writes are committed in order, this allows OCU 260 to get a "head start" on multiple write Op quads when the bottom Op quad is held up but otherwise empty of uncommitted memory writes, or when it simply does not contain any StOps. This helps to better match the OCU's one write per cycle commitment capability to the average number of writes per Op quad which is less than one per Op quad.

During each cycle, the OCU's memory write commit logic searches the bottom two rows for the next/oldest uncommitted memory-writing StOp (i.e. for the next StOp and associated write to try and commit); this selected operation generated the current bottom/oldest store queue entry. Concurrently, the address of this store queue entry is presented to the Data cache and a tag lookup initiated. Note that this is done "blindly", i.e. without consideration of whether the associated StOp is in fact presently committable.

If the selected StOp is committable and the write commit is able to advance into the second write commit stage, OCU 260 considers the StOp to be committed. In the next cycle, OCU 260 searches for and moves on to the next memory-writing StOp. The criterion for StOp commitment are the same as for register result commitment: the selected StOp must be Completed, all preceding/older LdStOps within the Op quad (and possibly the preceding Op quad if this StOp is in the second to last row) must also be Completed, and there must not be a preceding/older mispredicted BRCOND. A write commit is able to advance into commit stage 2 when that stage is either empty or is successfully completing commitment of a write.

If the selected StOp is not committable only because it is not Completed, OCU 260 examines the signal from the second SU execution stage which indicates whether a StOp is "stuck" in that stage with a detected fault condition. If there is any such operation, then it is the same StOp as the one OCU 260 is trying (unsuccessfully) to commit, and thus must be aborted by OCU 260. An appropriate abort cycle will not be initiated until the StOp is in the bottom row, all preceding operations within the Op quad have been committed, and no preceding BRCOND was mispredicted. This is essentially an extension of the condition for StOp being committable. In the mean time, OCU 260 remains in this state until an abort cycle is initiated for a preceding operation.

While OCU 260 is primarily concerned with memory-writing StOps, it must also handle CIA and CDA operations. This is necessary since these operations generate faultable memory addresses which OCU 260 must examine and commit. In the normal case of such an operation executing fault-free, OCU 260 trivially spends a cycle on committing the operation and simply moves on to committing the next StOp in the next cycle. Since no store queue entry was created during execution of the operation, no entry is retired from the store queue. If a fault was detected during execution of the CIA or CDA operation, the operation is "stuck" in the second SU execution stage, and OCU 260 aborts it in exactly the same fashion as for memory-writing StOps.

A second special situation for OCU 260 arises when a StOp's memory reference crosses an alignment boundary (currently 8 bytes) and is split by store unit 252 into two memory writes having two associated store queue entries. In such situations, OCU 260 take two cycles to retire the two store queue entries and does not officially commit the StOp until the second cycle. If the StOp has a fault, it is aborted without retirement of any store queue entries.

Operation of the exemplary embodiment of OCU 260 uses a set of mask bits (CmtMask[7:0]) which represent the OCU's progress in committing memory-writing StOps within the last two rows. Each of the eight mask bits CmtMask[7:0] corresponds to the eight entries in the last two rows. A first set of the bits (starting from bit 0) are clear indicating that OCU 260 has searched the corresponding entries committed any StOps up to entry corresponding to the last clear bit. The entry corresponding to the last clear bit contains the next StOp to be committed. Entries corresponding to the remaining, set mask bits have yet to be examined for committable StOps. OCU 260 also maintains a set of bits (UncmtStOp[7:0]) indicating which entries in the last two rows contain uncommitted memory-writing StOps.

During each cycle, OCU 260 selects the next uncommitted StOp and generates a new set of mask bits based on the entry containing this StOp. The unmasked entries are examined to determine whether the selected StOp is presently committable or an abort cycle needs to be initiated. If the selected StOp is committable and if stage 2 of the commit pipeline is able to accept a new write commit at the end of the cycle, the StOp is "committed" and the UncmtStOp bits are updated with new values. The UncmtStOp bits are also updated/shifted to match any shifting of the last two rows. Table B.55 in Appendix B describes this logic.

VIII.B Op Quad Retirement

When all of the abortable state changes of the operations within the bottom row of scheduler 280 have been committed or are being successfully committed, OCU 260 retires the Op quad from scheduler 280 at the end of the cycle. This allows the next Op quad to shift into the bottom row of scheduler 280. During cycles in which not all such operation results have yet been committed, the Op quad is not retired and is either retained for further commitment processing or invalidated due to an abort cycle. If invalidated, the abort cycle would be in response to some fault having been recognized on one of the operations within row 5.

More specifically, the retirement of an Op quad requires that all register results, status results, and memory writes are committed, and that there is no FAULT operation or mispredicted BRCOND in the Op quad. Retirement of an Op quad also immediately occurs if the Op quad is marked as invalid. This is automatically taken care of by the scheduler's shift control logic. Status results are all committed together in conjunction with retirement (or abortion) of the Op quad. Register results are guaranteed to be committed or currently committing if the associated operations are Completed. Table B.56 summarizes circuitry in OCU 260 for retirement of Op quads.

VIII.C Fault Handling

VIII.C.1 Load Operation Fault Handling

LdOps normally do not require any special handling by OCU 260 since LdOps only result in general register state changes. Like most StOps, though, LdOps can also encounter faults during execution. Special logic in OCU 260 recognizes and handles LdOp faults in the same manner as for StOp faults. To determine whether a faulting LdOp exists in bottom row of scheduler 280, OCU 260 searches row 5 for an operation which is a LdOp with all preceding/older operations Completed and committed and no preceding mispredicted BRCOND. OCU 260 also examines a signal from load unit 251 indicating whether a LdOp with a detected fault condition is "stuck" in the second execution stage of the LU pipeline.

If a LdOp in row 5 is uncompleted and preceded only by completed and committed operations and the signal from LU stage 2 is asserted, OCU 260 recognizes a faulting LdOp initiates an appropriate abort cycle immediately to abort the LdOp and all following operations. Table B.57 summarizes the OCU's LdOp fault handling logic.

VIII.C.2 FAULT and LDDHA/LDAHA Operation Handling

A few special operations, FAULT, LDDHA, and LDAHA operations, require additional, special commitment handling. None of these operations are issued to or executed by an execution unit. The FAULT, LDDGA, and LDAHA operations have no execution dependencies with other operations and are significant only to OCU 260.

OCU 260 handles the FAULT operation much like a faulting LdStOp. An abort cycle is initiated along with vectoring to the current emcode OCU fault handler. Unlike faulting LdStOps, there is no issue of whether there is a fault to recognize and of when to initiate the abort cycle. To simplify the OCU's logic for handling FAULT operations, the following constraints are placed upon emcode: 1) FAULT operations must be located in the first operation position of an Op quad, 2) all following operations in the Op quad must be "NO-OPs" (e.g. LDK t0,xx), and 3) the dynamically following Op quad must not contain any memory-writing StOps. Prohibiting memory-writing StOps from the next Op quad ensures that all of the OCU's other commitment logic can operate blindly on "FAULT" Op quads without any special consideration.

The State of a FAULT operation is initialized to 'b0000 when loaded into scheduler 280. When the FAULT operation reaches row 5, the uncompleted state of the Fault operation inhibits the OCU's Op quad retirement logic from retiring the Op quad, and FAULT operation commit logic in OCU 260 immediately initiates an abort cycle. The specifics of the abort cycle are the same as for faults on LdStOps. The only difference is the generation of a unique fault ID as described below. Table B.58 describes logic which generates an abort signal for a FAULT operation.

The LDDHA/LDAHA operations enable emcode to set and change the emcode address to which OCU-recognized exceptions are vectored. OCU 260 maintains two vector address registers, one to hold a "default" handler address and another to hold an "alternate" handler address. The first register is active for most emcode (both macroinstruction and exception processing emcode) by default and is set just once by the reset emcode via a LDDHA operation. The second register is set during certain sections of emcode via a LDAHA operation.

For emcode sequences (defined to be from an entry point through to an ERET) which do not contain a LDAHA operation, any faults recognized by OCU 260 on operations within the sequence result in vectoring to the address in the default handler address register. For emcode sequences which contain a LDAHA operation, faults on operations in Op quads before the one containing the LDAHA operation result in vectoring to the default address; but faults on operations in the Op quad containing the LDAHA operation or in any following Op quads up to and including the last quad of the emcode sequence, result in vectoring to the address in the alternate handler address register. The retirement of the "ERET" Op quad effectively reactivates the default handler address register for all following operations until the next occurrence of an LDAHA operation. The occurrence of an abort cycle also reactivates the default handler address register.

To simplify matters for OCU 260, LDDHA/LDAHA operations are constrained to be located in the oldest operation position of an Op quad. "Valid" operations are allowed in the following operation positions of the Op quad. Table B.59 summarizes the OCU's LDDHA/LDAHA operation handling logic.

VIII.C.3 Target Limit Violation Handling

In addition to the commitment of state changes associated with each of the operations within an Op quad, OCU 260 also recognizes a special condition tagged for an Op quad as a whole. Whenever a transfer control instruction is decoded by the MacDec, and a code segment limit violation is detected on the target address (after the MacDec has generated an Op quad and the Op quad has been loaded into scheduler 280), the Op quad is marked to indicate that such a violation was detected in association with the Op quad.

When the Op quad reaches OCU 260 and is to be committed, the set tag bit is recognized and an abort cycle is initiated without commitment of any state changes from the operations within the Op quad. Effectively the entire Op quad is faulted. The effect is similar to as if there was a FAULT operation in the Op quad. Table B.60 describes logic for handling branch target limit violations.

VIII.C.4 Mispredicted Branch Handling

Besides the commitment of abortable state changes and the handling of various special cases, OCU 260 handles the generation of abort cycles for mispredicted BRCONDs. As mentioned earlier, the restart of the instruction fetch and decode areas occurs before the BRCOND reaches the bottom of scheduler 280. Scheduler 280 simply needs to generate an abort cycle and to ensure that only preceding operations are committed and, as with the generation of abort cycles for operation faults, the abort must not be initiated until all preceding operations have been committed. Table B.61 summarizes logic which generates an abort for a mispredicted branch.

VIII.D Abort Cycle Generation

OCU 260 generates abort cycles in two situations: recognition of an Op fault (on a LdStOp or a FAULT operation), and recognition of a mispredicted BRCOND. Preceding sections and Tables B.55, B.57 B.58, and B.61 have covered generation of signals initiating an abort cycle (i.e. StAbort, LdAbort, FltAbort, LimAbort, and BrAbort). This section describes the generation of the general Abort signal and related information.

The Abort signal is simply a combination of all the individual abort signals associated with commitment of specific types of state changes or operations. The associated emcode vector address, which is defined only for fault-related aborts and not BRCOND-related aborts, is FltVecAddr as described above.

The Abort signal flushes scheduler 280 and all execution units 251 to 257 of all outstanding operations and reinitializes these areas in preparation for receiving new operations from instruction decoder 240. For BRCOND-related aborts, this is sufficient since the emcode and x86 mI fetch and decode areas were already restarted earlier by the BRCOND resolution scheduler logic.

For exception-related aborts, the emcode and x86 macroinstruction fetch and decode areas also need to be restarted at the above vector address. When instruction fetch/decode restarts are signaled simultaneously for both a mispredicted BRCOND and an operation exception, the operation exception is given higher priority. The vector address for the restart and the generation of the appropriate restart signal are generated accordingly. When a fault-related abort occurs, OCU 260 also latches information about the fault, namely the x86 macroinstruction program counter (the logical address of the associated mI effectively being faulted) into a register SR4.

Table B.62 summarizes the OCU's abort cycle generation logic.

IX. Processing Systems

Figure 11A:
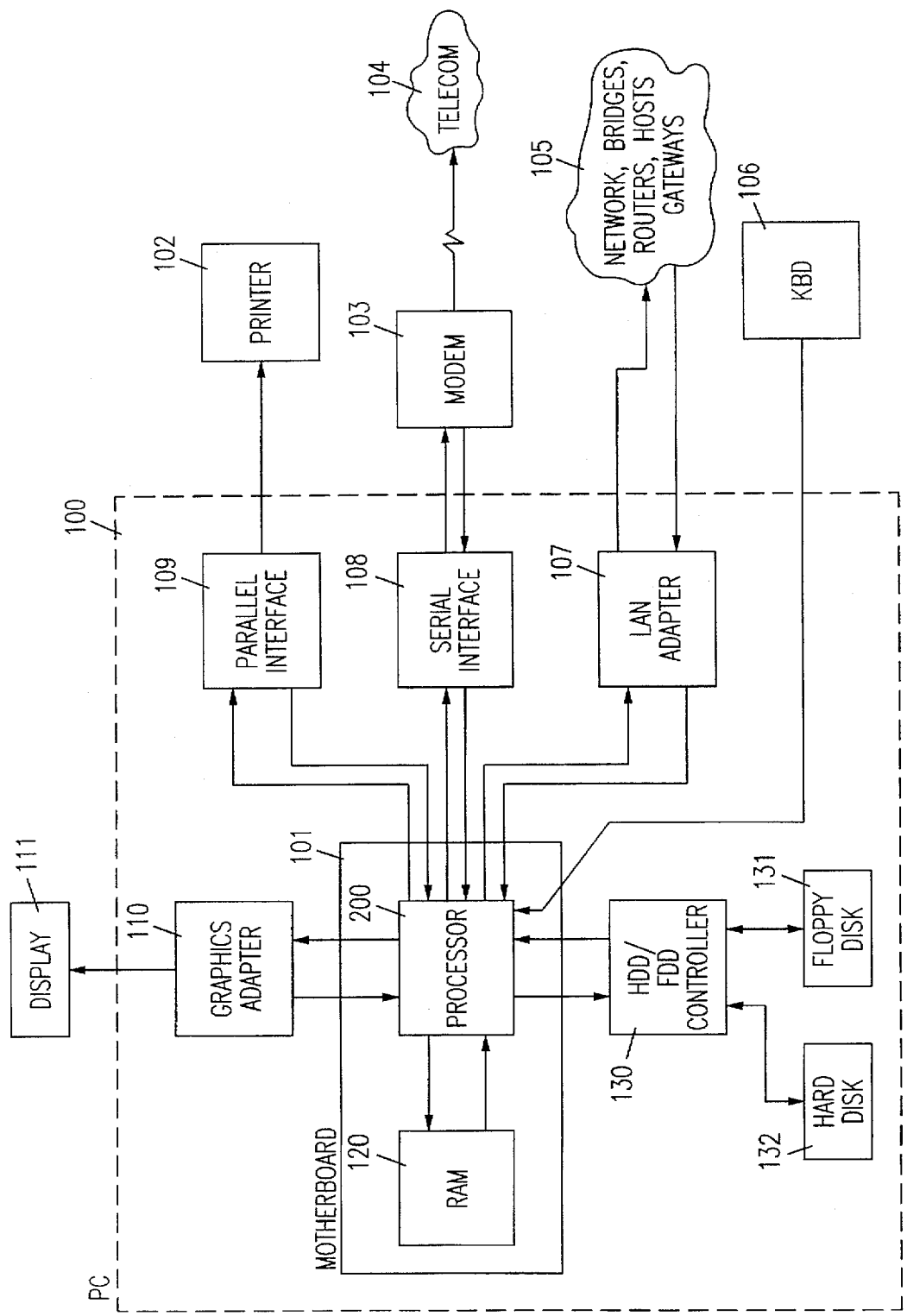
FIGS. 11A, 11B, and 11C are block diagrams of processing system embodiments of the invention.
Figure 11B:
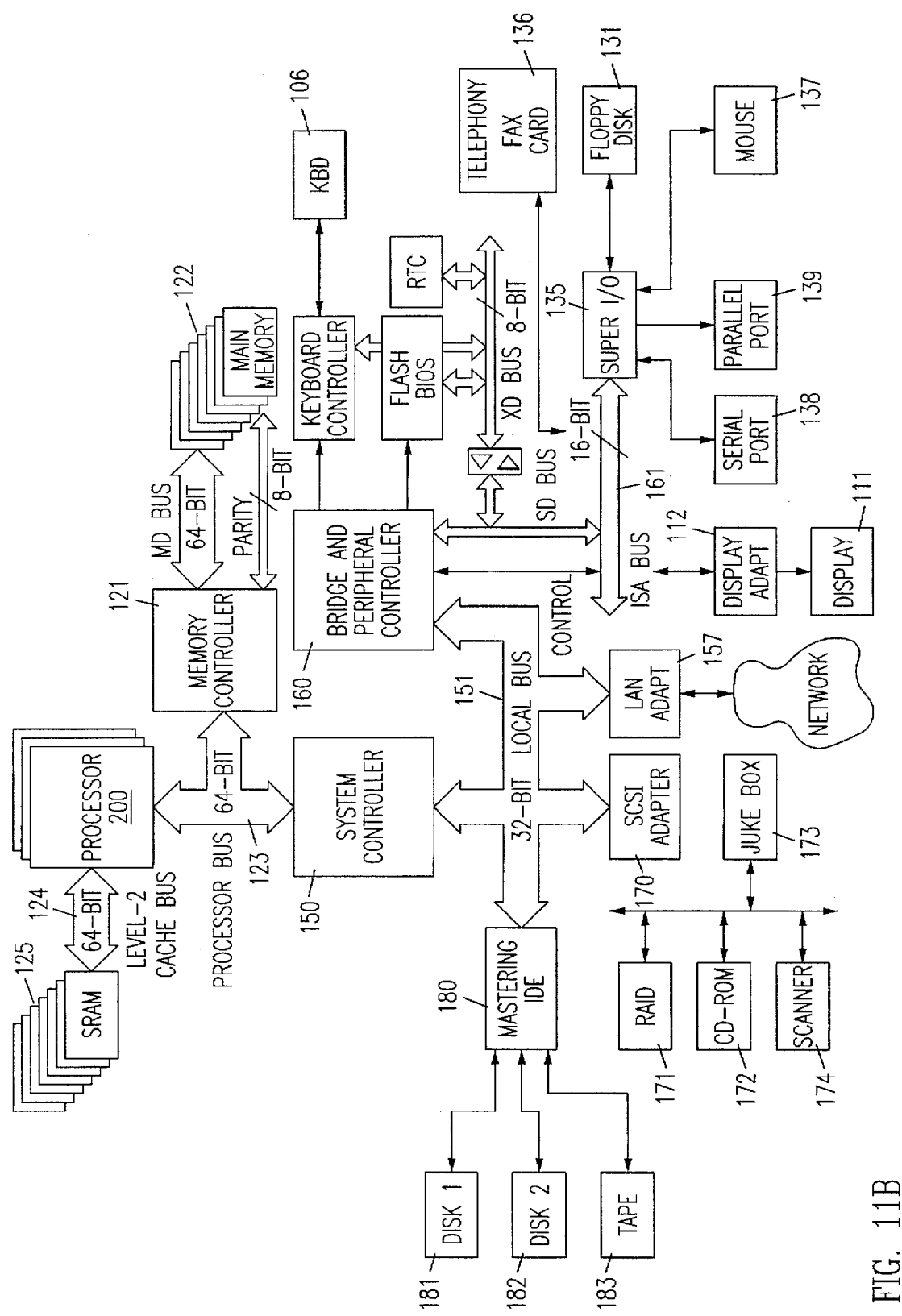
Figure 11C:
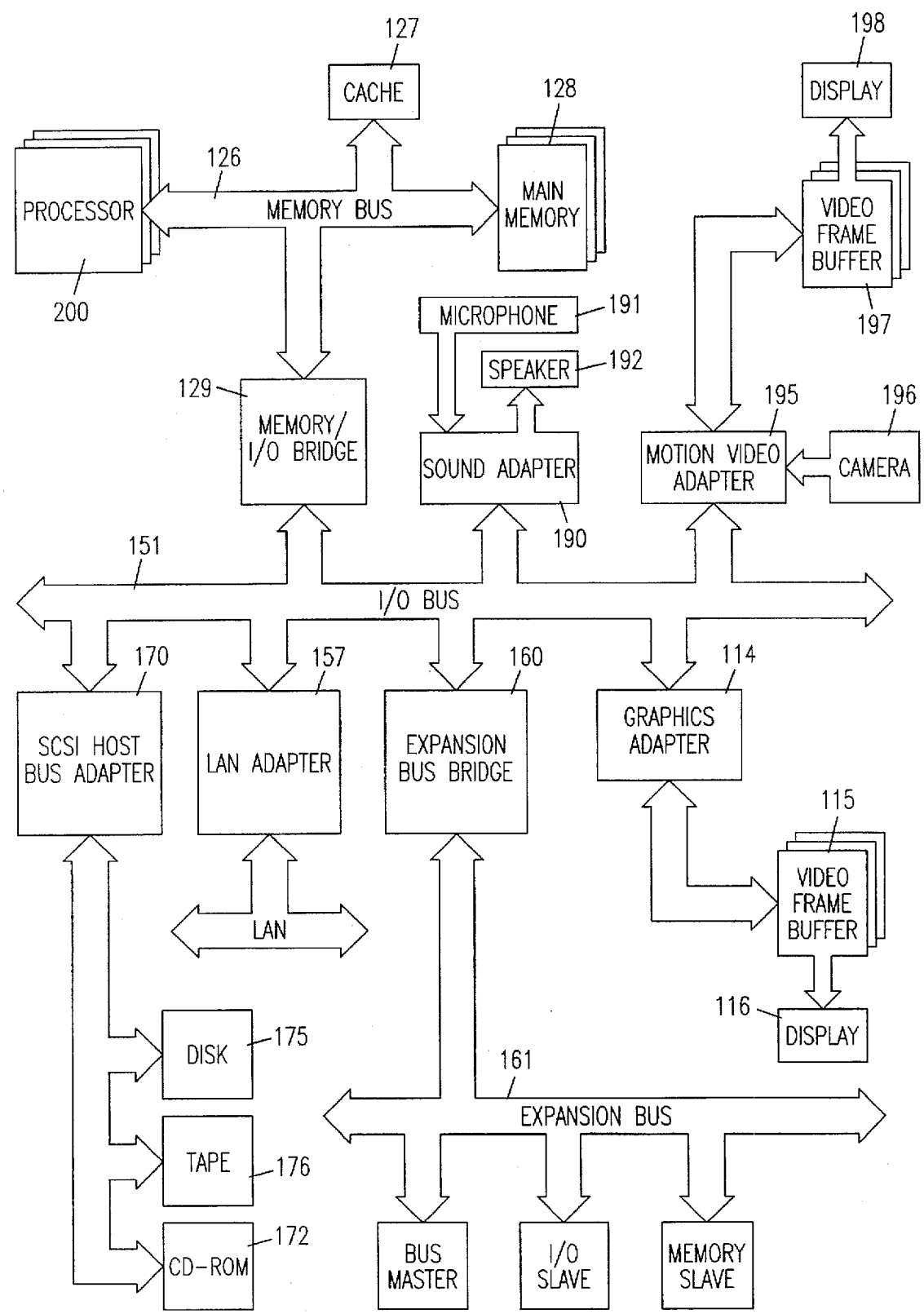

Embodiments of the invention include a wide variety of processing systems, illustratively including standalone and networked personal computer systems, workstation systems, multimedia systems, network server systems, multiprocessor systems, embedded systems, integrated telephony systems, and video conferencing systems. FIGS. 11A to 11C depict an illustrative set of processing systems that combine a superscalar processor 200 in accordance with the invention with suitable, bus configurations, memory hierarchies and cache configurations, I/O interfaces, controllers, devices, and peripheral components. The set of processing systems depicted in FIGS. 11A to 11C is merely illustrative and alternate combinations of bus configurations, memory hierarchies, I/O interfaces, controllers, devices, and peripheral components are also suitable. For example, suitable configurations for a system incorporating superscalar processor 200 include combinations of components, cards, interfaces, and devices such as:

1. video display devices, monitors, flat-panel displays, and touch screens;
2. pointing devices and keyboards;
3. co-processors, floating point processors, graphics processors, I/O controllers, and UARTs;
4. secondary and tertiary storage devices, controllers, and interfaces, caches, RAM, ROM, flash memory, static RAM, dynamic RAM
5. CD-ROMs, fixed disks, removable media storage devices, floppy disks, WORMs, IDE controllers, enhanced-IDE controllers, SCSI devices, scanners and jukeboxes;
6. PCMCIA interfaces and devices, ISA busses and devices, EISA busses and devices, PCI local busses and devices, VESA local busses and devices, Micro Channel Architecture busses and devices;
7. network interfaces, adapters and cards such as for ethernet, token ring, 10Base-T, twisted pairs, untwisted pairs, ATM networks, frame-relay, ISDN, etc;
8. video cards and devices, 2-D and 3-D graphics cards, frame buffers, MPEG/JPEG compression/decompression logic and devices, videoconferencing cards and devices, and video cameras and frame capture devices;
9. computer integrated telephony cards and devices, modem cards and devices, fax cards and devices;
10. sound cards and devices, audio and video input devices, microphones, and speakers;
11. data acquisition and control cards and interfaces, compression/decompression logic and devices, encryption/decryption logic and devices; and
12. tape backup units, redundant/fault tolerant components and devices such as RAID and ECC memory.

Suitable combinations of such components, cards, interfaces, and devices (including those enumerated above as well as comparable components, cards, interfaces, and devices) are too numerous to list. However, those skilled in the art will appreciate the full set of suitable combinations and will recognize suitable couplings between such components, cards, interfaces, and devices.

A networked personal computer 100 incorporating superscalar processor 200 is shown in FIG. 11A. Superscalar processor 200 is coupled to memory subsystem 120. In the embodiment of FIG. 11A, memory subsystem 120 is shown as RAM, although alternative embodiments include a cache or caches interposed between the RAM and superscalar processor 200. Control logic and storage for such a cache may be distributed among the memory subsystem 120 and the superscalar processor 200. For example, the level 1 caches (i.e., an instruction cache and a data cache) and cache control logic may be included in superscalar processor 200 and a level 2 cache may be included as part of memory subsystem 120. Alternative distributions are also suitable, although the level 1 caches are preferably on-chip components of superscalar processor 200.

Superscalar processor 200 and memory subsystem 120 are included as parts of a motherboard 101 of computer 100. A series of adapters, interfaces, and controllers couple processor 200 to devices and peripheral components. These adapters, interfaces, and controllers are typically be coupled to processor 200 as cards in a backplane bus of motherboard 101. However, alternative embodiments may incorporate individual adapters, interfaces and controllers into motherboard 101. For example, a graphics adapter 110 may be included on motherboard 101 with superscalar processor 200 or be a separate component as shown in FIG. 11A. In either case, graphics adapter 110 is coupled to superscalar processor 200 via busses such as those described below with reference to FIGS. 11B and 11C. Graphics adapter 110 drives signals to control display 111 in accordance with screen updates supplied by superscalar processor 200. A parallel interface 109 and a serial interface 108 provide parallel port and serial port signaling interfaces for respectively interfacing to parallel port devices (e.g., printers such as parallel printer 102, tape backup units, etc.) and to serial devices (e.g., modem 103, pointing devices, and printers). In computer 100, parallel interface 109 and serial interface 108 are shown as separate interfaces although each is often incorporated with a hard disk/floppy disk controller (such as hard disk/floppy disk controller 130) as a multifunction card. Hard disk/floppy disk controller 130 controls access to the media of a hard disk 132 and to a floppy disk 131. Typically, hard disk/floppy disk controllers such as hard disk/floppy disk controller 130 provide some level of buffering of reads and writes. Hard disk/floppy disk controller 130 may also provide limited caching for data transfers to and from the disk media.

Suitable designs for graphics adapter 110, parallel interface 109, serial interface 108, and hard disk/floppy disk controller 130 are well known in the art. For example, implementations of graphics adapter cards conforming to the VGA standard are commonly available and suitable designs are well known to those skilled in the art. Designs for parallel and serial interfaces, such as those conforming to the Centronics parallel interface and to the RS-232C serial interface specifications, respectively, are also well known to those skilled in the art. Similarly, designs for IDE and SCSI disk controllers are well known in the art and suitable implementations are commonly available.

A LAN adapter 107 provides computer 100 with a network interface to local area networks such as 802.3 ethernet, 10base-T, twisted pair, and token ring networks. As with the other adapters and interfaces, LAN adapter 107 is typically coupled to processor 200 as a card in the backplane bus of motherboard 101. However, alternative embodiments may incorporate LAN adapter 107 into motherboard 101. Suitable cards and devices providing network interfaces are well known in the art and LAN adapter 107 may be any such suitable card or device.

Because of the high performance associated with its superscalar design, superscalar processor 200 is particularly attractive as the processor, or a one of multiple processors, in a network server configuration such as than shown in FIG. 11B. In the network server configuration of FIG. 11B, multiple instances of superscalar processor 200 are shown coupled to a level 2 cache 125 and to a processor bus 123. In the embodiment FIG. 11B, superscalar processor 200 includes an on-board level 1 cache (i.e., instruction cache 130 and data cache 170) and level 2 cache control logic. The level 2 cache control logic (not shown) is coupled to level 2 cache 125 via a 64-bit cache bus. Alternate embodiments of superscalar processor 200, may offload the functionality of level 2 cache control logic. In such an alternative embodiment, level 2 cache control logic may be interposed between superscalar processor 200 and level 2 cache 125. In the context of bus structures presented in FIG. 11B, level 2 cache control logic could be coupled to superscalar processor 200 via processor bus 123. Suitable modifications to the level 2 cache configuration of FIG. 11B will be apparent to those skilled in the art.

Referring again to FIG. 11B, superscalar processor 200 is coupled to a memory controller 121 and to a system controller 150 via a 64-bit processor bus 123. Memory controller 121 provides a 64-bit interface to memory 122 including an 8-bit parity interface to support Error Correcting Codes (ECC). ECC memory is desirable, but optional, and alternative embodiments may forgo the parity interface. System controller 150 provides the interface (or bridge) between the 64-bit processor bus 123 and the 32-bit local bus 151. Local bus 151 is any high-speed I/O bus, for example, a VESA Local bus (VL bus) or Peripheral Component Interconnect (PCI) bus. System controller 150 provides buffering to support the potentially disparate clock rates of processor bus 123 and local bus 151. System controller 150 arbitrates for use of the two busses (123 and 151) and may, in certain configurations, support burst data transactions across the two busses. Suitable designs for interbus bridges, such as system controller 150 (bridging processor bus 123 and local bus 151) and bridge and peripheral controller 160 (bridging local bus 151 and ISA bus 161, as described below) are well known in the art. For example, U.S. Pat. No. 5,414,820, entitled "Crossing Transfers for Maximizing the Effective Bandwidth of a Dual-Bus Architecture," to McFarland et al., the entirety of which is incorporated herein by reference, describes a design suitable for bridging a high-speed system bus and a slower I/O bus. System controller 150 and bridge and peripheral controller 160 are of any such suitable design.

Local bus 151 couples to multiple local bus devices and components (illustratively, to SCSI Adapter 170, IDE controller 180, LAN Adapter 157, and bridge and peripheral controller 160). Certain of the local bus devices and components on local bus 151 may optionally be provided as cards coupled to the local bus 151 by a modular connector. In the embodiment of FIG. 11B, SCSI adapter 170, IDE controller 180, and LAN adapter 157 are provided as cards coupled to the local bus 151 by a modular connector. Bridge and peripheral controller 160 is directly connected to the local bus 151. Alternate configurations (including configurations in which one or more of the SCSI adapter 170, IDE controller 180, and LAN adapter 157 are directly connected to local bus 151) are also suitable and will be appreciated by those skilled in the art. In addition, alternative embodiments may couple a display adapter to local bus 151 thereby taking advantage of the generally higher bandwidth and throughput of local bus 151 for screen updates (when compared to alternatives such as ISA, EISA, and Micro Channel Architecture busses). Because display device requirements are typically less demanding in network server configurations than in personal computer or workstation configurations, display adapter 112 is shown coupled to the lower bandwidth ISA bus 161.

IDE controller 180 is representative of a variety of controller designs (including IDE, enhanced IDE, ATA, and Enhanced Small Device Interface (ESDI) controller designs) for interfacing storage devices such as disks, tape drives, and CD-ROMs. IDE controller 180 is coupled to two disks (hard disk 181 and floppy disk 182) and to a tape backup unit 183. Alternative configurations may interface an IDE/enhanced IDE CD-ROM via IDE controller 180, although a both a CD-ROM 172 and a CD jukebox 173 are interfaced via a Small Computer System Interface (SCSI) adapter 170 in the embodiment of FIG. 11B. Suitable designs for hard disks, floppy disks, CD-ROMs, and tape drives are all well known in the art and modular components based on those designs are commonly available for IDE, enhanced IDE, and ATA based controller designs. IDE controller 180 is of any such suitable design, including enhanced IDE, ATA, and ESDI alternatives.

SCSI adapter 180 is coupled to local bus 151 and to multiple SCSI devices (illustratively, to a Redundant Array of Inexpensive Disks (RAID) 171, CD-ROM 172, scanner 2016, CD jukebox 173, and a scanner 174) in a daisy chain configuration. For illustrative purposes, the daisy chain of SCSI devices is shown as a bus in FIG. 11B. Additional SCSI devices may also be coupled to SCSI adapter 180 and additional SCSI adapters may be coupled to local bus 151 to provide even larger numbers of SCSI device connections. Additionally, SCSI adapter 180 and/or additional SCSI adapters may be coupled to an Industry Standard Architecture (ISA) bus such as ISA bus 161, although coupling to a local bus such as local bus 151 is generally preferable because of the higher bandwidth and throughput of local busses conforming to standards such as the VL bus or PCI standards.

In addition to the set of SCSI devices shown in FIG. 11B, additional hard disks printers, LAN adapters and other computer systems may be coupled to superscalar processor 200 via a SCSI adapter such as SCSI adapter 180. Additionally, SCSI adapter 180 is representative of suitable alternative device adapters such as SCSI-2 and ESDI adapters. Suitable designs for RAIDs, scanners, CD-ROM jukeboxes, hard disks, CD-ROMs, printers, LAN adapters and tape drives are all well known in the art and modular components based on those designs are commonly available for SCSI adapter designs. SCSI adapter 180 is of any such suitable design, including SCSI-2 and ESDI alternatives.

LAN adapter 157 is coupled to local bus 151 and, in the embodiment of FIG. 11B, provides support for an IEEE 802.3 Carrier Sense Multiple Access with Collision Detection (CSMA/CD) local area network, although adapters for alternative network configurations and for media variations of an 802.3 network are also be suitable. LAN adapter 157 is therefore representative of suitable alternative device adapters such as those based on IEEE 802.x standards (e.g., 802.3 baseband ethernet on coaxial media, twisted and untwisted pair media, and 10base-T, 802.3 broadband networks, 802.4 token passing networks, 802.5 token ring networks, etc.), and those based on Fiber Distributed Data Interface (FDDI) standards. Designs for such suitable network adapters are well known in the art and modular components based on those designs are commonly available for both VL bus and PCI bus connections. In addition, suitable designs for network adapters with ISA, SCSI, and SCSI-2 interfaces are also are well known in the art and modular components based on those designs are also commonly available. Alternative embodiments may therefore incorporate LAN adapters such as LAN adapter 157 coupled to superscalar processor 200 via ISA bus 161 or SCSI adapter 180, although coupling to a local bus such as local bus 151 is generally preferable to the ISA bus alternative because of the higher bandwidth and throughput of local busses conforming to standards such as the VL bus or PCI standards. LAN adapter 157 is of any suitable design, for any suitable network topology and medium, and is coupled to any of the suitable bus structures (e.g., VL bus, PCI bus, ISA bus, SCSI, etc.).

ISA bus 161 is coupled to local bus 151 via bridge and peripheral controller 160. Suitable bridges, like system controller 150 bridge, are well known in the art and bridge and peripheral controller 160 is of any suitable design. ISA bus 161 provides a lower-speed (when compared to local bus 151), 16-bit I/O bus and provides modular connections for a variety of peripheral components including display adapter 112, telephony card 136, and a multifunction I/O card such as super I/O 135. Display adapters such as display adapter 112 are well known in the art and provide varying degrees of support for advanced graphics functions. For example, simple text display adapters provide text and character based graphics only. More sophisticated display adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. As described above, display device requirements have typically been less demanding in network server configurations than in personal computer or workstation configurations. As a result, display adapter 112 is shown coupled to the relatively low bandwidth ISA bus 161. However, alternative embodiments may couple an advanced or specialized display adapter to local bus 151 thereby taking advantage of the generally higher bandwidth and throughput of local bus 151 for screen updates (when compared to alternatives such as ISA, EISA, and Micro Channel Architecture busses).

Super I/O 135 provides support for a pointing device 137, a serial port 138, a parallel port 139, and a disk 131. Suitable designs for combination ISA cards such as super I/O 135 are well known in the art and such cards are commonly available. Super I/O 135 is of any such suitable design. Modems may be coupled via serial port 138 and printers may be coupled via either serial port 138 or parallel port 139 provided by super I/O 135. Alternatively, a single function ISA card may be used for such purposes. Modem and fax/modem cards are one example of such a single function card. Telephony card 136 is representative of cards providing voice, fax, and speech recognition, modem, fax-on-demand services, etc. Suitable telephony cards typically conform to standards defining a modular architecture for integrating computer-based application with telephony hardware. These standards include the Communicating Applications Specification (CAS) and the more comprehensive Signal Computing System Architecture (SCSA) standard. Telephony card 136 is of any such suitable design.

Preferably, a high performance server configuration, such as that shown in FIG. 11B, includes a hierarchy of busses with varying performance characteristics each matched to the devices and components coupled thereto. Those skilled in the art will recognize a variety of suitable variations on the bus hierarchy of FIG. 11B, including the elimination individual busses, the addition of multiple instances of individual busses, and redistribution of devices and components among the various busses. The server configuration of FIG. 11B is representative of all such suitable variations.

A multimedia workstation configuration for superscalar processor 200 shown in FIG. 11C. As with the server configuration of FIG. 11B, the multimedia workstation configuration includes a hierarchy of busses with varying performance characteristics each matched to the devices and components coupled thereto. Those skilled in the art will recognize a variety of suitable variations on the bus hierarchy of FIG. 11C. Memory bus 126 couples superscalar processor 200, cache 127, memory 128, and bridge 129. As with the network server configuration of FIG. 11B, a variety of cache configurations are suitable for a multimedia workstation. In the embodiment FIG. 11C, superscalar processor 200 includes an on-board level 1 cache (e.g, an instruction cache and data cache). A level 2 cache (i.e., cache 127) including control logic is coupled to superscalar processor 200 via memory bus 126. Alternate embodiments of superscalar processor 200, may incorporate functionality of level 2 cache control logic thereby enabling a direct connection to level 2 cache storage. Furthermore, alternative embodiments may relocate all cache support to cache 127, although at least a level 1 cache is preferably on-chip with superscalar processor 200. Suitable modifications to the cache configuration of FIG. 11B will be apparent to those skilled in the art.

As in FIG. 11B, local bus 151 of FIG. 11C is preferably a high speed I/O bus such as a VL bus or PCI bus. SCSI adapter 170, LAN adapter 157, a graphics adapter 114, sound adapter 190, and motion video adapter 195 are coupled to each other and to superscalar processor 200 via I/O bus 151. SCSI adapter 170, LAN adapter 157, and an expansion bus bridge 160, together with the components and devices coupled to each are comparable to corresponding adapters, components, and devices discussed above with reference to FIG. 11B.

In particular, SCSI adapter 170 is coupled to multiple SCSI devices (illustratively, disk 175, tape backup unit 176, and CD-ROM 172) in a daisy chain configuration. For illustrative purposes, the daisy chain of SCSI devices is shown as a bus. Additional SCSI devices may also be coupled to SCSI adapter 170. Suitable designs for SCSI adapter 170 are discussed above. Variations on the set of SCSI devices, and on SCSI configurations in general (each of which has been described above with reference to FIG. 11B) are also applicable in the multimedia workstation configuration of FIG. 11C. Similarly, suitable designs and variations on LAN adapter 157 are also described above in the context FIG. 11B. Furthermore, suitable designs and variations on expansion bus 161 are described above in the context of FIG. 11. As described above, suitable designs for bridge 160 and ISA bus 161 are well known in the art and modular components based on such suitable designs are commonly available.

In accordance with an embodiment of superscalar processor 200, superscalar processor 200 may contain a multimedia unit 256 for executing multimedia extensions to the x86 instruction set. Referring again to FIG. 11C, multimedia adapters, such as sound adapter 190, motion video adapter 195, and graphics adapter 114, are each coupled to superscalar processor 200 via busses 151 and 126 to provide for high-bandwidth transfers of multimedia data between the multimedia adapters, memory 128, and secondary storage devices (e.g., disk 175). Sound adapter 190 provides digital-to-analog (D/A) and analog-to-digital (A/D) interfaces for respectively synthesizing and sampling audio signals. The A/D and D/A interfaces of sound adapter 190 are respectively coupled to a microphone 191 and a speaker 192. Suitable designs for sound cards are well known in the art and sound adapter 190 is of any such suitable design.

Motion video adapter 195 provides support for capture and compression of video signals, for example, from video camera 196. In addition, motion video adapter 195 supplies a display device 198 such as a television, high-definition television, or a high resolution computer monitor with display signals via a frame buffer 197. Alternative embodiments of motion video adapter 195 may eliminate frame buffer 197 and directly drive a raster display. Furthermore, alternative embodiments of motion video adapter 195 may decouple the video input and video output functionality of motion video adapter 195, and instead provide separate video input and video output components.

Because video information requires large amounts of storage space, it is generally compressed. Accordingly, to display compressed video information, for example from data represented on a compact disk in CD-ROM 172, the compressed video information must be decompressed. High bandwidth burst mode data transfers are supported by I/O bus 151, which is preferably a local bus such as PCI with support for arbitrary length burst data transfers. In the multimedia workstation configuration of FIG. 11C, video compression and decompression can be performed by superscalar processor 200 (executing multimedia instructions in a multimedia unit) and/or by motion video adapter 195. Thus, memory bus 126 and bridge 129 preferably support burst data transfers across bridge 129 between memory bus 126 and I/O bus 151. Suitable designs for motion video adapters typically provide support for the Moving Pictures Expert Group (MPEG) standards for video encoding and decoding (e.g., MPEG-1 and MPEG-2) and for JPEG. In addition, motion video adapter 195 may support video conferencing by providing implementing video compression/ decompression algorithms in accordance with H.261 (the standard compression algorithm for H.320 videoconferencing). Suitable designs for implementing such compression/decompression algorithms are well known in the art and motion video adapter 3021 is of any such suitable design.

Graphics adapters such as graphics adapter 114 are well known in the art and provide varying degrees of support for advanced graphics functions. For example, graphics adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. Suitable designs for graphics adapters are well known in the art and modular components based on these designs are commonly available. Graphics adapter 114 is of any such suitable design. Alternative embodiments my combine the graphics display functionality of graphics adapter 114 with the motion video display functionality of motion video adapter 195 outputting on a single high-resolution display device.

X. Conclusion

Although the present invention has been described with reference to particular embodiments, the description is only an example of the invention's application and should not be taken as a limitation. Various adaptations and combinations of features of the embodiments disclosed are within the scope of the present invention.

We claim:

1. A superscalar processor comprising:
   a first execution unit capable of executing a first class of operations;
   a second execution unit capable of executing a second class of operations, wherein the second class overlaps the first class;

a set of entries which store information describing a set of operations for execution by the processor, the entries being ordered sequentially; and a scan chain comprising:

generation circuitry in each entry which generates a scan bit if that entry contains information describing an operation in the first class;

propagation circuitry which propagates the scan bit from a first entry to entries which follow the first entry in sequential order, the first entry being first in sequential order of any entries which identify information describing an operation in the first class; and selection circuitry in each entry to select the operation in that entry for execution by the second execution unit if the propagation circuitry propagates the scan bit to the entry and the entry stores information describing an operation in the second class.

2. The superscalar processor of claim 1, wherein the propagation circuitry propagates the scan bit by determining in parallel a set of group propagate terms, wherein each group propagate term indicates whether a scan bit propagating to a corresponding group of entries would propagate out to the corresponding group of entries.

3. A selection circuit comprising:

an array of entries, wherein the entries have a sequential order and each entry comprises circuitry which asserts a kill signal in response to an object associated with the entry being of a selected type;

a plurality of group-term circuits which are in correspondence with a sequence of groups of entries, wherein each group-term circuit is coupled to the entries in a corresponding group and asserts a group-kill signal in response to an entry in the corresponding group asserting a kill signal;

a plurality of entry-selection circuits in correspondence with the sequence of groups, wherein each entry-selection circuit, unless disabled, selects an entry which is in the corresponding group and associated with an object of the selected type; and a group-selection circuit coupled to the group-term circuits and the entry-selection circuits, wherein for each entry-selection circuit, the group-selection circuit disables that entry-selection circuit if the group corresponding to the entry-selection circuit is preceded in the sequence of groups by a group for which a group-term circuit asserts a group-kill signal.

4. A selection circuit comprising:

an array of entries, wherein the entries have a sequential order and each entry comprises circuitry which asserts a generate signal in response to an object associated with the entry being of a first type and circuitry which asserts a kill signal in response to the object being of a second type;

a plurality of group-term circuits which are in correspondence with a sequence of groups of entries, wherein each group-term circuit:

asserts a group-generate signal if, within the corresponding group, a first entry asserts a generate signal and no entry which sequentially follows the first entry asserts a kill signal;

asserts a group-only signal in response to an entry in the corresponding group asserting a generate signal; and asserts a group-kill signal in response to an entry in the corresponding group asserting a kill signal;

a propagate circuit coupled to the group-term circuits, wherein for each group, the propagate circuit generates an O-term signal which is asserted in response to a preceding group asserting a group-only signal and generates a scan bit signal which is asserted if a first preceding group asserts a group-generate signal and no preceding group which is subsequent to the first preceding group asserts a group-kill signal; and a plurality of entry-selection circuits in correspondence with the sequence of groups, each entry-selection circuit being connected to receive from the propagate circuit the scan bit and the only signals for the corresponding group, wherein each entry-selection circuit selects an entry which is in the corresponding group if that entry asserts a kill signal and either the scan bit signal is asserted or the only signal is not asserted and an entry which is in the corresponding group and preceding the selected entry asserts a generate signal.

5. A computer system comprising:

a memory subsystem which stores data and instructions; and a processor operably coupled to access the data and instructions stored in the memory subsystem, wherein the processor comprises:

a first execution unit capable of executing a first class of operations;

a second execution unit capable of executing a second class of operations, wherein the second class overlaps the first class;

a set of entries which store information describing a set of operations for execution by the processor, the entries being ordered sequentially; and a scan chain comprising:

generation circuitry in each entry which generates a scan bit if that entry contains information describing an operation in the first class;

propagation circuitry which propagates the scan bit from a first entry to entries which follow the first entry in sequential order, the first entry being first in sequential order of any entries which identify information describing an operation in the first class; and selection circuitry in each entry to select the operation in that entry for execution by the second execution unit if the propagation circuitry propagates the scan bit to the entry and the entry stores information describing an operation in the second class.

6. The computer system of claim 5, wherein the processor and the memory subsystem are components of a motherboard.

7. The computer system of claim 6, wherein the motherboard further comprises a backplane bus operably connected to the processor, and wherein the computer system further comprises one or more devices on cards connected to the motherboard via the backplane bus.

8. The computer system of claim 5, further comprising a parallel device interface operably coupled to the processor.

9. The computer system of claim 8, further comprising a printer connected to the processor via the parallel interface.

10. The computer system of claim 5, further comprising a serial device interface operably coupled to the processor.

11. The computer system of claim 10, further comprising a modem connected to the processor via the serial interface.

12. The computer system of claim 5, further comprising a graphics adapter operably coupled to the processor.

13. The computer system of claim 12, further comprising a video display connected to the processor via the graphics adapter.

14. The computer system of claim 5, further comprising a local area network adapter operably coupled to the processor.

15. The computer system of claim 14, further comprising a network of devices connected to the processor via the network adapter.

16. The computer system of claim 5, further comprising a disk controller operably coupled to the processor.

17. The computer system of claim 16, further comprising a hard disk connected to the processor via the disk controller.

18. The computer system of claim 16, further comprising a floppy disk connected to the processor via the disk controller.

19. In a superscalar processor having a first execution unit capable of executing a first class of operations and a second execution unit capable of executing a second class of operations which overlaps the first class, a method for simultaneously selecting operations for execution by the first and second execution units, the method comprising:

storing information describing a set of operations in a set of sequential entries;

scanning the entries in sequential order to select a first entry which stores information describing a first operation of the first class;

selecting the first operation for execution by the first execution unit;

propagating a scan bit signal from the first entry and continuing in sequential order;

killing the scan bit by a second entry which stores information describing a second operation that is of the second class; and selecting the second operation for execution by the second execution unit.

* * * * *